(12) United States Patent
Wilson et al.

(10) Patent No.: US 9,037,159 B2
(45) Date of Patent: *May 19, 2015

(54) APPARATUS AND SYSTEMS FOR PROVIDING LOCATION-BASED SERVICES WITHIN A WIRELESS NETWORK

(71) Applicant: AT&T Mobility II LLC, Atlanta, GA (US)

(72) Inventors: Brian Wilson, Bellevue, WA (US); Krishna Bhuyan, Redmond, WA (US); Jacob Feinstein, Dallas, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/135,780

(22) Filed: Dec. 20, 2013

(65) Prior Publication Data

US 2014/0329545 A1 Nov. 6, 2014

Related U.S. Application Data

(60) Continuation of application No. 13/274,953, filed on Oct. 17, 2011, now Pat. No. 8,634,857, which is a division of application No. 12/412,640, filed on Mar. 27, 2009, now Pat. No. 8,068,857, which is a
(Continued)

(51) Int. Cl.
*H04W 24/00* (2009.01)
*H04W 4/02* (2009.01)
*H04W 64/00* (2009.01)

(52) U.S. Cl.
CPC ............... *H04W 4/02* (2013.01); *H04W 64/00* (2013.01); *H04W 4/023* (2013.01)

(58) Field of Classification Search
CPC .................................. H04W 4/02; H04W 64/00

USPC ............. 455/456.1, 456.3, 456.2, 456.6, 457, 455/410, 411, 404.2
See application file for complete search history.

(56) References Cited

U.S. PATENT DOCUMENTS 5,485,163 A 1/1996 Singer et al.
5,625,668 A 4/1997 Loomis et al.
(Continued)

FOREIGN PATENT DOCUMENTS

DE 43 26 900 2/1995
GB 2 363 289 12/2001
(Continued)

OTHER PUBLICATIONS

Childi, G.A., Jr., "Qualcomm Turns Cell Phones Into GPS Systems," PCWorld.com, 2002, 1 page; www.pcworld.com/resource/grintable/article/0,80085,00.asp.downloaded from the internet on Mar. 19, 2002.
(Continued)

*Primary Examiner* — Sonny Trinh
(74) *Attorney, Agent, or Firm* — Baker & Hostetler LLP

(57) ABSTRACT

A system for providing wireless telecommunications services to mobile devices includes structure and functionality for location-based services, and includes both server and client/mobile device apparatuses. One apparatus includes a data store storing at least a first record associated with a first wireless device or a second record associated with a second wireless device. A computer is coupled to the data store and is configured to receive a request from the first wireless device to obtain location information associated with the second wireless device. The computer is configured to receive a change location privileges request, and to update the first or second records in the data store based on the received change request. Other apparatuses provide additional structures and functions.

20 Claims, 41 Drawing Sheets

Related U.S. Application Data continuation of application No. 11/766,304, filed on Jun. 21, 2007, now Pat. No. 7,532,900, which is a continuation of application No. 10/325,270, filed on Dec. 20, 2002, now Pat. No. 7,236,799.

(60) Provisional application No. 60/388,944, filed on Jun. 14, 2002, provisional application No. 60/388,942, filed on Jun. 14, 2002.

(56) References Cited

U.S. PATENT DOCUMENTS

| | | | |
|---|---|---|---|
| 5,797,091 A | 8/1998 | Clise et al. | |
| 5,930,699 A | 7/1999 | Bhatia | |
| 6,138,003 A | 10/2000 | Kingdon et al. | |
| 6,167,277 A | 12/2000 | Kawamoto | |
| 6,177,905 B1 | 1/2001 | Welch | |
| 6,212,392 B1 | 4/2001 | Fitch et al. | |
| 6,311,069 B1 | 10/2001 | Havinis et al. | |
| 6,321,092 B1 | 11/2001 | Fitch et al. | |
| 6,332,127 B1 | 12/2001 | Bandera et al. | |
| 6,351,221 B1 | 2/2002 | Phillips et al. | |
| 6,360,101 B1 | 3/2002 | Irvin | |
| 6,360,102 B1 | 3/2002 | Havinis et al. | |
| 6,381,535 B1 | 4/2002 | Durocher et al. | |
| 6,397,057 B1 | 5/2002 | Malackowski et al. | |
| 6,424,910 B1 | 7/2002 | Ohler et al. | |
| 6,441,752 B1 | 8/2002 | Fomukong | |
| 6,442,391 B1 | 8/2002 | Johansson et al. | |
| 6,484,033 B2 | 11/2002 | Murray | |
| 6,484,148 B1 | 11/2002 | Boyd | |
| 6,486,801 B1 | 11/2002 | Jones | |
| 6,505,048 B1 | 1/2003 | Moles et al. | |
| 6,519,463 B2 | 2/2003 | Tendler | |
| 6,542,750 B2 | 4/2003 | Hendrey et al. | |
| 6,549,768 B1 | 4/2003 | Fraccaroli | |
| 6,553,236 B1 | 4/2003 | Dunko et al. | |
| 6,587,691 B1 | 7/2003 | Granstam et al. | |
| 6,647,269 B2 | 11/2003 | Hendrey et al. | |
| 6,662,014 B1 | 12/2003 | Walsh | |
| 6,678,613 B2 | 1/2004 | Andrews et al. | |
| 6,684,068 B1 | 1/2004 | Tikka et al. | |
| 6,691,029 B2 | 2/2004 | Hughes et al. | |
| 6,748,306 B2 | 6/2004 | Lipowicz | |
| 6,757,544 B2 | 6/2004 | Rangarajan et al. | |
| 6,784,901 B1 | 8/2004 | Harvey | |
| 6,801,763 B2 | 10/2004 | Elsey et al. | |
| 6,819,919 B1 | 11/2004 | Tanaka | |
| 6,834,229 B2 | 12/2004 | Rafiah | |
| 6,847,823 B2 | 1/2005 | Lehikoinen et al. | |
| 6,850,163 B1 | 2/2005 | Adamczyk et al. | |
| 6,889,054 B2 | 5/2005 | Himmel et al. | |
| 6,898,423 B2 | 5/2005 | Motegi et al. | |
| 6,944,443 B2 | 9/2005 | Bates et al. | |
| 6,944,447 B2 | 9/2005 | Portman et al. | |
| 6,968,179 B1 | 11/2005 | DeVries | |
| 6,978,445 B2 | 12/2005 | Loane | |
| 6,986,179 B2 | 1/2006 | Varadharajulu et al. | |
| 6,987,976 B2 | 1/2006 | Kohar | |
| 7,039,420 B2 | 5/2006 | Koskinen et al. | |
| 7,065,348 B1 | 6/2006 | Aoki | |
| 7,068,309 B2 | 6/2006 | Toyama et al. | |
| 7,072,667 B2 | 7/2006 | Olrik et al. | |
| 7,092,943 B2 | 8/2006 | Roese et al. | |
| 7,098,795 B2 | 8/2006 | Adamczyk et al. | |
| 7,116,985 B2 | 10/2006 | Wilson et al. | |
| 7,120,418 B2 | 10/2006 | Herajarvi et al. | |
| 7,177,933 B2 | 2/2007 | Foth | |
| 7,181,227 B2 | 2/2007 | Wilson et al. | |
| 7,190,960 B2 | 3/2007 | Wilson et al. | |
| 7,203,502 B2 | 4/2007 | Wilson et al. | |
| 7,236,799 B2 | 6/2007 | Wilson et al. | |
| 7,295,556 B2 | 11/2007 | Roese et al. | |
| 7,532,900 B2 | 5/2009 | Wilson et al. | |
| 7,937,092 B2 * | 5/2011 | Shim | 455/456.1 |
| 8,007,362 B2 | 8/2011 | Aoyama et al. | |
| 8,050,690 B2 | 11/2011 | Neeraj | |
| 8,686,852 B2 * | 4/2014 | Ben-Dayan et al. | 340/539.13 |
| 2001/0029174 A1 | 10/2001 | Herajarvi et al. | |
| 2001/0054072 A1 | 12/2001 | Discolo et al. | |
| 2002/0022488 A1 | 2/2002 | Srinivasan et al. | |
| 2002/0038234 A1 | 3/2002 | Fu et al. | |
| 2002/0077123 A1 | 6/2002 | Otsuka et al. | |
| 2002/0086683 A1 | 7/2002 | Kohar et al. | |
| 2002/0101335 A1 | 8/2002 | Ghabra et al. | |
| 2002/0102989 A1 | 8/2002 | Calvert et al. | |
| 2002/0120697 A1 | 8/2002 | Generous et al. | |
| 2002/0128850 A1 | 9/2002 | Chen et al. | |
| 2002/0154622 A1 | 10/2002 | Hammel et al. | |
| 2002/0160766 A1 | 10/2002 | Portman et al. | |
| 2003/0004776 A1 | 1/2003 | Perrella et al. | |
| 2003/0013456 A1 | 1/2003 | Bates et al. | |
| 2003/0040340 A1 | 2/2003 | Smethers | |
| 2003/0066031 A1 | 4/2003 | Laane | |
| 2003/0109266 A1 | 6/2003 | Rafiah et al. | |
| 2003/0217073 A1 | 11/2003 | Walther et al. | |
| 2004/0103024 A1 | 5/2004 | Patel et al. | |
| 2004/0192299 A1 | 9/2004 | Wilson | |
| 2005/0101335 A1 | 5/2005 | Kelly et al. | |
| 2005/0143097 A1 | 6/2005 | Wilson et al. | |
| 2005/0265264 A1 | 12/2005 | Hering et al. | |
| 2005/0273372 A1 | 12/2005 | Bowne et al. | |
| 2006/0246920 A1 * | 11/2006 | Shim | 455/456.2 |
| 2007/0202844 A1 | 8/2007 | Wilson et al. | |
| 2008/0004043 A1 | 1/2008 | Wilson | |
| 2009/0286513 A1 | 11/2009 | Wilson | |
| 2012/0058779 A1 * | 3/2012 | Wang et al. | 455/456.1 |

FOREIGN PATENT DOCUMENTS

| | | |
|---|---|---|
| WO | WO 98/52379 | 11/1998 |
| WO | WO 00/22860 | 4/2000 |
| WO | WO 02/25986 | 3/2002 |

OTHER PUBLICATIONS

Cosmiverse Staff Writer, "GPS cell phone tracking used on errant lovers," Cosmiverse Paranormal News, 2001, 2 pages; www.J.cosmiverse.com/paranormal/09110101.html, downloaded from the internet on Mar. 19, 2002.

GEOEurope, "Location Based Services Heading in the Right Direction?," GEOPlace.com, 2001, Adams Business Media 4 pages; www.geoplace.com/ge/2001/0101/0101 lbs.asp, downloaded from the internet on Jun. 1, 2002.

Heltzel, P., "Track Friends by Phone," Network WorldFusion News, 2000, 3 pages; downloaded from the internet on Mar. 19, 2002.

InirU, "About us," InirU Israel, 1 page; wvvw.iriru.com/companv/about.html, downloaded from the internet on Jun. 11, 2002.

InirU, "P2P services," InirU Israel, 1 page; w w w .iriru.com/company/about.html, downloaded from the internet on Jun. 11, 2002.

InirU, "M-commerce," InirU Israel, 1 page; www.iriru.com/company/about.html, downloaded from the internet Jun. 11, 2002.

InirU, InirU Application Developers Program, InirU Israel, 2 pages; www.iniru.com/comQany/about.html, downloaded from the internet on Jun. 11, 2002.

InirU, "Technology," InirU Israel, 1 page; vvwvv.iniru.com/comQanv/about.htmi, downloaded from the internet on Jun. 11, 2002.

L.I.F. Location Inter-operability Forum, Oh no! Now my friends are stalking me! LIF Post Conference Workshop, date unknown, 1 page.

SignaiSoft RTM, "Wireless location services, Friend Finder™," 2000, 2 pages; wvvw.signalsoftcorQ.com, downloaded from the internet on Jun. 11, 2002.

SignaiSoft RTM, "Wireless Location services, IN Location TM ," 2000, 2 pages; www.signalsoftcorp.com, downloaded from the internet on Jun. 11, 2002.

SignaiSoft RTM, "Wireless Location services, Location Manager™," 2000, 2 pages; www.signalsoftcorp.com, downloaded from the internet on Jun. 11, 2002.

(56) References Cited

OTHER PUBLICATIONS

SignaiSoft RTM, "Wireless Location Services, Location Studio™," 2000, 2 pages, www.signalsoftcorp.com, downloaded from the internet on Jun. 11, 2002.

SignaiSoft RTM, "Wireless Location Services, Safety First™," 2000, 2 pages; www.signalsoftcorp.com, downloaded from the internet on Jun. 11, 2002.

Valis, Ltd., Valis is the First Multi Channel Company in the Cellular Areas; Valis the multichannel company, 2002, 1 page; -..www.valis. com, downloaded from the internet on Jun. 11, 2002.

Webraska, "Applications," Webraska Mobile Technologies, 2002, 1 page; www.webraska.it/index.php, downloaded from the internet on Mar. 19, 2002.

Webraska, "Telecommunications Products Overview," Webraska Mobile technologies, 2002, 2 pages; w w w.webraska.com/template. php?i=O&O=products&r=tele.sub.--.prod.sub.--over-, downloaded from the internet on Jun. 11, 2002.

Webraska, Telematics Products Overview, Webraska Mobile Technologies, 2002, 2 pages; www.webraska.com/template.php?I=O &O=products&r=telm.sub.--prod.sub--.over-, downloaded from the internet on Jun. 11, 2002.

Webraska, "SmartZone GeoSpatial platform overview," Webraska Mobile Technologies, 2002, 1 page; vvwvv.webraska.com/template. php?=O&O=products&r=smar.sub.--geos.sub.-- glat-, downloaded from the internet on Jun. 11, 2002.

Webraska, "SmartZone Applications Platform Overview," Webraska Mobile Technologies, 2002, 1 page; w w w .webraska.com/tempiate. php?i=O&O=products&r=smar.sub.--app.sub.-- glat, downloaded from the internet on Jun. 11, 2002.

Webraska, "SmartZone application overview," Webraska Mobile Technologies, 2002, 1 page; Downloaded from the internet on Jun. 11, 2002.

Webraska, "SmartZone datasets overview," Webraska Mobile Technologies, 2002, 1 page; www.webraska.comitempiate.php? i=O &o=products&r=smar.sub.--data, downloaded from the internet on Jun. 11, 2002.

Webraska, "SmartSMS Applications Overview," Webraska Mobile Technologies, 2002, 1 page; www.webraska.com/template.php?I=O &o=products&r=smar.sub.--sms.sub.--apl, downloaded from the internet on Jun. 11, 2002.

Webraska, "SmartZone telematics plastform overview," Webraska Mobile Technologies, 2002, 1 page; w w w.webraska,com/template. hp?I=O&o=products&r=smar.sub.--telm.sub.-- plat, downloaded from the internet on Jun. 11, 2002.

Webraska, "IbDN SDK overview," Webraska Mobile Technologies, 2002, 1 page; www.webraska.com/template. h/I=O&o=products &r=ibdn.sub.--, downloaded from the internet on Jun. 22, 2002.

Webraska, "IbDN tracking overview," Webraska Mobile Technologies, 1 page; www.webraska.com/temglate.phg?I=O&o=products &r=ibdn.sub.--trac, downloaded from the internet on Jun. 11, 2002.

Webraska, "IbDN Fleet Overview," Webraska Mobile Technologies, 2002, 1 page; www.webraska.com/template.php?I=products &r=ibdn.sub.--fee, downloaded from the internet on Jun. 11, 2002.

"Kivera Powers AT&T Wireless, "Find Friends" application" CNNMoney, 2002, 3 pages; http://money:.cnn.com/services/ ticketheadlines/bw/22•176448.htm, downloaded from the internet on Jun. 25, 2002.

"AT&T Wireless enables family and friends to share information about their whereabouts through their wireless phones," AT&T Wireless, 2002, 3 pages; http://www.attwireless.com/press/releases/ 062402.html, downloaded from the internet on Jun. 26, 2002.

\* cited by examiner

User's Public Profile

| First Name | <alphanumeric> | 3502 |
|---|---|---|
| Last Name | <alphanumeric> | 3504 |
| City | <alphanumeric> | 3506 |
| State | <alphanumeric> | 3508 |
| Email Address | <email address> | 3510 |
| Zip Code | <integer> | 3512 |
| User Image | <image file> | 3514 |
| Age | <integer> | 3516 |
| Interest/Hobby 1 | <alphanumeric> | 3518 |
| Interest/Hobby 2 | <alphanumeric> | 3520 |
| Interest/Hobby 3 | <alphanumeric> | 3522 |
|  |  |  |

Table of Friends Who Have Granted User Permission to Receive Their Location ("Friends List")

| Locate Flag | Friend |  |  |
|---|---|---|---|
| X | Friend 1 | <UsernameFriend1> | 3602 |
|  | Friend 2 | <UsernameFriend2> | 3604 |
| X | Friend 3 | <UsernameFriend3> | 3606 |
|  | Friend 4 | <UsernameFriend4> | 3608 |
|  | Friend 5 | <UsernameFriend5> | 3610 |
|  |  |  |  |

Table of Friends Who the User Has Granted Permission to Receive His/Her Location ("Friend's List of Friends")

| Locate Flag | Friend | | |
|---|---|---|---|
| | Friend 1 | \<UsernameFriend1\> | 3702 |
| X | Friend 2 | \<UsernameFriend2\> | 3704 |
| | Friend 3 | \<UsernameFriend3\> | 3706 |
| X | Friend 4 | \<UsernameFriend4\> | 3708 |
| | Friend 5 | \<UsernameFriend5\> | 3710 |
| | | | |

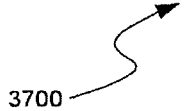

Table of Friends Who the User Wishes to Always Deny His/Her Location ("Deny Always List")

| Locate Flag | Friend | | |
|---|---|---|---|
| | Friend 1 | \<UsernameFriend1\> | 3802 |
| | Friend 2 | \<UsernameFriend2\> | 3804 |
| | Friend 3 | \<UsernameFriend3\> | 3806 |
| | Friend 4 | \<UsernameFriend4\> | 3808 |
| X | Friend 5 | \<UsernameFriend5\> | 3810 |
| | | | |

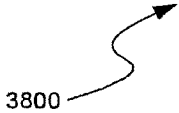

Friend Data

| Username | <alphanumeric username> | 3902 |
|---|---|---|
| Mobile Number | <10 digit integer> | 3904 |
| Email Address | <email address> | 3906 |
| Instant Messaging Handle | <IM username> | 3908 |
| Username Alias | <alphanumeric name> | 3910 |
| User Image | <image file> | 3912 |
|  |  |  |

Table of Options for Affecting User Location Data
("Invisibility Options List")

| Locate Flag | Variable | | |
|---|---|---|---|
| Set On | Friend 1 | <UsernameFriend1> | 4002 |
| On | Friend 2 | <UsernameFriend2> | 4004 |
|  | Friend 3 | <UsernameFriend3> | 4006 |
| Set Off | Schedule 1 | <before 6:00 AM> AND <after 10:00 PM> | 4008 |
|  | Schedule 2 | <12:00PM to 1:00PM> | 4010 |
| Off | Schedule 3 | <every Friday> | 4012 |
| Set Off | Location 1 | <more than 50 mi. radius> | 4014 |
|  | Location 2 | <within 30 mi. radius of zip code 70047> | 4016 |
| Off | Location 3 | <Tacoma> | 4018 |
| On | Custom 1 | <UsernameFriend3> AND <12:00PM to 1:00PM> | 4020 |
|  |  |  |  |

APPARATUS AND SYSTEMS FOR PROVIDING LOCATION-BASED SERVICES WITHIN A WIRELESS NETWORK

CROSS-REFERENCE TO RELATED APPLICATIONS

The instant application is continuation of, and claims priority to, U.S. patent application Ser. No. 13/274,953, filed Oct. 17, 2011. U.S. patent application Ser. No. 13/274,953 is a divisional application of U.S. patent application Ser. No. 12/412,640, filed Mar. 27, 2009, which issued with U.S. Pat. No. 8,068,857 on Nov. 29, 2013. U.S. patent application Ser. No. 12/412,640 is a continuation of U.S. patent application Ser. No. 11/766,304, filed Jun. 21, 2007, which issued with U.S. Pat. No. 7,532,900, on May 12, 2009. U.S. patent application Ser. No. 11/766,304 is a continuation of U.S. patent application Ser. No. 10/325,270, filed Dec. 20, 2002, which issued with U.S. Pat. No. 7,236,799 on Jun. 26, 2007. U.S. patent application Ser. No. 10/325,270 claims benefit of U.S. provisional patent application No. 60/388,944, filed Jun. 14, 2002. U.S. patent application Ser. No. 10/325,270 also claims benefit of U.S. provisional patent application No. 60/388,942, filed Jun. 14, 2002.

U.S. patent application Ser. No. 13/274,953 is incorporated by reference herein in its entirety. U.S. patent application Ser. No. 12/412,640 is incorporated by reference herein in its entirety. U.S. patent application Ser. No. 11/766,304 is incorporated by reference herein in its entirety. U.S. patent application Ser. No. 10/325,270 is incorporated by reference herein in its entirety. U.S. provisional patent application No. 60/388,944 is incorporated by reference herein in its entirety. U.S. provisional patent application No. 60/388,942 is incorporated by reference herein in its entirety. U.S. Pat. No. 8,068,857 is incorporated by reference herein in its entirety. U.S. Pat. No. 7,532,900 is incorporated by reference herein in its entirety. U.S. Pat. No. 7,236,799 is incorporated by reference herein in its entirety.

This application is related to U.S. patent application Ser. No. 10/324,984, filed Dec. 20, 2002, now U.S. Pat. No. 7,203,502, entitled "System For Providing Location-Based Services In A Wireless Network, Such As Locating Individuals And Coordinating Meetings," U.S. patent application Ser. No. 10/325,566, filed Dec. 20, 2002, now U.S. Pat. No. 7,190,960, entitled "System For Providing Location-Based Services In A Wireless Network, Such As Modifying Locating Privileges Among Individuals And Managing Lists Of Individuals Associated With Such Privileges," U.S. patent application Ser. No. 10/325,032, filed Dec. 20, 2002, now U.S. Pat. No. 7,181,227, entitled "Data Structures And Methods For Location-Based Services Within A Wireless Network," and U.S. patent application Ser. No. 10/325,322, filed Dec. 20, 2002, now U.S. Pat. No. 7,116,985, entitled "Method For Providing Location-Based Services In A Wireless Network, Such As Varying Levels Of Services."

BACKGROUND

"Where am I?" "Where are you?" "Where is it?" are questions often asked, but not always easily answered. Global positioning system (GPS) and similar location determining devices have allowed users to locate themselves on our planet. Together with mapping software, the GPS network allows users to identify themselves with respect to landmarks, streets, and the like. These and other location determining systems have been used with vehicles (often referred to as "telematics").

Such telematic systems help users identify where their vehicles are with respect to an electronic map to determine directions to a location. A user can input a destination on such telematic systems, and mapping software (often stored in the vehicle with a database of maps) helps determine an appropriate route for the vehicle using an associated GPS device. The mapping software and associated maps may include lists of addresses or points of interest (POIs) to which the system may compute a route.

Fleet tracking systems or automatic vehicle location (AVL) systems allow a central location to track the locations of various vehicles in a fleet, where each vehicle includes a onboard system having wireless circuitry to provide the position of a vehicle in the fleet to the central location. Examples of such systems are provided by, for example, Qualcomm of San Diego, Calif.

Certain services, such as Maps.com, allow users to access a large database of maps and request directions or routes from a starting point to an ending point. If a user has a wireless, Internet-enabled device, such as a wireless palmtop computer, the user may then access such maps and associated directions wirelessly.

Three patents and one patent application in this area are U.S. Pat. Nos. 6,212,392, 6,321,092 and 6,381,535 and PCT/DK99/00548, respectively.

BRIEF DESCRIPTION OF THE DRAWINGS

FIG. 35 is a data diagram illustrating a user's public profile.

FIG. 36 is a data diagram illustrating a table of friends who have granted the user permission to receive their location.

FIG. 37 is a data diagram illustrating a table of friends who the user has granted permission to receive his or her location.

FIG. 38 is a data diagram illustrating a table of friends who the user wishes to always deny his or her location.

FIG. 39 is a data diagram illustrating a friend data record.

FIG. 40 is a data diagram illustrating a table of options for affecting user location data.

Figure 1A:
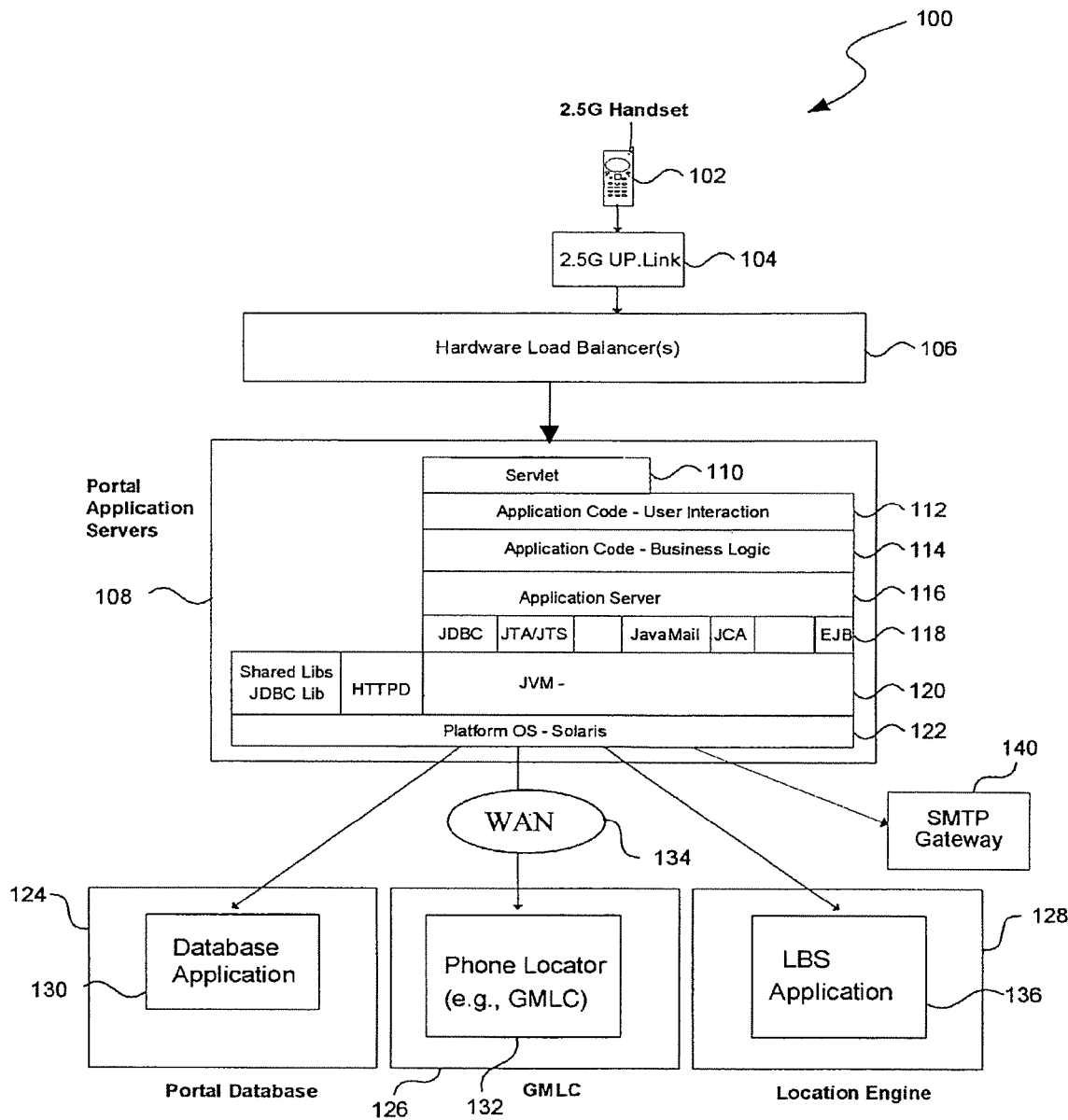
FIG. 1A is a block diagram of a suitable system for employing a location determining system under embodiments of the invention.

The headings provided herein are for convenience only and do not necessarily affect the scope or meaning of the claimed invention.

In the drawings, the same reference numbers identify identical or substantially similar elements or acts. To easily identify the discussion of any particular element or act, the most significant digit or digits in a reference number refer to the Figure number in which that element is first introduced (e.g., block 1702 is first introduced and discussed with respect to FIG. 17).

A portion of this disclosure contains material to which a claim for copyright is made. The copyright owner has no objection to the facsimile reproduction by anyone of the patent disclosure (including Figures), as it appears in the United States Patent and Trademark Office patent file or records, but reserves all other copyright rights whatsoever.

DETAILED DESCRIPTION

Described in detail below is a system and associated method that allows users to locate friends or other contacts, businesses, points of interest (POIs) or other locations, and manage this information in a user-friendly environment. A user with a wireless device, such as a cellular phone, may identify the locations of select individuals (via their wireless devices). Likewise, the user may receive directions to a desired location, and even coordinate a meeting place with a friend. For example, the user may notify a friend or other person about wishing to meet, identify a location nearby, and receive directions, all via a central system that coordinates the meeting, including RSVPs (reply or response) and other messages.

Aspects of the system allow a user to identify, effectively in one step, a location of a friend. Users can modify privileges quickly and in near real time. For example, a user may always deny requests to become another's friend for purposes of various location services. Likewise, the user may remove him or herself from a friend's list at any time, but later then request that they be added to that friend's list. Various other features are described in detail herein.

In a broad sense, embodiments of the invention relate to location-based services in a system for providing wireless telecommunications services to mobile devices. The system obtains a request from a first mobile device for a meeting with a person associated with a second mobile device. The system automatically determines locations of the first and second mobile devices, and automatically provides information to at least the first or second mobile device regarding a meeting location based at least in part on the determined location of the first or second mobile device. The system can also determine a local time, or time zone, of the first or second mobile devices, and with one or a minimum number of menu choices, a user of a mobile device may readily receive a location of a user or another mobile device.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

A representative system in which functionality described herein will first be described. Representative message flows performed by the representative system will then be discussed with respect to adding a "friend," obtaining directions, meeting friends and finding locations. Thereafter, a representative user interface and location-based functionality is described. Finally, representative data structures are described.

Representative System

Referring to FIG. 1A, a system 100 is shown where a wireless device or mobile unit 102 (shown as a 2.5G GPRS-enable mobile handset) communicates wirelessly to a 2.5G uplink 104. A typical 2.5G uplink 104 includes multiple components not shown, such as (in order), a base transceiver station (BTS), a base station controller (BSC), and in a General Packet Radio Service (GPRS), a Gateway Serving GPRS Support Node (SGSN), a GPRS wide area network (WAN), a Gateway GPRS Support Node (GGSN), a wireless access protocol (WAP) gateway, and other components known by those skilled in the relevant art. Of course, while a 2.5G network and wireless device are shown, embodiments of the invention may be used in various other wireless systems.

One or more load balancers 106 (such as Alteon load balancers by Nortel of Canada) receive communication packets from (or provide packets to) the wireless device 102 via the uplink 104. A portal application server or servers 108 communicate with the one or more optional load balancers 106. The portal application servers 108 include various components.

For example, the application server 108 includes a servlet 110, which may be a JAVA application for handling location requests to or from the wireless device 102. User interaction and business logic application code 112 and 114, respectively, work in conjunction with the servlet 110 and an application server 116. The user interaction and business logic code, as well as the application server, provide much of the functionality described herein. The application server 116 may be a WebLogic server provided by BEA of San Jose, Calif.

Working below the application server 116 is an application programming interface (API) layer 118 that includes various APIs, such as Java Database Connectivity (JDBC), JAVA Transaction API (JTA)/JAVA Transaction Service (JTS), JavaMail, JAVA Cryptography Architecture (JCA) and EnterpriseJavaBeans (EJB).

Working below the API layer 118 is a JAVA Virtual Machine (JVM) 120, such as Hotspot by Sun Microsystems of Santa Clara, Calif. A suitable operating system 122, such as Solaris by Sun Microsystems, interfaces with the JVM 120, as well as a hypertext transfer protocol daemon (HTTPD, e.g., that is provided by Apache), and JDBC and shared libraries. In general, a single server may be used to track all sessions for a given wireless device (based on, for example, the internet protocol (IP) address, Electronic Serial Number (ESN), Mobile Station ISDN (MSISDN) or some other unique identifier). This makes it easier for the system to track sessions for a given device.

The application server 108 interacts with four components: a portal database 124, a Gateway Mobile Location Center (GMLC) 126, a location engine 128, and a Simple Mail Transfer Protocol (SMTP) gateway 140 or other electronic messaging/mail service. The portal database 124 includes a database application 130, such as those provided by Oracle of Redwood Shores, Calif. The portal database 124 stores much of the location-based information, friends lists, pending requests, etc., described herein.

The GMLC 126 includes a phone locator subsystem 132 that works with the GMLC 126, such as the e-Mobility Location Center provided by Nortel. A WAN 134 connects the GMLC 126 with the application server 108. The phone locator 132 provides a GMLC API for providing the latitude and longitude information over the WAN 134 for use by the application server 108 or location engine 128. The GMLC 126 provides location data to the location engine 128 and other location service clients that may interface with it. The phone locator subsystem 132 provides latitude and longitude information about the cell site to which a subscriber is connected. Alternatively, the phone locator subsystem 132 can provide the latitude and longitude coordinates of the wireless device 102 within the cell site.

A Location Based Service (LBS) application 136 operates on the location engine 128. The location engine 128 and LBS application 136 may be provided by, for example, Kivera of Oakland, Calif. The LBS application 136 provides geo-coding (providing latitude and longitude based on an address), reverse geo-coding (providing address information based on latitude and longitude), proximity searching (providing items within a predetermined proximity, including points of interest information), routing (providing directions from a first to a second point), and map generation (generating maps of locations and directions). The LBS application 136 provides this functionality as a set of classes that connect to the location engine 128 via a Java-based connection pooling class, which, in turn, attaches to a load balancer, such as the load balancer 106. This class is responsible for maintaining a set of connections, providing keep-alive reconnect functionality, etc. The load balancer 106 may provide a virtual address space to the Location Engine 128 and automatic fail-over.

While shown together as a single block in FIG. 1A, the portal application servers 108 are logically separate functions. A portal server provides much of the communication handling with the mobile devices. One or more application servers provide many of the location functions described herein, such as the meet friends functionality. Prior systems provided some location functionality at the GMLC or as middleware. However, as described herein, the portal server is tied closely with the application servers such that authentication and access control, as well as querying location and providing location-based services, are more intimately integrated. Subscriber information is tied more closely with location-based information and other information. Thus, as described below, when the user receives notification that a friend is attempting to locate him or her, the user receives the friend's mobile number, email address, portal subscriber/username, or other information with respect to the friend. Such a configuration provides privacy and control because the portal, subscriber and other applications are within a common network (such as a LAN), all on one side of a firewall (where the firewall may be typically located between the uplink 104 and the load balancers 106). Thus, while the terms "portal," "portal server," "application server," and the like are used interchangeably herein, those skilled in the relevant art will recognize that such servers are logically separate entities.

The portal application server 108, the portal database 124, GMLC 126 and location engine 128 may be provided together on one physical server, or divided each among one or more separate servers. The portal database 124, or other mass storage described herein, may be implemented by storage devices provided by EMC of Massachusetts. The location engine 128 may be implemented on, for example, a Netra 20 server by Sun Microsystems.

Various alternative system configurations are possible beyond those shown in FIG. 1A. For example, while one or more servers may be co-located, some servers may be remotely located and connected to the remaining components by way of, for example, a virtual private network (VPN). Firewalls and encryption may well be required for security. Alternatively, an application service provider (ASP) model may be provided where the various functions are performed by various servers, which may be either remotely distributed or co-located. However, the applications, such as the LBS application, may be maintained by a third party. Mass storage may be employed as a Storage Area Network (SAN), a Network Attached Storage System (NAS), or other known mass storage systems.

While a mobile phone is shown in FIG. 1A, those skilled in the relevant art will appreciate that the invention can be practiced with other devices and configurations, including Internet appliances, hand-held devices, wearable computers, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer" or "wireless device," as used generally herein, refers to any of the above devices and systems, as well as any data processor.

Figure 1B:
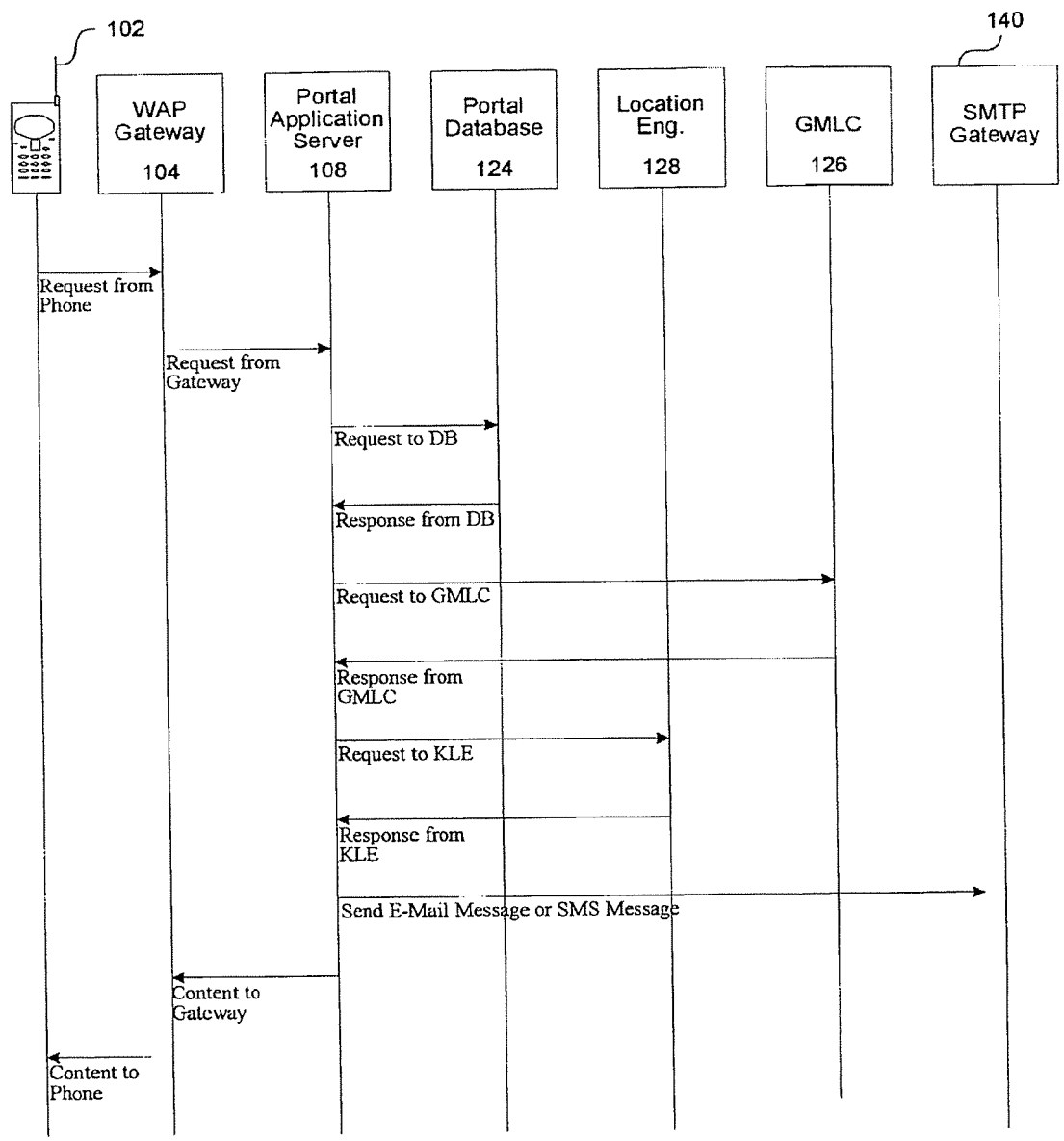
FIG. 1B is a flow diagram showing an example of communication data between the blocks shown in FIG. 1A.

FIG. 1B shows an example of a high-level call or message flow diagram whereby the wireless device 102 requests, for example, directions. As shown, a wireless WAP gateway (forming part of the uplink 104) receives a request from the device and provides it to the portal application server 108. (The portal application server is generally referred to interchangeably herein as the "portal" or "application server," unless the context clearly requires otherwise.) The portal database 124 receives the request from the portal application server 108, and provides back information, such as an IP address or other information regarding the registered user of the wireless device 102. The portal application server 108 then provides a request to, and receives location information from, the GMLC 126. Thereafter, the portal application server 108 provides a request to, and receives directions information from, the location engine 128 based on the location of the wireless device provided by the GMLC 126. The portal application server 108 may then send email or Short Message Service (SMS) messages to the mobile device (or other device) by way of the SMTP gateway 140. The portal application server 108 also provides the content (in this case directions) to the WAP gateway, which, in turn, provides the content to the mobile device. Alternatively, rather than sending email as SMTP messages, the portal application server 108 may send Short Message Peer-To-Peer Protocol (SMPP) messages. Rather than email messages, such as email alert messages, the portal application server 108 may push WAP messages to the user's (or friend's) mobile device.

A benefit of the system configuration noted above is reducing latency for providing location-based services. For example, no wide area network (WAN) connections are necessary to get information. Another advantage is an increase in privacy or security for location-based services. Only one service provider has access to a database containing user or subscriber information. Subscriber information need not be shared with third parties, or transmitted over public networks.

Figure 2A:
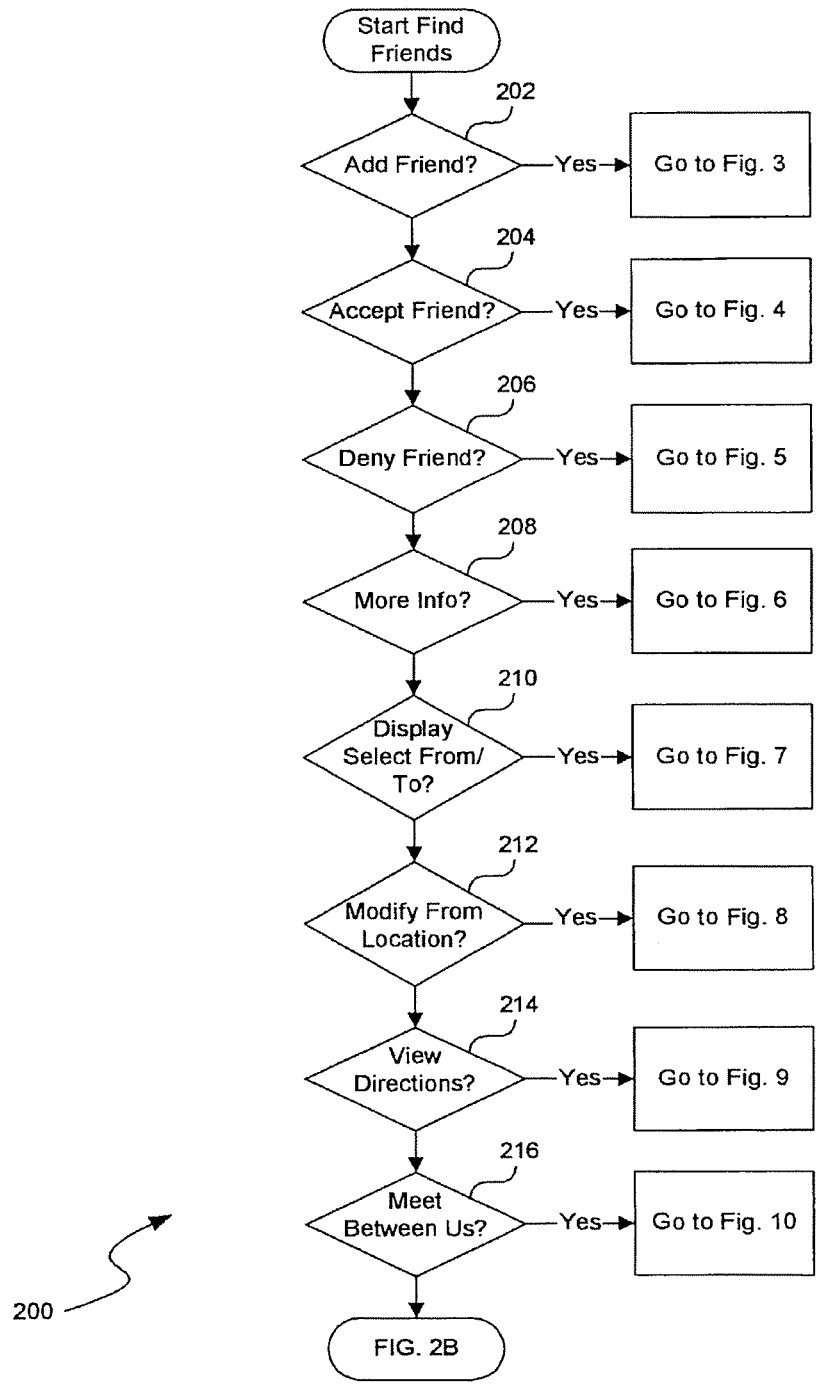
FIGS. 2A and 2B together are a flow diagram illustrating some functionality that may be performed by the system of FIG. 1A.
Figure 2B:
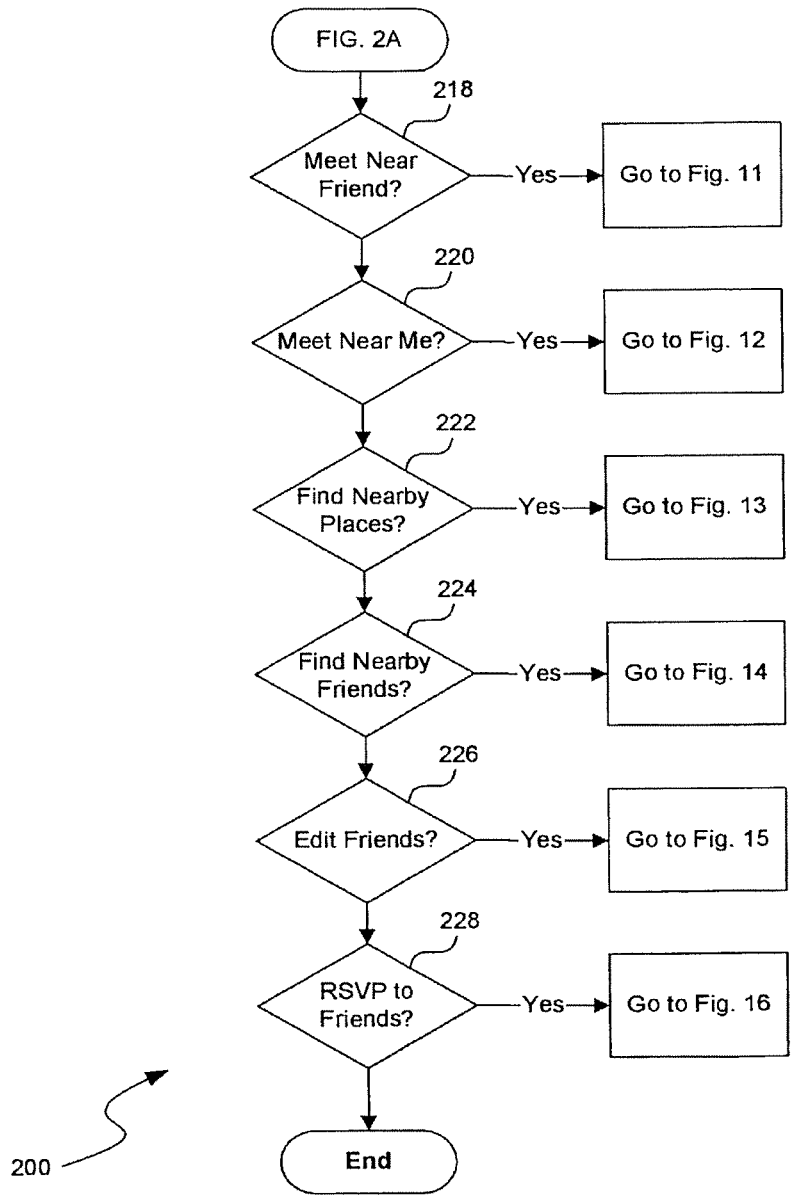

Further, as described below, the location-based service functionality described herein provides an "opt-in" model whereby location information is only provided after users first agree to the system providing such information to others.
Representative Message Flows Referring to FIGS. 2A and 2B, some functionality performed by the system 100 is shown as a routine 200. Beginning in block 202, the routine determines whether a user wishes to add friends, and if so, the routine branches to perform the message flow shown in FIG. 3. Under blocks 204 and 206, the user can determine whether to accept or deny a friend, and if so, the routine branches to perform the message flows of either FIG. 4 or 5, respectively.

Figure 6:
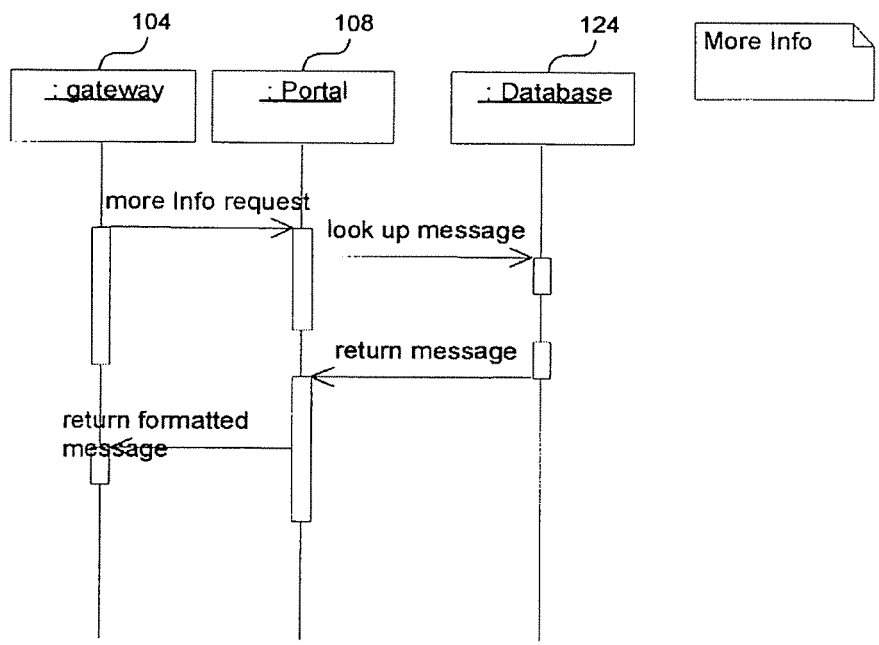
FIG. 6 is a flow diagram of a routine for requesting more information.

In block 208, the routine 200 determines whether the user requests more information, and if so, branches to perform the message flow of FIG. 6. In blocks 210 and 212, the routine determines whether the user wishes to alter the display select or modify location, and if so, the routine branches to perform the message flow of FIG. 7A or 8, respectively.

Figure 9:
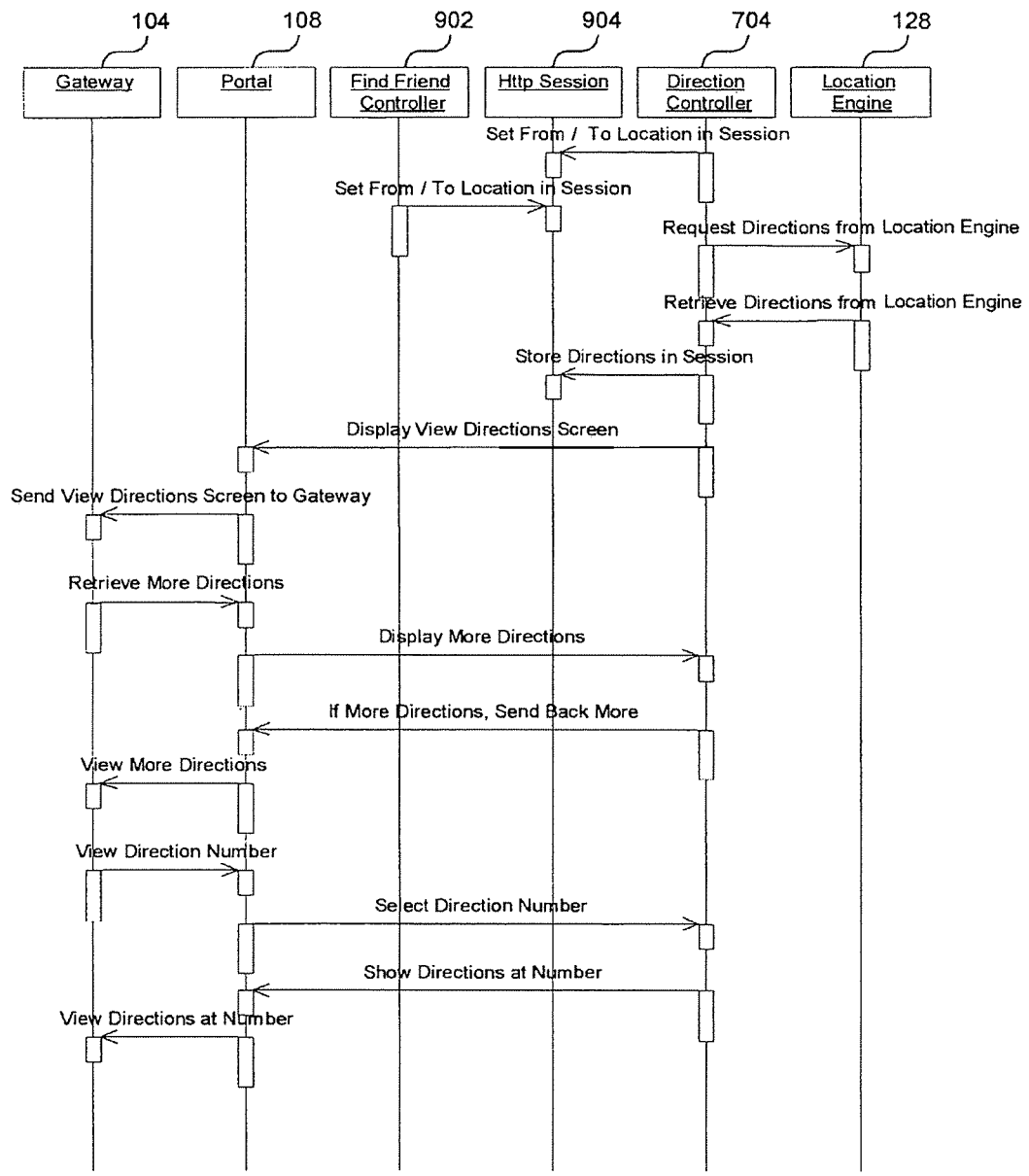
FIG. 9 is a flow diagram to permit directions to be viewed.

In block 214, the routine 200 determines whether the user wishes to view directions, and if so, the routine branches to perform the message flow shown in FIG. 9. In blocks 216, 218 and 220, the routine 200 determines whether the user wishes to meet a friend at a location between the two of them, near the friend, or near the user, and if so, the routine branches to perform the message flows of FIGS. 10, 11 and 12, respectively.

Figure 13:
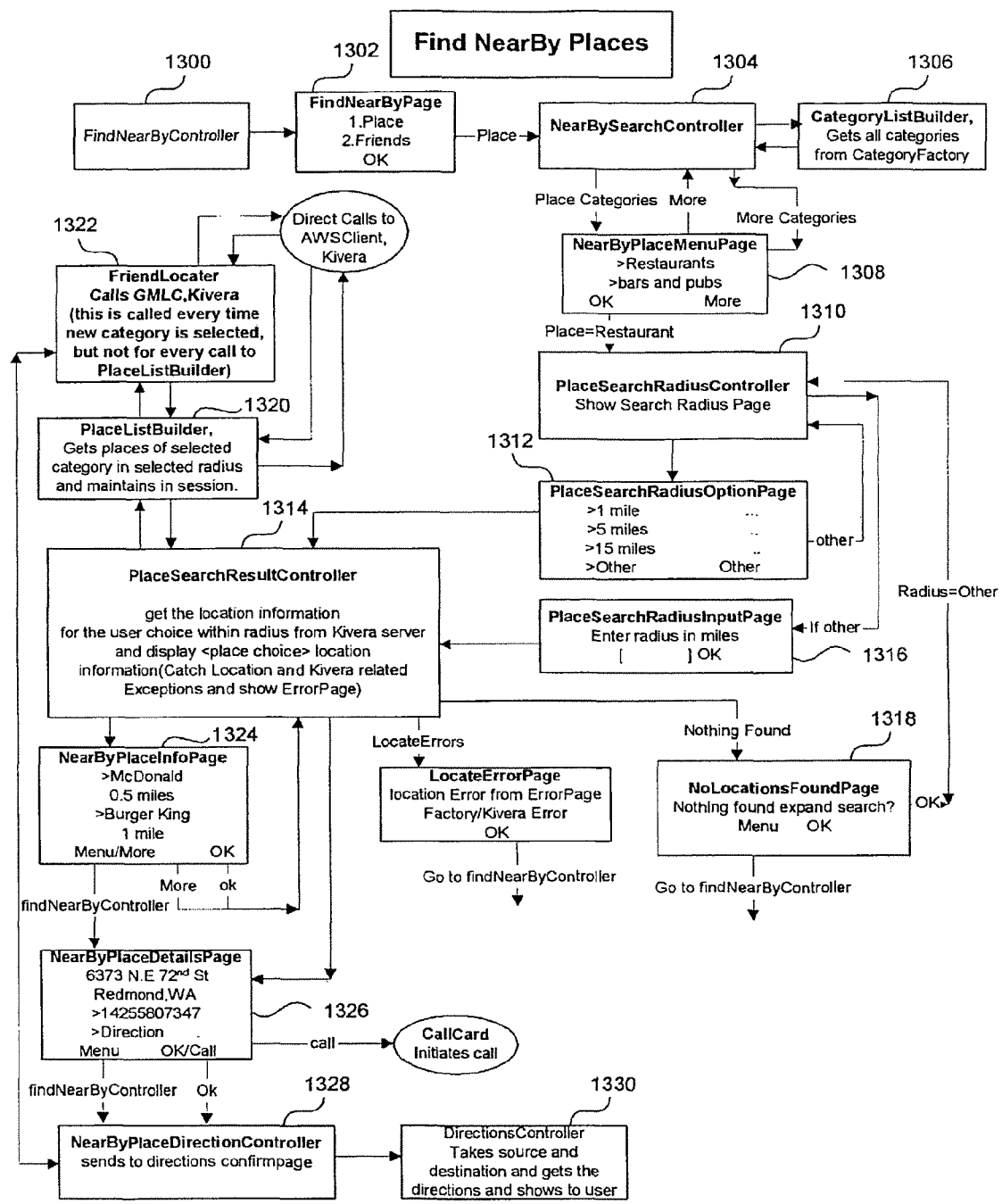
FIG. 13 is a data and function flow diagram of a Find Nearby Places routine.

In block 222, the routine 200 determines whether the user wishes to find nearby places, and if so, the routine branches to perform the functions shown in FIG. 13. In block 224, the routine determines whether the user wishes to find nearby friends, and if so, branches to perform the functions shown in FIG. 14. In block 226, the routine determines whether the user wishes to edit a list of friends, and if so, branches to perform the functions shown in FIG. 15. In block 228, the routine determines whether the user wishes to RSVP to friends, and if so, branches to perform the functions shown in FIG. 16.

The routine 200 and others described herein may be implemented as computer-executable instructions, such as routines executed by a general purpose computer (e.g., a server or personal computer). Such instructions may be stored or distributed on computer-readable media, including magnetic and optically readable and removable computer disks, hardwired or preprogrammed in chips (e.g., EEPROM semiconductor chips or ASICs), as well as distributed electronically over the Internet or over other networks (including wireless networks). Those skilled in the relevant art will recognize that portions of some embodiments of the invention may reside on a server computer, while corresponding portions may reside on a client computer or wireless device. Data structures and transmission of data particular to aspects of the invention are also encompassed within the scope of the invention. In general, while hardware platforms, such as the system 100, are described herein, aspects of the invention are equally applicable to nodes on a network having corresponding resource locators or addresses to identify such nodes for data routing and requesting execution of commands.

Referring to FIGS. 3-12, representative message or data flow diagrams depict exchange of communications between the gateway and other components of the uplink 104, the portal application server 108, and other components of the system 100. These and other flow diagrams do not show all functions or exchanges of data, but instead provide an understanding of commands and data exchanged under the system. Of course, those skilled in the relevant art will recognize that some functions or exchange of commands and data may be repeated, and other (less important) aspects not shown may be readily implemented.

Adding "Friends"

Figure 3:
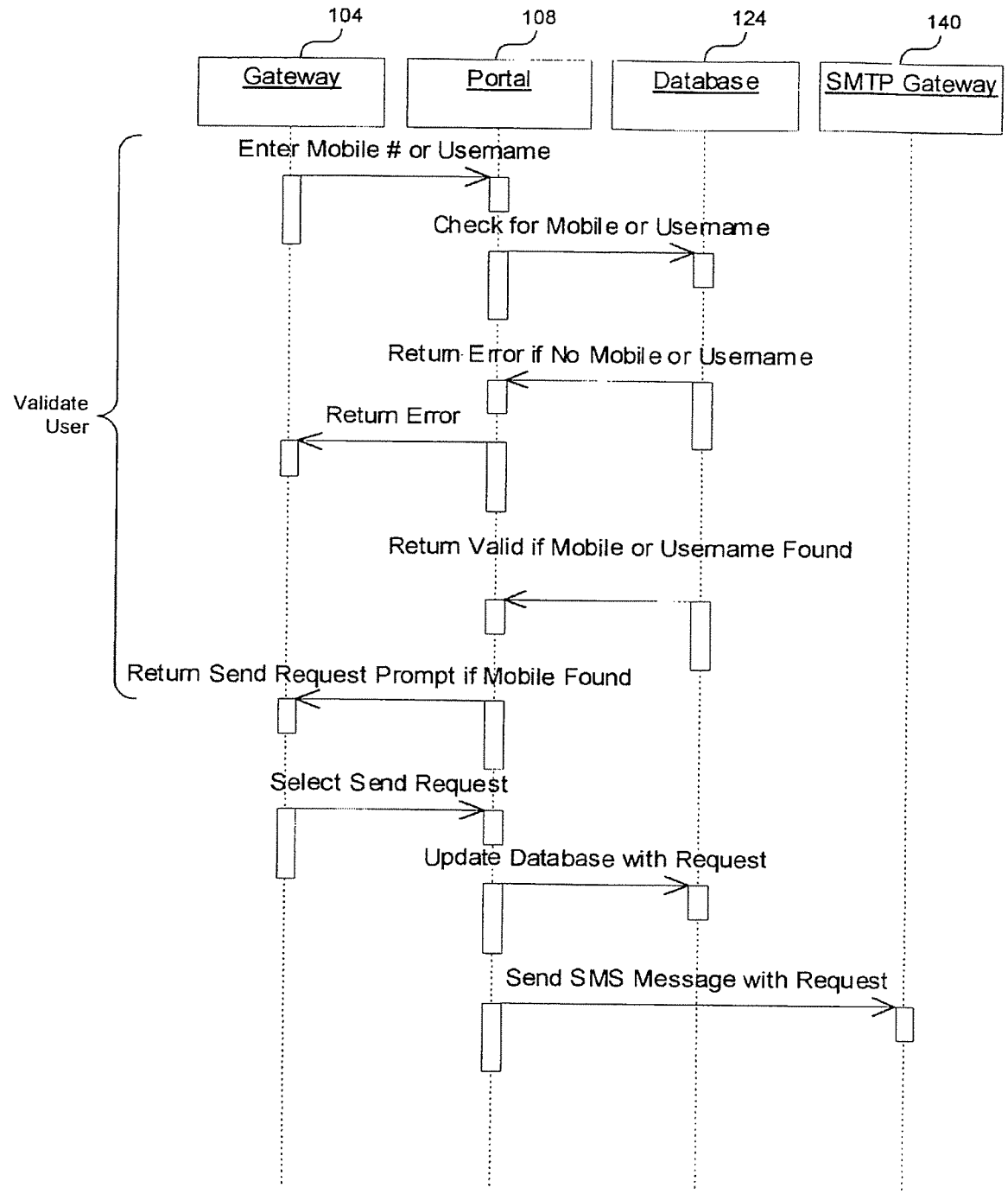
FIG. 3 is a flow diagram of an Add Friend routine.

Referring to FIG. 3, a representative call or message flow diagram for allowing a user to add a friend under the system 100 is shown. The wireless uplink 104, such as the WAP gateway, receives a request from the wireless device 102 to enter a new "friend" into the user's database of friends. The term "friend" as generally used herein refers not only to any acquaintance or other person with whom the user wishes to interact, but any addressable wireless device. Indeed, the terms "user" and "subscriber" are used interchangeably, and refer to a given individual employing or otherwise effected by functionality or systems described herein. A "subscriber" need not necessarily be one who subscribes to the location-based services described herein. With respect to system functionality, the terms "friend," "user," "subscriber," and the like are logically equivalent, and represent any data that the system uses to track and manage wireless devices. The invention may be used for providing location-based services with respect to one or more wireless devices in a group or nodes in any network.

The flow of FIG. 3 begins by the gateway 104 receiving a request from a wireless device 102 to add a friend to a database of friends associated with the wireless device 102. The gateway 104 receives a mobile number or username associated with the wireless device 102, and passes this to the portal 108. The database 124 receives a query from the portal 108 to check whether the mobile/username corresponds to a subscriber of the service, or is otherwise authorized, and if not, the database returns an error that is then forwarded by the portal 108 to the gateway 104. The above authorization functions may be performed with most requests to authorize each user of the system.

If the database 124 does identify the mobile number or username in the database 124 and returns a valid response, then the portal 108, in response, sends a request prompt to the wireless device 102 requesting input of information regarding the friend to be added. In response, the gateway 104 receives from the wireless 102 device and provides to the portal 108 information regarding the friend to be added (e.g., a mobile telephone number, URL or other electronic or network address associated with the new friend). The portal 108, in response, sends an update request to the database 124 asking that the database 124 reflect that the user has requested the friend be added to the user's friends list. As explained below, the database 124 stores lists of pending requests and the status of various functions provided by the system 100. The portal 108 may query the database 124 to retrieve the friend's username based on the received MSISDN (mobile telephone number) or other address. The portal 108 may also generate an SMS message or email to send to the friend, asking whether the friend wishes to be added to the user's list of friends, where this SMS message or email is forwarded to the SMTP gateway 140 for delivery to the user over the Internet or other data packet network (not shown).

In addition to having a user request a friend to be added to the user's friends list, the user can also ask to become listed on his or her friend's list. The user simply provides the mobile telephone number, user ID or other identifier for the friend into the portal 108, and the portal 108 then makes an appropriate request to the friend, in much the same manner as described above.

Figure 4:
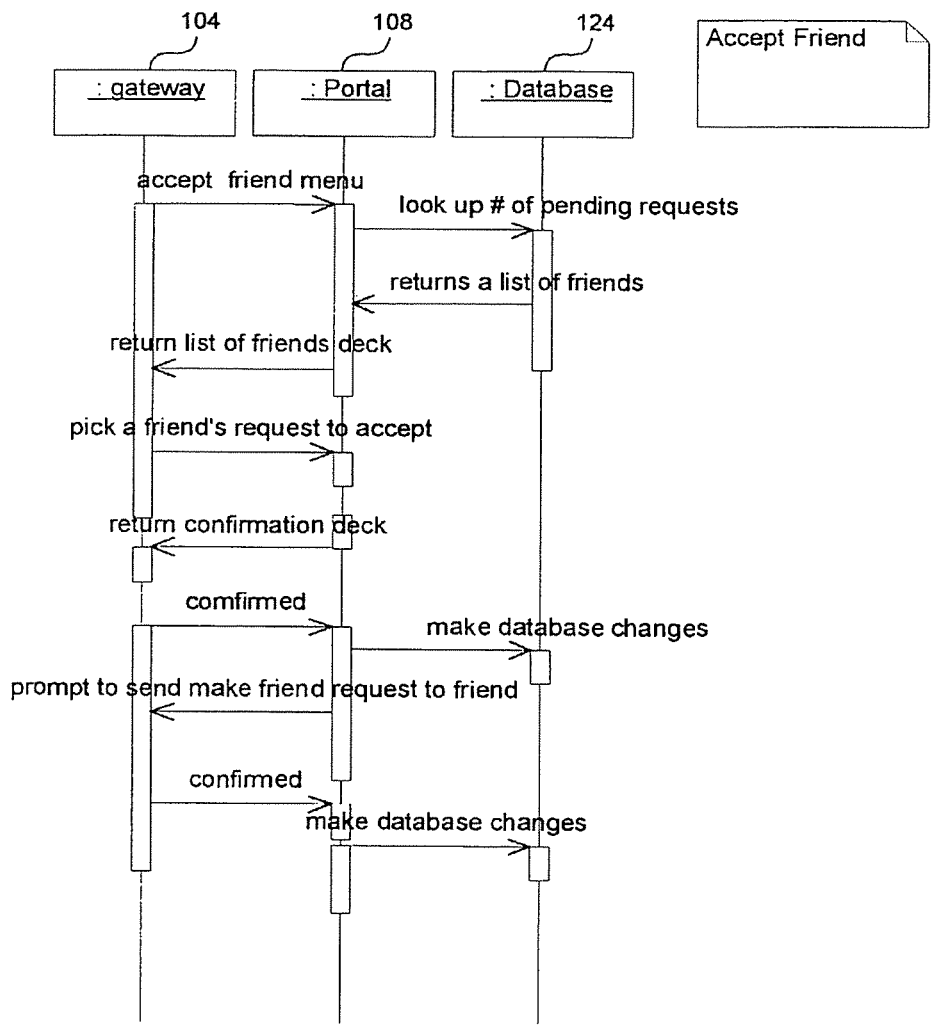
FIG. 4 is a flow diagram of an Accept Friend routine.
Figure 5:
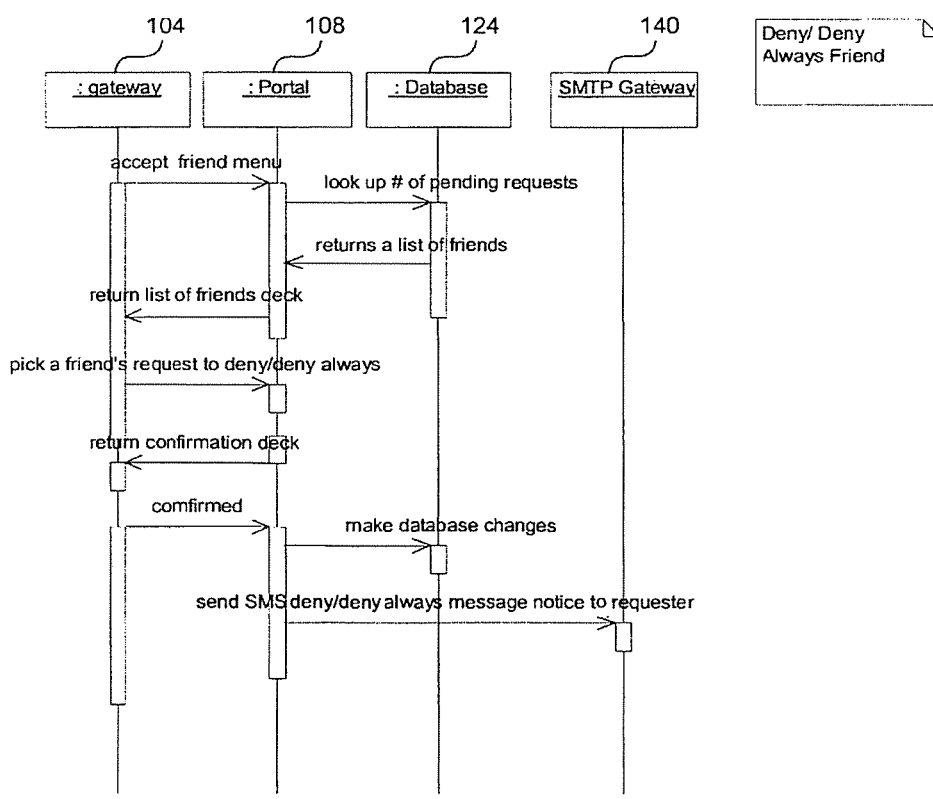
FIG. 5 is a flow diagram of a Deny Friend routine.

The friend may accept or deny the request, which is shown in FIGS. 4 and 5, respectively. Referring to the accept friend flow of FIG. 4, after validating the friend as explained above, the portal 108 receives from the friend's wireless device (via the gateway) a request to view pending friend requests. The database 124 receives a query from the portal 108 to look up pending requests, and returns a list of friends to the portal 108, which the portal 108 delivers to the friend's wireless device via the gateway 104. The portal 108 then receives from the friend's wireless device, via the gateway 104, one of the friend's requests to accept, and resends back a confirmation message. In response thereto, the wireless device provides the portal 108, via the gateway 104, a response to the confirmation message. The portal 108, in turn, requests the database 124 to update the user's list of friends to now include the newly accepted friend.

The portal 108 sends an SMS message to the user indicating that the friend has accepted being added to the user's friends list. (The portal 108 may also send an SMS message reflecting the addition once the database 124 has been updated.) The friend may be listed in the user's friends list under the friend's unique username. Alternatively, the user may be able to change or edit the friend's name appearing on the list to something that the user desires (e.g., an alias).

The system is not reciprocal, in that even though the friend has accepted being added to the user's friends list, this does not mean that the user is automatically added to the friend's list of friends. Thus, the user may be prompted to send a request to the friend, asking the friend whether the friend wishes to locate the user. The portal 108 updates the database 124 to reflect that such a request is pending, and sends an SMS message to the friend asking whether the friend would like to add the user to his or her list of friends.

As explained herein, information displayed to the user (or friends) may be in the form of WAP messages. While not shown in these Figures, the portal 108 and mobile device 102 may receive or exchange multiple transmissions or "cards," that form a "deck" to represent a complete display, command, or other transmission, as is common under WAP.

Referring to the deny friend flow of FIG. 5, after returning a list of pending friend requests as described above for FIG. 4, the portal 108 receives a response from the user of deny request or always deny request rather than an accept request. In response to each pending request to be added to someone's friends list, a user can deny each request from a particular friend individually, but keep open the possibility of later being added to the requestor's friends list, or select an option to deny the current request and always deny future requests from that requester. Regardless of whether the portal 108 receives a response from the user of deny request or always deny request, the portal 108 sends a confirmation message to the friend's wireless device, and receives from the wireless device a response to the confirmation message (all via the gateway 104). The portal 108 then requests that the database 124 make appropriate changes, and then sends an SMS message to the requester indicating whether the user has denied, or always wishes to deny, being added to the requestor's friends list.

Under an alternate embodiment, the user may establish sublists of friends (similar to subfolders). Thus, the user can establish hierarchical friends lists that include certain upper level groupings (e.g., "friends," "clients," "co-workers," etc.), with individual friends provided in one or more of these upper level groupings. The user may thus manage friends lists in a manner similar to that with respect to files and folders under the Windows and other PC operating systems. Furthermore, under this alternative embodiment, the user may select certain friends in a list, but not others (e.g., be able to find the first, third and fourth friends in the list, but not the second and fifth in a list of five friends). Having selected a subset of friends in a list, the user may then perform other functionality described herein, such as automatically and simultaneously locate the subset of friends. The system then simply performs the steps described herein for each of the selected friends in the list.

If the user attempts to add a friend who is not subscribed to a system compatible with system 100, the friend cannot be added to the user's friends list. However, the system could send a predetermined solicitation message (prerecorded voice message, SMS message, etc.) to the requested friend, or alternatively the system could prompt the user to do so, asking the friend whether he or she wishes to become a subscriber to the service. Thus, in one embodiment, the system sends an appropriate solicitation message to the friend, where the message is tailored to the particular circumstances. For example, if the friend is a wireless subscriber under the system, but has not subscribed to data services (and thus cannot benefit from the location-based services described herein), the solicitation message encourages the friend to subscribe for such data services. Alternatively, if the friend is a wireless subscriber of another service provider, then the solicitation message encourages the friend to switch service providers.

Alternatively, or additionally, the system may send a solicitation message to the user requesting that the user send a message to the friend requesting that the friend join as a subscriber. Such a solicitation message to the user may simply ask the user to prepare and send such a message, or include a sample message for the user to forward to the friend. The user, in turn, may receive certain compensation if in fact the friend does join as a subscriber.

Such solicitation messages could include information to permit the friend to readily become a subscriber of the system, such as providing a URL or toll-free number. For example, a main menu of location-based services options may include an option to send a pre-formatted message to a phone number of the user's choice, where the message may read "Hello! [user's mobile identification number] wants to use Find Friends with you. If you aren't already a subscriber, call 1-877-400-1080." The system may track in the database 124 such pending requests for friends to subscribe to the system. Once a friend has subscribed, the portal 108 may send an SMS or other communication to the user indicating that the friend has subscribed, and asking whether the user wishes the friend to now become a member of the user's friends list.

While a text or visual interface is described generally herein, an alternate embodiment may employ a speech or other audio interface. Thus, the portal 108 may provide directions under either a text-to-speech methodology, or other known ways to provide aural information to users over their wireless devices.

Referring to FIG. 6, the example of message flow in the system 100 is shown for when the user requests information. The portal 108 receives from the wireless device 102 (via the gateway 104) a request for more information. In response, the portal 108 requests the database 124 to look up a particular message or otherwise retrieve information. In response to a message received from the database 124, the portal 108 formats the message and returns it to the wireless device 102 via the gateway 104. The returned information may be, for example, frequently asked questions, a tutorial for the user on how to add friends or perform other functionality, etc. Furthermore, as described herein, the user may request and receive information regarding a person requesting that the user grant them location privileges.

Obtain Directions, Meet Friends or Find Locations

Figure 7A:
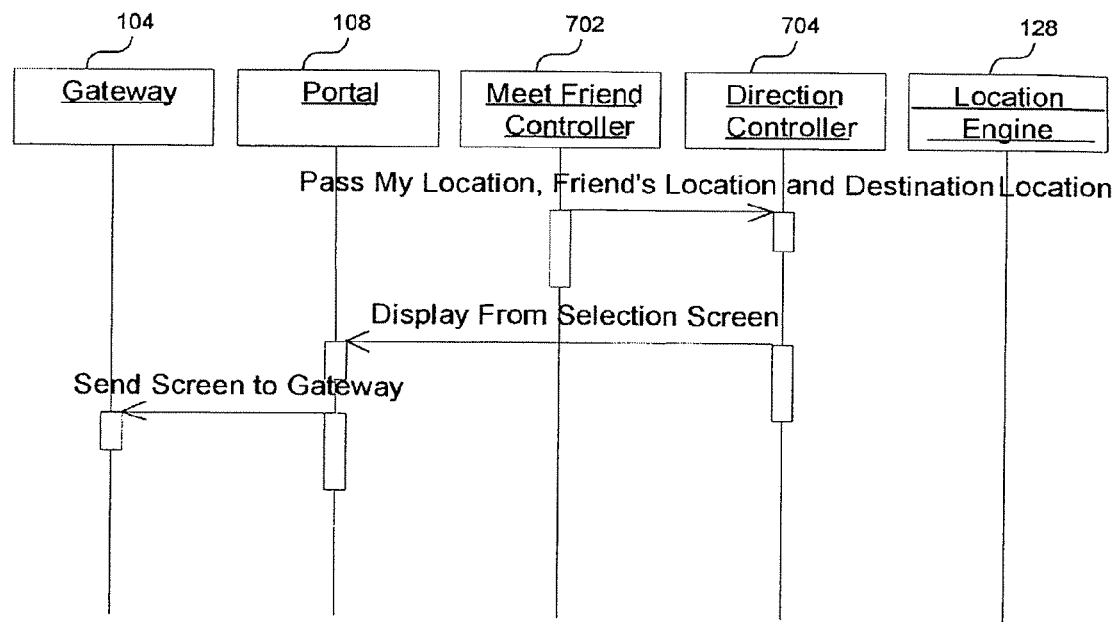
FIG. 7A is a flow diagram of a routine to display to a user a "from" location with respect to a directions request.
Figure 7B:
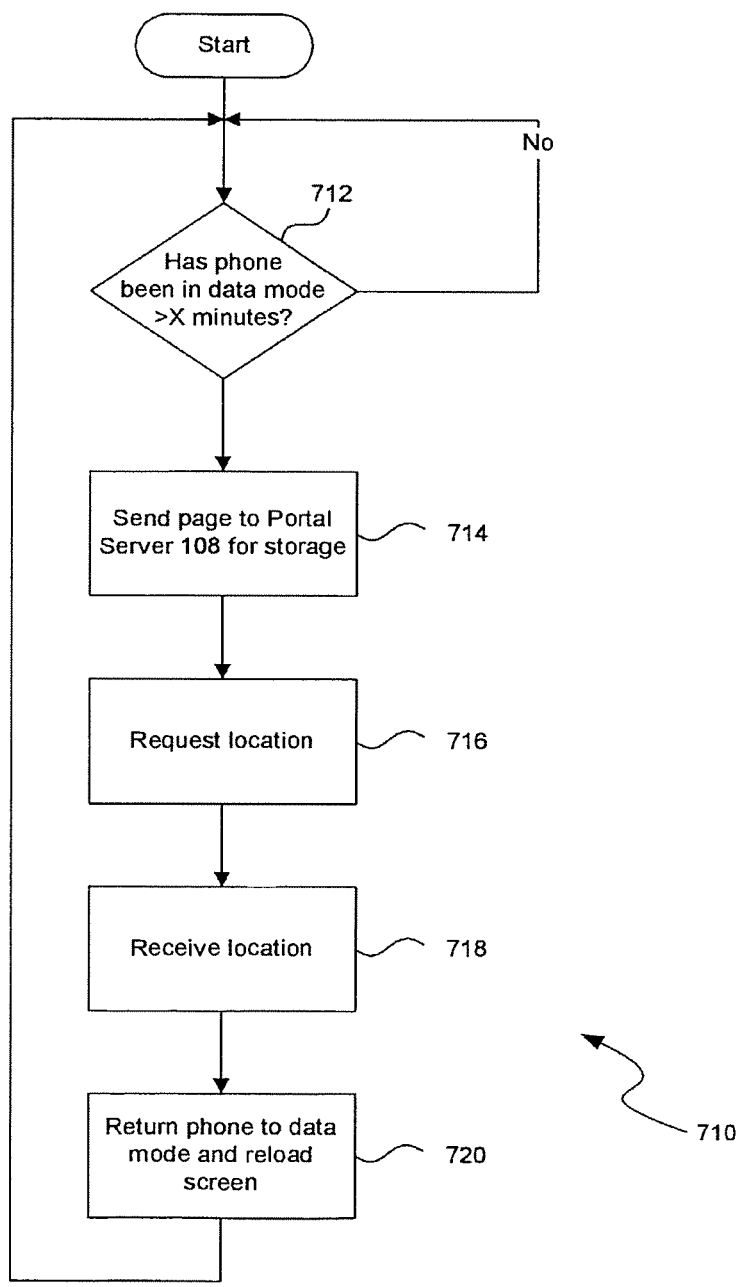
FIG. 7B is a flow diagram showing a subroutine for requesting a phone to exit data mode so that it may be located by the system of FIG. 1A.

As noted above, the system 100 can provide directions between two points, where the directions may be delivered in any number of ways, such as to the user's wireless device 102, in an email, and/or with respect to a map image. FIG. 7A shows an example of a message flow for network element interaction in generating a screen to display a "from" location with respect to directions. As explained herein, the portal 108 may provide, to the user's mobile device 102, location information of mobile devices within the network, where the location information is to a cell site (or cell site sector) level of granularity. If the user wishes to receive, for example, directions with greater specificity from a particular location (rather than the center point of a cell), the user may be required to enter a current street address. Thus, as shown in FIG. 7A, the meet friend controller 702 passes the user's and friend's location, as well as a destination location, such as a meeting place, if desired. In response, the direction controller 704 displays the "from" selection screen, which is provided by the portal 108, via the gateway 104, to the user's mobile device 102. The user may then enter a specific "from" location via this screen. Alternatively, no "from" selection screen may be displayed, or such screen may not be filled out, when the level of location granularity is unnecessary/undesired.

With most location-based services provided under the system 100, the system must determine the location of the user's wireless device 102. However, under certain wireless protocols, such as GPRS, when a wireless device 102 is in data mode, the system 100 cannot determine the location of the device. Therefore, referring to FIG. 7B, the system may periodically perform a routine 710 for allowing the system to determine the location for the wireless device 102.

Beginning in step 712, the portal 108 determines whether a wireless device 102 has been in data mode for more than a predetermined time (e.g., more than 5 minutes). A small subroutine running on the portal 108 monitors the accumulated time during which each wireless device 102 is in data mode, and when a wireless device 102 exceeds the time threshold, the portal 108 transmits an appropriate message to the wireless device 102 instructing it to exit from data mode. Alternatively, each wireless device 102 could have a locally running counting subroutine that determines when the device 102 has been continuously operating in data mode for more than the predetermined time. The system 100 may alternatively or additionally request the mobile device 102 to exit data mode whenever the device 102 requests certain location-based services or whenever the location of mobile device 102 has been requested by, for example, a find friends request from a friend authorized to obtain such location. After the time threshold has been exceeded, the routine 710 in block 714 requests the wireless device 102 to send a currently displayed page to the portal 108 for storage. For example, the wireless device 102 may be viewing a particular WAP page, which the portal 108 receives and stores. In block 716, the portal requests the GMLC 126 and location engine 128 to determine the location of the wireless device 102. In block 718, the portal 108 receives the location of the wireless device 102 from the GMLC 126 and/or location engine 128. Thereafter, in block 720, the portal 108 transmits back to the wireless device 102 the stored page to be reloaded by the wireless device 102, and allows the wireless device 102 to return to data mode. The process then repeats.

Figure 8:
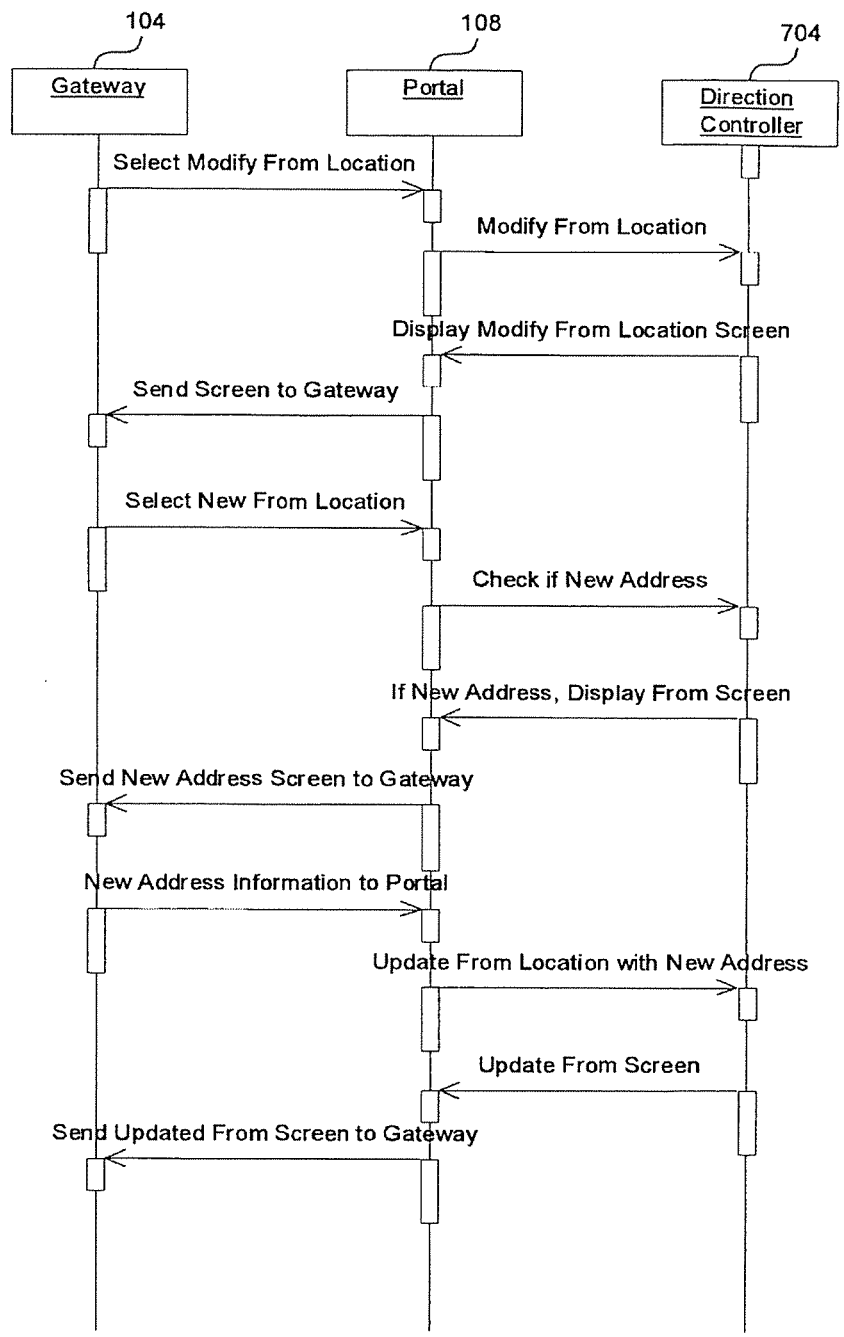
FIG. 8 is a flow diagram of a routine to permit a "from" location to be modified.

Referring to FIG. 8, an example of a message flow is shown for modifying the "from" location with respect to directions for location-based services provided under the system. For example, the user may request directions from a location in which the user is not currently located, or may be required to enter a specific address if the user's location cannot be determined with specificity. Thus, as shown in FIG. 8, the portal 108 receives from the wireless device 102 (via the gateway 104) a request by the user to modify the from location. In response, the portal 108 instructs a direction controller 704 to modify the from location, and receives therefrom an appropriate screen to permit the user to modify the from location. The direction controller 704 represents a subsystem, subroutine or group of functions for providing directions as described herein.

In response to the received screen, the gateway 104 receives from the user's wireless device 102 a new from location, which it forwards to the portal 108. The portal 108, in turn, forwards the new from location to the direction controller 704 to check if the new from location corresponds to a new address, or one already recognized by the direction controller 704. If the address is new, the direction controller 704 returns an appropriate input display screen. The input display screen is then forwarded to the wireless device 102 via the gateway 104. The gateway 104 receives new address information from the user's wireless device 102, which the portal 108 receives and forwards to the direction controller 704 for updating. The direction controller 704 generates and forwards back to the portal 108 an updated from screen reflecting the new address, which, in turn, is forwarded to the wireless device 102 via the gateway 104. In a very similar manner to that described above, the user may change the "to" location.

Referring to FIG. 9, an example of a message flow for receiving or viewing directions is shown. The generation and display of directions, and other data, is tracked or managed via a hypertext transfer protocol (HTTP) session 904 running on the portal 108, or application server, as described above. While not shown in all of the Figures, the portal 108 or application server initiates a session for managing the state of the mobile device's access to functionality provided herein. For example, when viewing directions, a user may request to view a next screen full of directions, act on the directions (e.g., sending the directions by email or fax), or jump to a specific screen of directions. The HTTP session manages the current state to ensure proper functionality. HTTP is the long-haul protocol for handling a Find Friends subscriber's transactional request and helps to minimize the network traffic required to process the request. Other suitable protocols may be substituted for HTTP to perform transaction request handling and/or to reduce network traffic associated with transaction requests. Likewise, other methods for tracking the state of the mobile device or user accessed functionality may be employed.

Thus, when a user requests directions, the direction controller 704 and a find friend controller 902 (described below) each set from and to locations to initiate a session via the HTTP session 904. Thereafter, the direction controller 704 requests directions from the location engine 128. After receiving the directions, the direction controller 704 stores the directions in the session under the HTTP session 904, and formats the directions as a display screen for the portal 108. The wireless device 102 receives the display screen of directions from the portal 108 via the gateway 104. If more directions are to be displayed, the wireless device 102 may provide a request for more directions to the portal 108 (via the gateway 104). In response thereto, the portal 108 requests the direction controller 704 to display more directions, and if such directions are available, they are provided to the wireless device 102 via the portal 108 and gateway 104.

The user may also view a particular screen of directions. For example, if six screens of directions are provided to the user to navigate the user from a current location to a desired location, the user may jump to the third of six screens. Thus, as shown at the bottom of FIG. 9, the user may select a particular screen of directions and provide this desired screen number to the portal 108, which in turn provides the direction number to the direction controller 704. In response, the direction controller 704 provides the desired screen of directions, which the portal 108 provides back to the mobile device 102.

Figure 10:
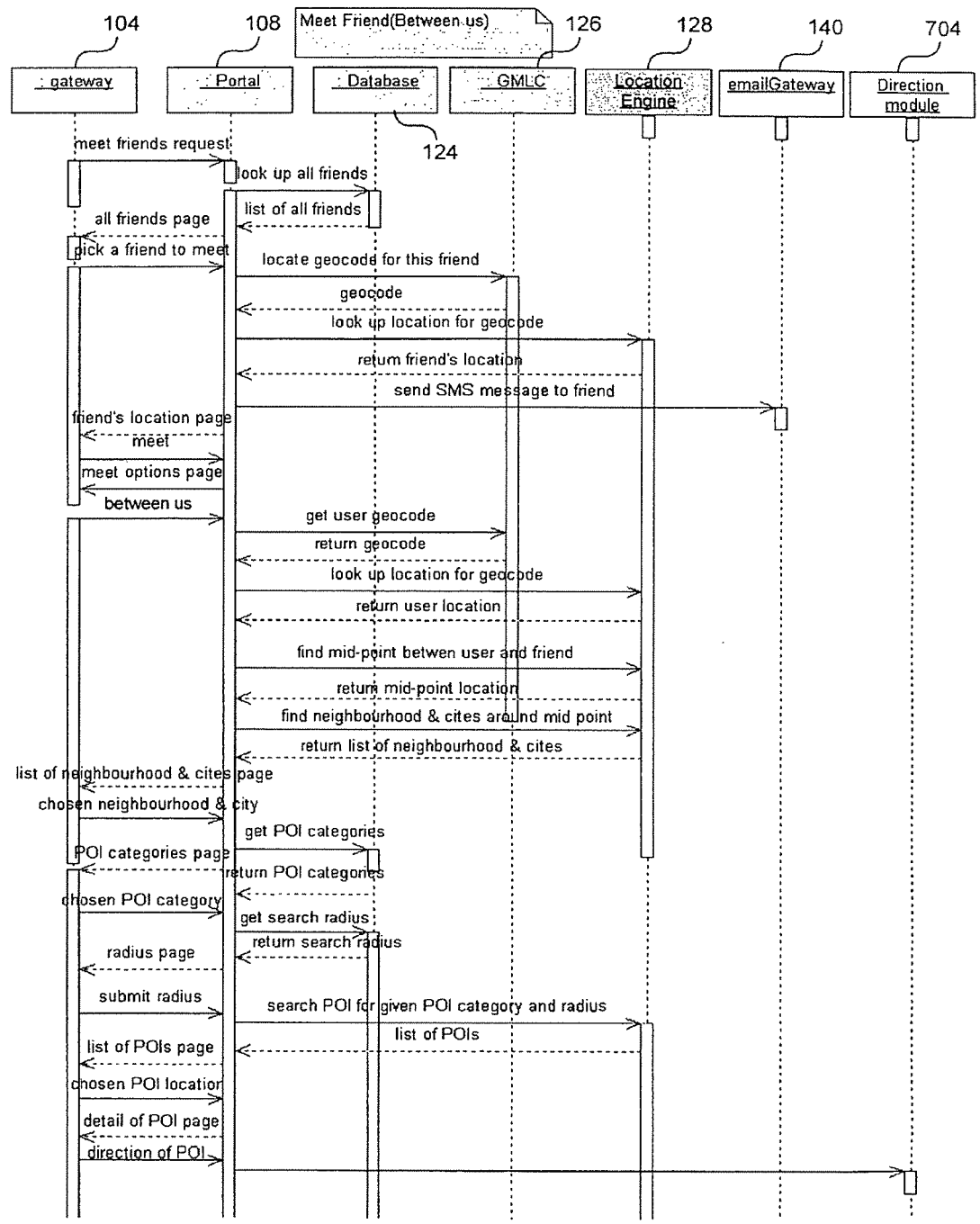
FIG. 10 is a flow diagram of a routine for meeting between two friends.

As noted above, the system 100 includes a meet friend subsystem or controller 902 that represents a subroutine or group of functions allowing users to meet their friends, identify points of interest, search for meeting places, and schedule such meetings. The meet friends subsystem 902 also forwards this information on to the direction controller 704 if directions are needed. Referring to FIG. 10, a message flow for requesting the system to allow a user to coordinate a meeting with a friend between the user and the friend is shown. The flow begins where the portal 108 receives, via the gateway 104, a request by the user's wireless device 102 to meet a friend. The portal 108 queries the database 124 to look up all friends of that user, and provides back to the user a friends display page containing the user's friends list. Under an alternate embodiment, the friends display page may include not only a list of the user's friends (or first five friends in the list), but also last identified locations for these friends. Thus, the user can identify which friend may be closest, and coordinate a meeting with that friend.

As shown in FIG. 10, the portal 108 receives from the wireless device 102 a friend that the user has picked. In response, the portal 108 requests the GMLC 126 to locate and provide the geo-code for this friend. In response to receiving the geo-code, the portal 108 requests the location engine 128 to perform a reverse geo-code to determine the address location of the friend. In response to receiving the friend's address location, the portal 108 sends an SMS message to the friend via the email gateway 140. The SMS message indicates to the friend that the user has attempted to locate the friend. The portal 108 also sends a friend's location display page to the user's wireless device 102 providing the friend's address location. In response to the user's requesting to meet with the friend, the portal 108 sends a meet options display page to the user. The options page includes at least three options: meet near the user, meet near the friend, or meet between the user and friend.

As shown in the example of FIG. 10, the user requests to meet between himself or herself and the friend, which is indicated by a "between us" message the portal 108 receives from the wireless device 102 via the gateway 104. The portal 108 then gets the user's geo-code from the GMLC 126 and requests a reverse geo-code location from the location engine 128 for the user. Reverse geo-coding converts a latitude and longitude to a street address or other position easily locatable on a map. Thereafter, the portal 108 requests the location engine 128 to identify a midpoint between the user and friend and, based on the midpoint, requests the location engine 128 to find neighborhoods, cities or other sites around the midpoint. In response to the list of neighborhoods/cities/sites, the portal 108 provides a neighborhood display page for the user's wireless device 102 (via the gateway 104). The user selects a neighborhood/city/sites and provides this information to the portal 108 via the gateway 104. In response, the portal 108 requests point of interest (POI) categories based on the chosen neighborhood/city/sites and provides to the wireless device 102 a display page listing POI categories. Categories may include, for example, restaurants, bars, parks, cafes, etc.

The portal 108 receives from the wireless device 102 a chosen POI category and requests from the database 124 search radius parameters, which are returned to the user's wireless device 102 in an appropriate radius select display page. The user submits a desired radius to the portal, and the portal requests from the location engine 128 POIs for the given category within the user's selected radius. In response, the portal 108 receives from the location engine 128 a list of all POIs fulfilling the user's desired criteria and provides to the user's wireless device a POI display page listing such POIs. The user chooses a particular POI from the list and provides this to the portal 108 via the gateway 104. The portal 108, in turn, provides a POI display page providing details on the selected POI. While not shown, the portal 108 sends an SMS message, email message, or other communication to the friend requesting an RSVP.

The database 124 stores a list of pending RSVP's in both a record for the user, and another record for the friend. The system 100 may thus keep track of pending RSVP's and other meeting requests. Indeed, the system 100 sends numerous SMS messages to keep the user, as well as friends, updated on the status of various requests. In an alternative embodiment, the portal 108 provides the user and friends with options for opting in or out of receiving various SMS messages, such as messages indicating whether friends have attempted to locate the user. Under this alternative, the user may select whether to receive any such messages, or indicate whether to receive such messages from particular friends or others that the user has allowed the system to provide the user's location. Thus, for example, the user may wish to be notified when a first friend tries to locate the user, but not a second friend.

If the user wishes to receive directions to the POI, the user may request, via the wireless device 102, directions. In response, the portal 108 receives the request for directions and performs many of the functions described above for obtaining and providing the desired directions to the wireless device 102. The portal 108 may email directions to both the user and the friend, via the email gateway 140. For example, the portal 108 may create and format e-mail messages, which the email gateway 140 sends to users at, for example, "[username]@mobile.att.net." Alternatively, or additionally, the portal 108 may communicate with an appropriate fax server (not shown) to generate a fax of a map image, and send such an image to the user or friend for receipt by a computer, fax machine, etc. Software utilities for generating and sending facsimile images are well known to those skilled in the relevant art. The portal 108 may send an SMS or other communication to mobile devices 102 to alert the users to check their email or fax machine.

The system requires users to share their mobile phone numbers and usernames twice: once when requesting permission to locate a friend (so that the friend knows who is making the request), and again when granting access to someone. The portal 108 stores the mobile phone number and username in the friend list so that the portal 108 can identify the user and make it easy and secure for friends to contact the user.

Figure 11:
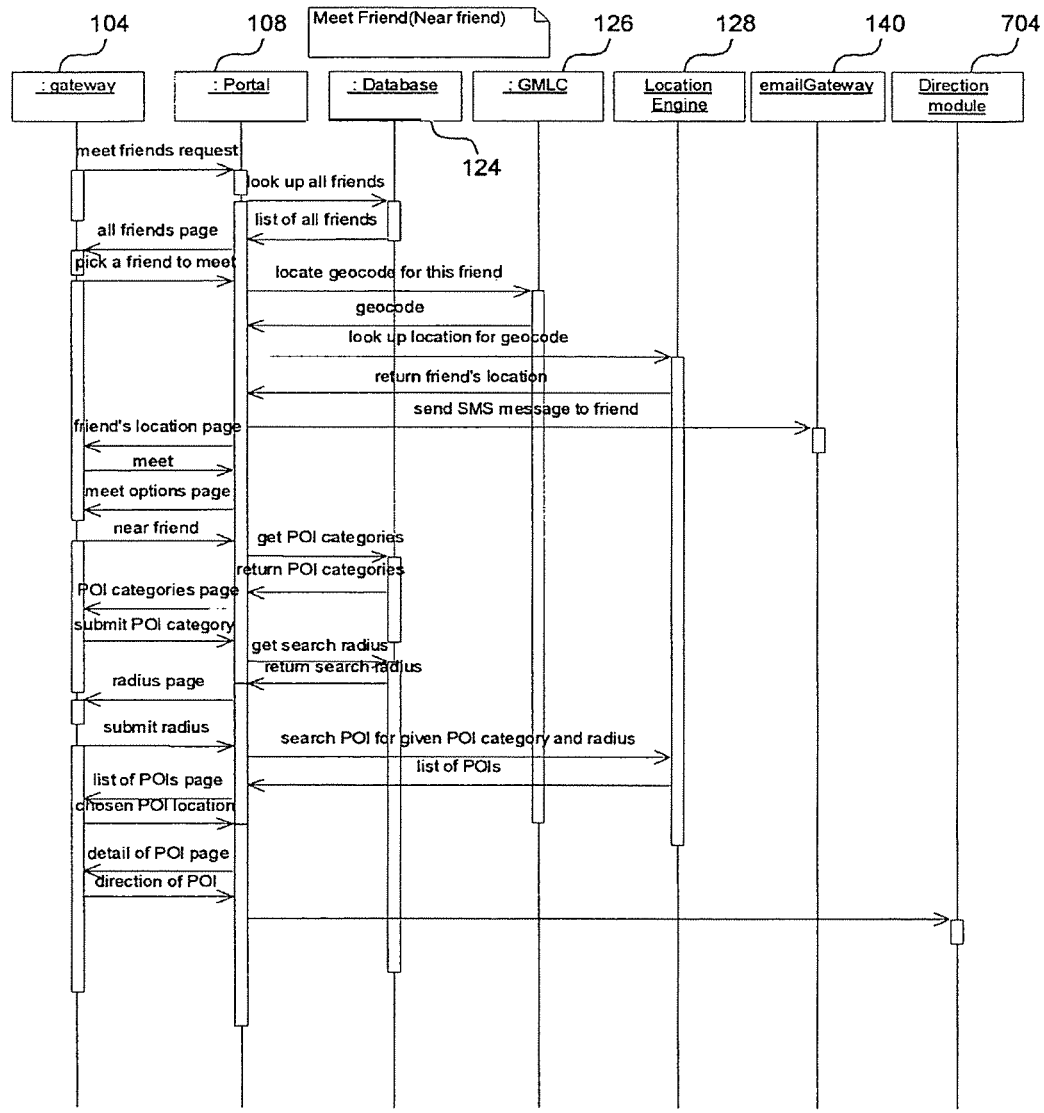
FIG. 11 is a flow diagram of a routine for meeting near a friend.
Figure 12:
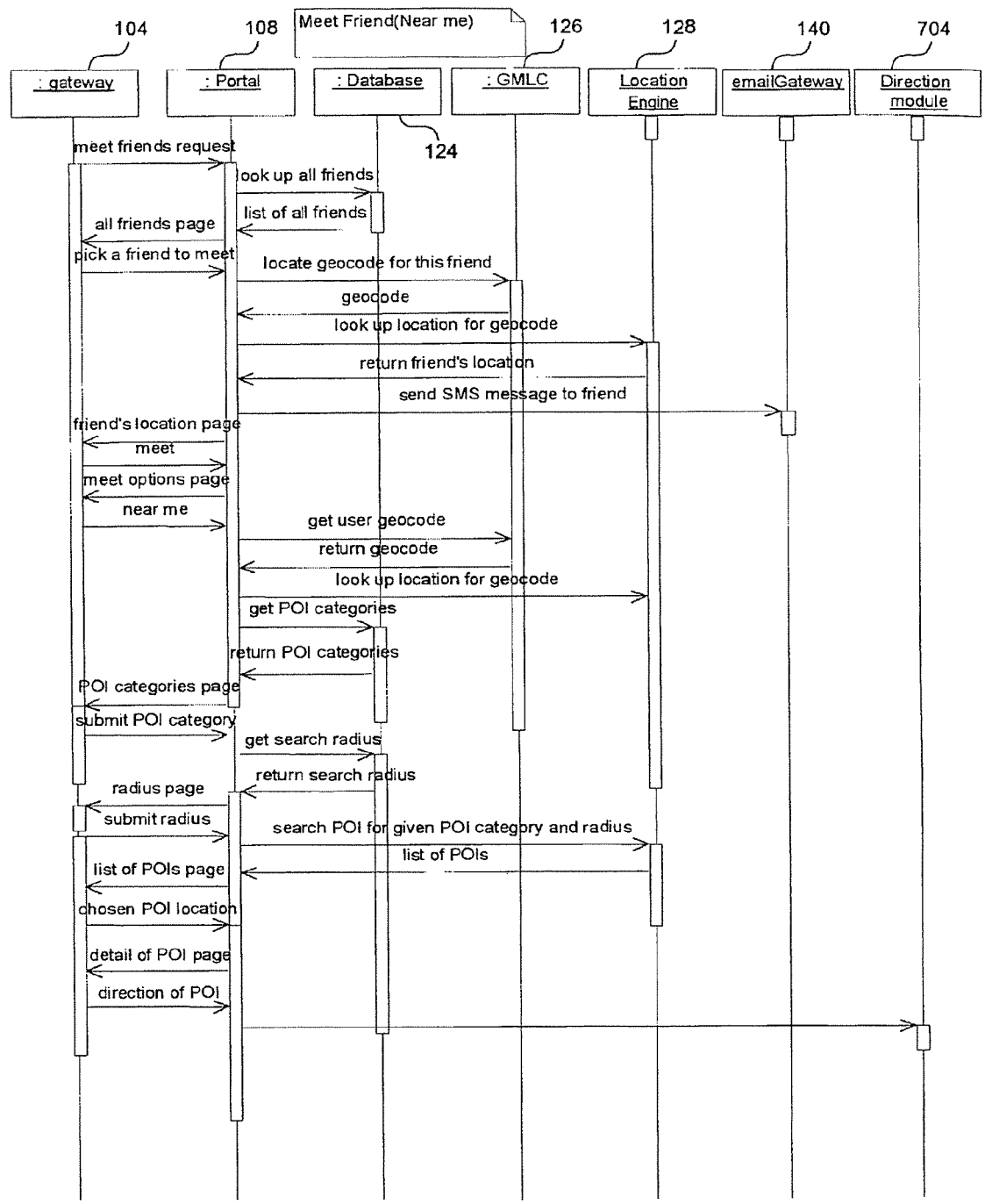
FIG. 12 is a flow diagram of a routine for meeting near a user.

Referring to FIG. 11, if the user wishes to meet near the friend, much of the same message flow repeats from that shown in FIG. 10. However, rather than providing a request to meet "between us" when receiving the meet options page, the user's wireless device provides a meet "near friend" request to the portal. The system 100 then provides POIs within the desired radius with respect to the friend's location. Likewise, if the user wishes to meet near himself or herself, a substantially similar message flow is performed, as shown in FIG. 12.

The functions described above for meeting a friend allow the user to meet one friend at a time. Under an alternate embodiment, the system 100 permits the user to select two or more friends, and coordinate a meeting equidistant between these friends and the user. The system 100, via the location engine 128, computes a midpoint between the user and friends, and performs the functions above to permit the user to identify a desired POI at this midpoint or "geographic center."

In another alternative embodiment, the portal 108 may integrate or interface with the user's calendaring application, contact management application, or both applications. For example, the portal 108 receives data regarding a meeting that the user has requested with a friend, and using standard API's associated with Microsoft Outlook, Infospace Calendar, or similar applications, adds the meeting and particulars regarding the meeting to the user's calendar. Likewise, when the user adds a new friend or otherwise adjusts his or her friends list (described herein), then contacts records in the user's contact management software such as Microsoft Outlook are modified to include information regarding the friend.

The portal 108 may determine the time zone or current local time in which the user is located based on the user's location. Alternatively, or additionally, the user may provide his or her home or office zip code when subscribing for the service described herein, which the portal may use to associate a time zone or local time with that user. Also, when a user locates a friend via the system, the portal 108 may return to the user's mobile device 102 the time zone or local time at the friend's current location. The portal 108 may determine the time zone from the mobile device's location, request it from the mobile device, or obtain it from another system element such as the location engine 128 or GMLC 126.

The time zone or current local time may be useful in a variety of applications. For example, the local time may be used in coordinating meetings. The user may be traveling from Seattle to New York City, and may use the meeting function to schedule or coordinate a meeting with a colleague in New York City. The user may enter a "from" location corresponding to a hotel at which the user will be staying, and the meeting location (such as a restaurant near the hotel). The system can then coordinate the meeting based on East Coast time, rather than the user's current West Coast time. The system may also use the user's, or friend's, associated local time to determine appropriate times for receiving or sending messages, deciding whether it's an appropriate time to call the located friend, etc. Thus, the system may use the local time of the user, friend, or others to populate appropriate applications or functionality described herein.

Under an alternative embodiment, the portal 108 may provide the user with a dropdown list of cross streets near a location (such as the current location of the user, or the location of a point of interest). Such list of cross streets may be particularly helpful in orienting the user with respect to a desired location, filling out a screen (e.g., a "from" location screen), etc. Such a list of cross streets may be provided as an option selectable by the user via any known user input technique (e.g., touch sensitive screen on mobile devices employing such user input devices, simple button selection from a menu list with mobile devices employing only numeric keypad, etc.). The location engine 128 may provide the identification of cross streets.

The portal 108 may notify the user when a friend on the user's list is "nearby." For example, if a friend on the user's friends list is in the same cell sector as the user, then the portal 108 may provide an SMS message to the user to identify the friend and indicate that such a friend is "very nearby."

As another example, the user may find friends or other individuals sharing a similar interest who are within a certain radius or based on other criteria. As explained below, the portal database 124 may store public profiles for each user of the location-based services described herein. This public profile may include hobbies, interests, and other information regarding that individual. Thus, a user may attempt to locate anyone within 200 meters that likes golf so that the user can send a meeting request and establish a foursome. Many other examples are possible, as described herein.

FIGS. 13-16 are data and function flow diagrams illustrating how the system 100 finds nearby places for the user, finds nearby friends for the user, permits the user to edit his or her friends list, and permits the user to RSVP to friends in response to meeting requests, respectively. Details regarding these functions are provided below with respect to FIGS. 17-33.

More specifically, FIGS. 13 though 16 show examples of software routines or subroutines that provide functionality shown or described in greater detail with respect to FIGS. 17 through 33 and the previous Figures described above. Without sacrificing clarity, but for brevity, and to orient those skilled (or unskilled) in the art, portions of FIG. 13 will now be discussed in detail. From these detailed discussions of FIG. 13, one can more readily understand FIGS. 14 through 16, even though those skilled in the relevant art will find FIGS. 13-16 self-explanatory.

As shown in FIG. 13, a FindNearbyController routine 1300 initializes and provides to the user a page "FindNearbyPage" 1302, which presents to the user the choice between finding a nearby place or a friend. In the example FIG. 13, the user selects "place," and in response, the system initiates a subroutine NearbySearchController 1304 which interacts with a subroutine CategoryListBuilding 1306, which gets all categories from a category database CategoryFactory. The server may execute a script or other executable code to generate a page or other display to the user. Thus, while aspects of this embodiment are described with respect to, for example, providing or displaying the FindNearbyPage page, the system may actually execute a script entitled FindNearbyPage to generate a page or display that is transmitted for display on the user's mobile device. Thus, for the sake of brevity, but without sacrificing clarity, the following discussion simply refers to displaying or providing a page to the user.

The user next receives a page "NearbyPlaceMenuPage" 1308 which provides the option between restaurants and bars/pubs, or more places. If the user selects "more," then the NearbySearchController 1304 requests more categories to display to the user from the CategoryListBuilding 1306. In this example, the user selects "restaurant," and in response a subroutine PlaceSearchRadiusController 1310 displays to the user a search radius page, which provides search radius options of one, five, and fifteen miles, or other (shown as "PlaceSearchRadiusOptionPage" 1312). After selecting a search radius, a subroutine PlaceSearchResultController 1314 launches and gets the information based on the user choice within the radius from the location engine 128 and displays location information. If the user had selected "other" from the page 1312, then the user receives a page "PlaceSearchRadiusInputPage" 1316. If nothing was found within the selected radius, then the user receives a page "NoLocationsFoundPage" 1318 that allows the user to return to the routine FindNearbyController 1300, or to select another radius from the page 1310.

A subroutine PlaceListBuilder 1320 finds places from the selected category and within the selected radius, while maintaining a session. A subroutine FriendLocator 1322 calls the GMLC 126, and the location agent 128, which provides location data regarding the location of, for example, the user's mobile device. Places in the selected category and within the selected radius are provided to the user via a NearbyPlaceInfoPage 1324, which in this example, shows a McDonald's 0.5 miles away, and a Burger King one mile away. The user may receive more details regarding a selected place, where such details are provided in a NearbyPlaceDetailsPage 1326. From the page 1326, the user may call the displayed location, or receive directions thereto, via a subroutine NearbyPlaceDescriptionController 1328. Following the page 1328, a subroutine DirectionsController 1330 receives source and destination information and obtains directions to provide to the user.

Figure 14:
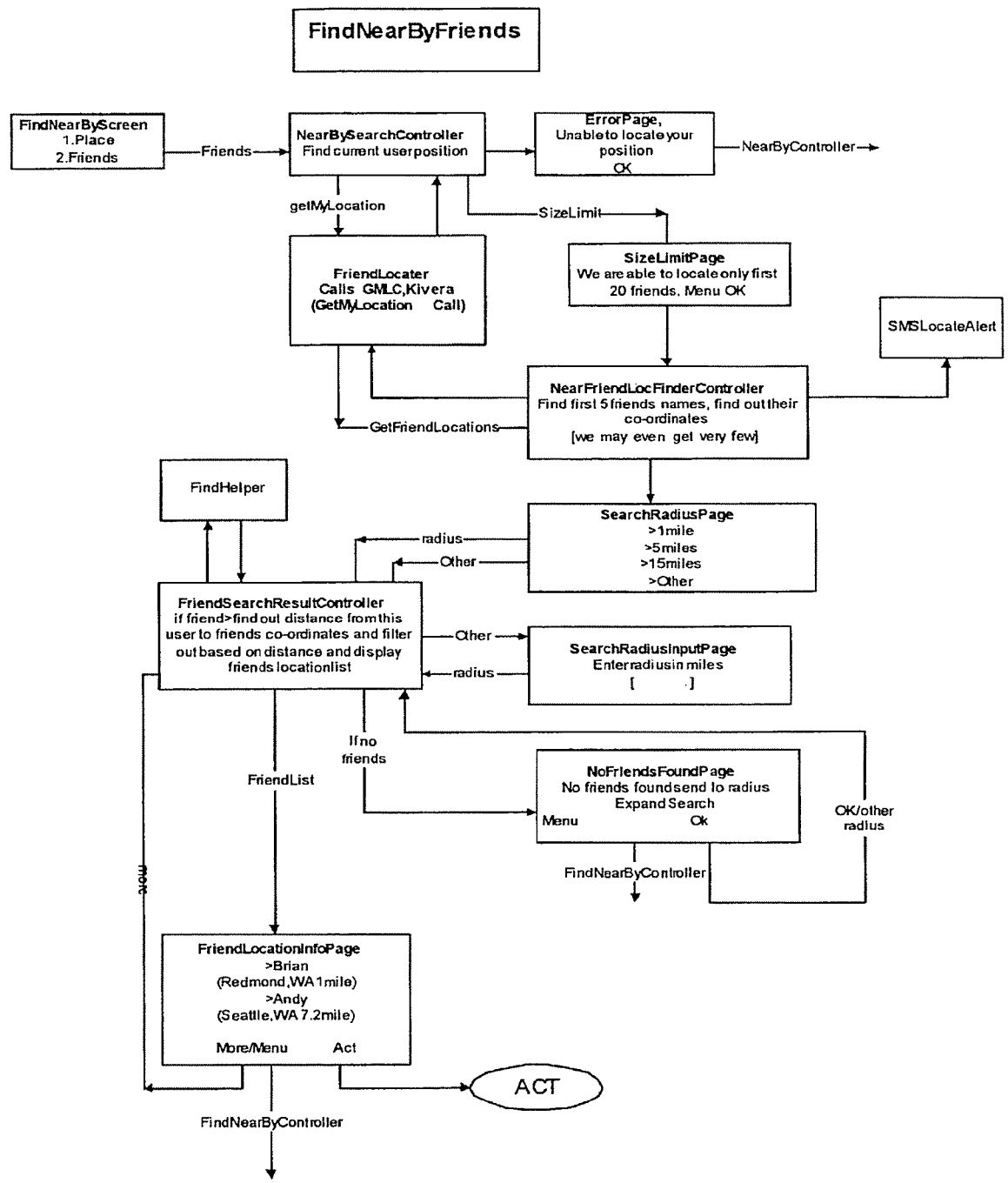
FIG. 14 is a data and function flow diagram of a Find Nearby Friends routine.
Figure 15:
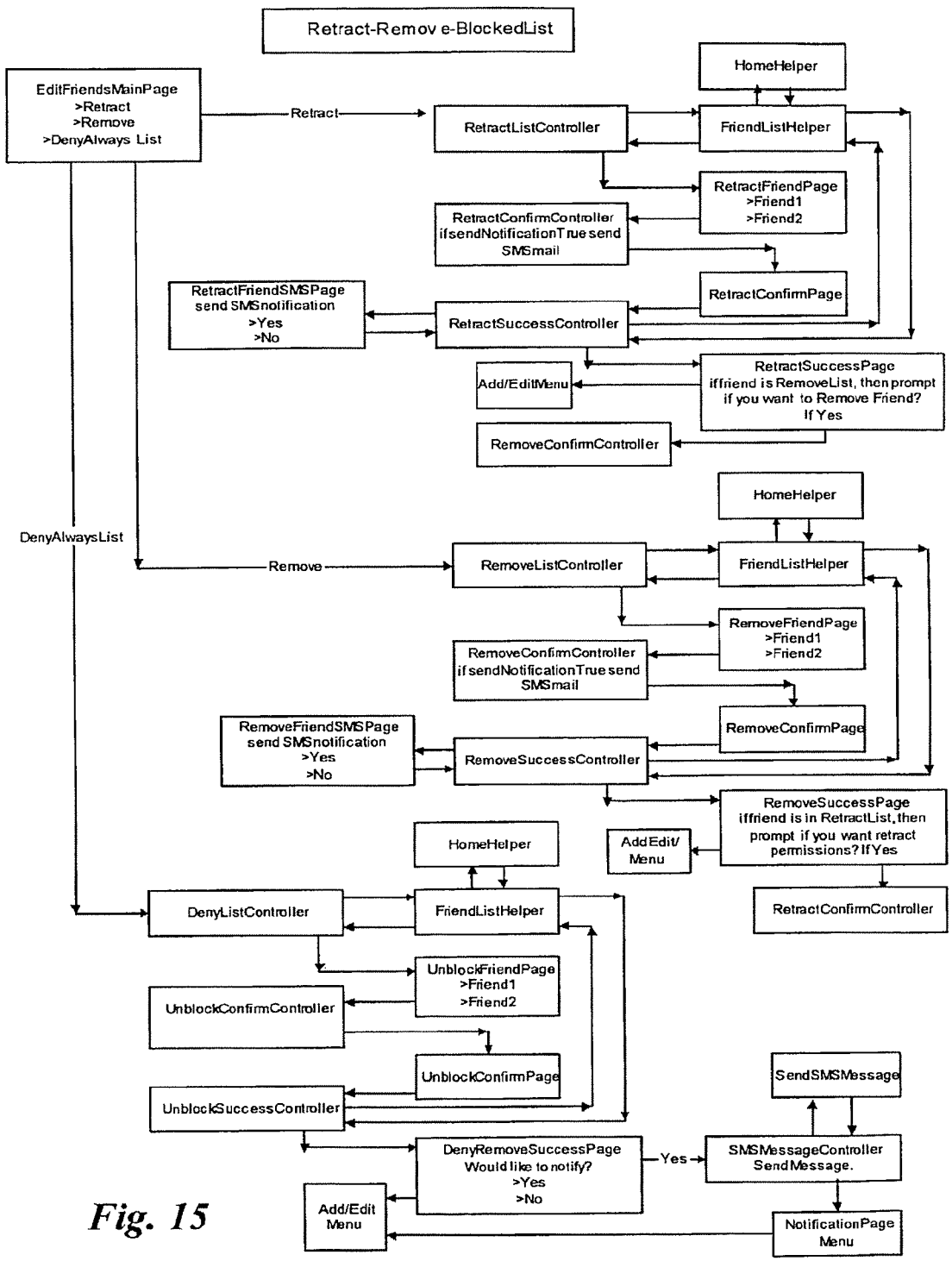
FIG. 15 is a data and function flow diagram to permit a user to edit a friends list.
Figure 16:
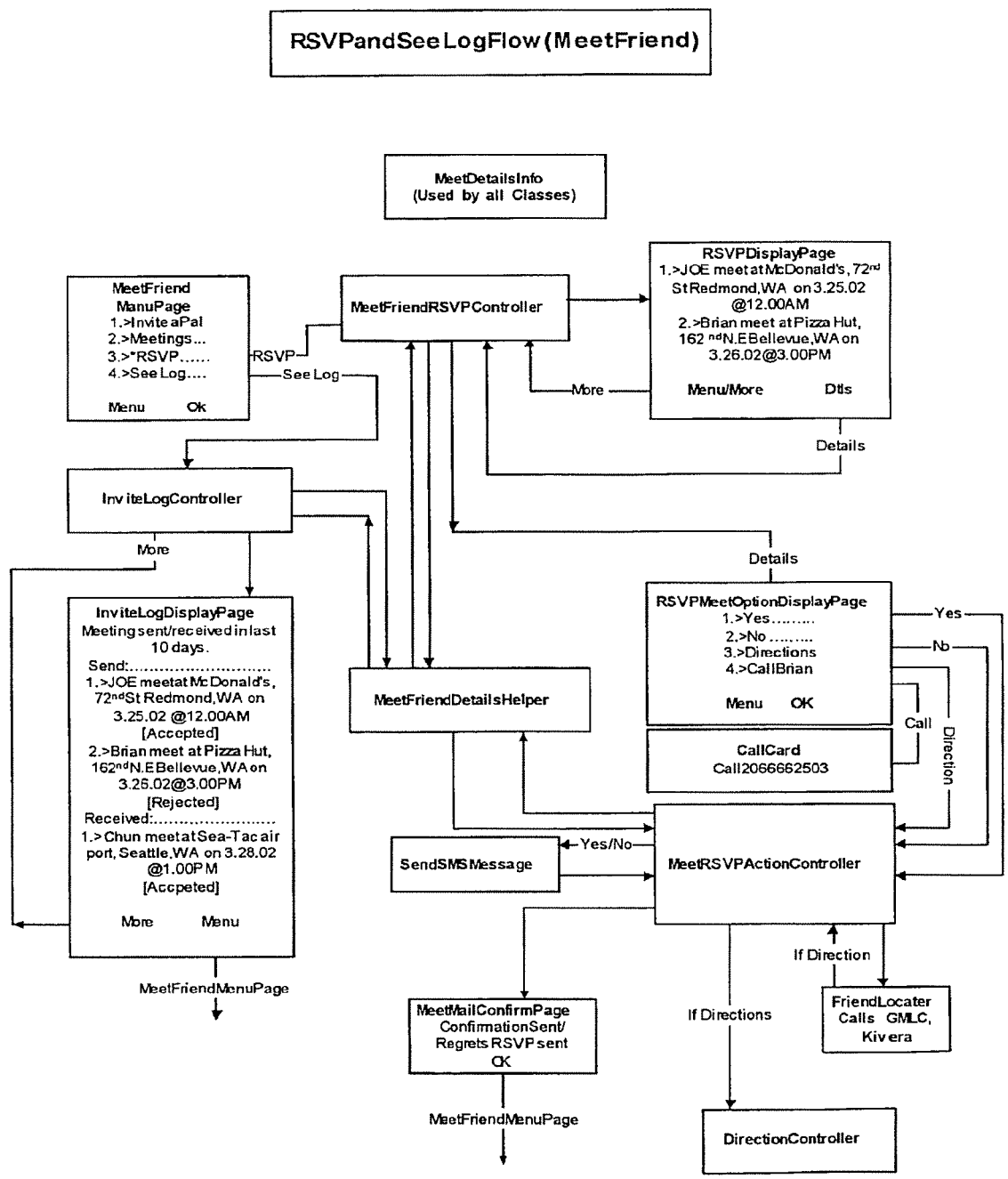
FIG. 16 is a data and function flow diagram of a process for RSVP'ing to friends.

FIG. 14 shows routines and functionality similar to that of FIG. 13, but for when a user selects "friends" from page 1302. FIG. 15 shows routines and functionality for permitting the user to adjust permissions with respect to providing location information to friends, as described herein. FIG. 16 shows routines and functionality for coordinating a meeting with a friend, in particular, providing RSVP functionality to provide notification or confirmation to an individual of the meeting.

Representative User Interface

Representative user interface screens for displaying information to users, and associated logic branching and functionality, will now be discussed with respect to FIGS. 17 through 34. These figures show examples of information displayed to a user ("display pages"), and examples of choices selected by the user. Those skilled in the relevant art will readily recognize that other examples are possible. Likewise, FIGS. 17 through 34 are generally self-explanatory to one skilled in the relevant art (based on the detailed description provided herein). Aspects of some initial user displays and functionality will be described in detail, but subsequent displays and functionality may be described in less detail. Those skilled in relevant art will recognize that subsequently discussed displays and functionality have much of the same details as those described previously. While the following discussion describes providing information to the user, the portal 108 actually provides, via the gateway 104, a display page for display on the wireless device 102 or other communication to the user.

The display pages may be implemented in WAP, XML (Extensible Markup Language), HTML (HyperText Markup Language), Handheld Device Markup Language (HDML), Wireless Markup Language (WML) or other language or scripts that provide information to a user. The display pages provide facilities to receive user input data, such as a fields to be filled in, one or more numbered items to be selected from menus, hypertext links to select, displays allowing one or more of several options to be selected, or other known user interface tools for receiving user input. Of course, while one or more ways of displaying information to users in pages are shown and described herein, those skilled in the relevant art will recognize that various other alternatives may be employed. The terms "screen," "display page" and "page" are generally used interchangeably herein.

The display pages are stored as display descriptions, graphical user interfaces, or as other methods of depicting information on a computer screen (e.g., commands, links, fonts, colors, layout, sizes and relative positions, and the like), where the layout and information or content to be displayed on the page is stored in the database 124 (or other location). In general, a "link" refers to any resource locator identifying a resource on a network, such as a display description provided by an organization having a site or node on the network. A "display description," as generally used herein, refers to any method of automatically displaying information on a display screen in any of the above-noted formats, as well as other formats, such as email or character/code-based formats, algorithm-based formats (e.g., vector generated), or matrix or bit-mapped formats.

Figure 17:
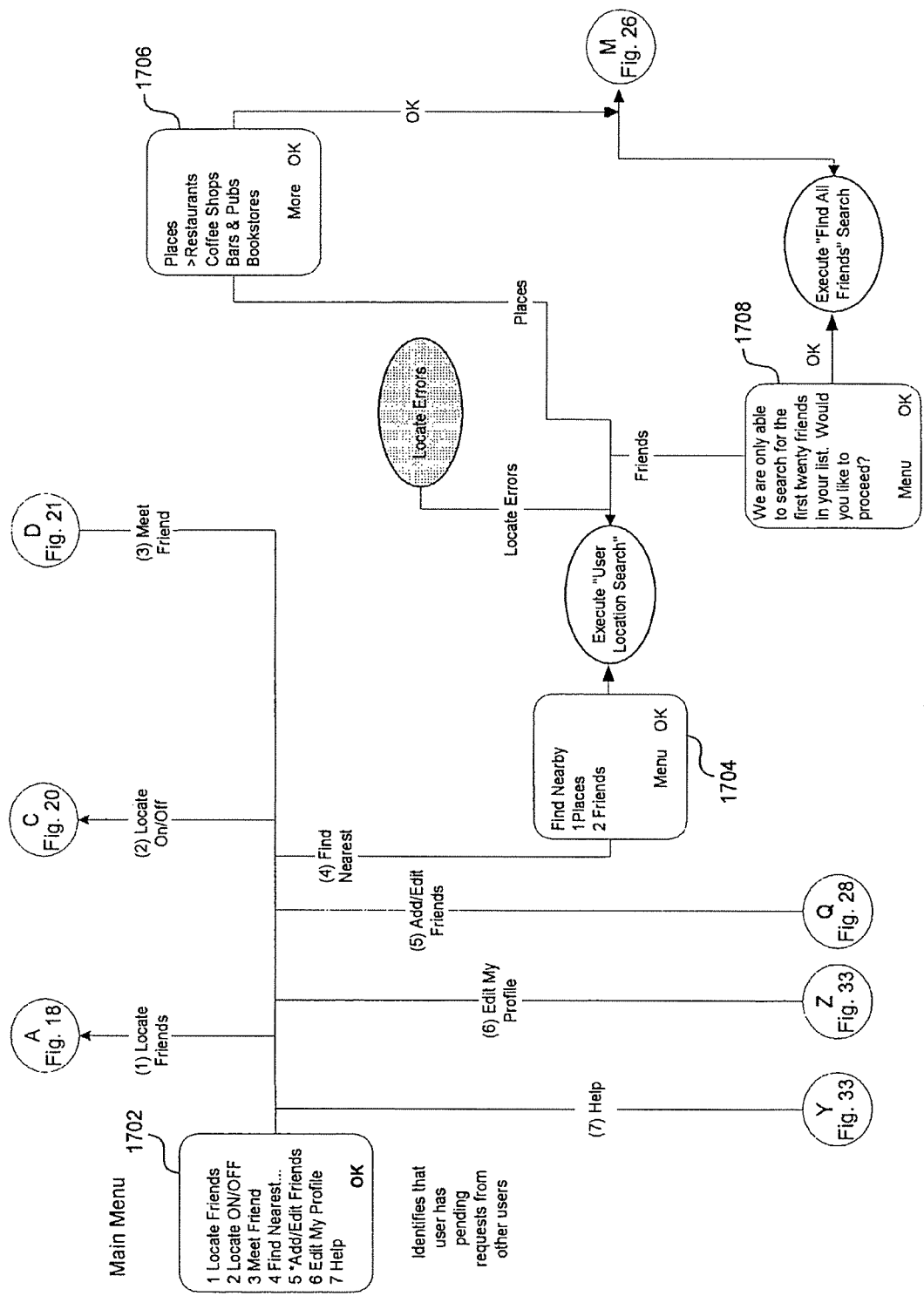
FIGS. 17 through 34 are user interface flow diagrams for allowing a user of the system of FIG. 1A to locate friends, turn locate on/off, meet friends, find a nearest location, add/edit friends, edit a user profile, or receive help instructions.

Referring to FIG. 17, the portal 108 provides a Main Menu to the user under block 1702. As shown, the Main Menu provides the user with seven options: 1) locate friends, 2) locate on/off, 3) meet friend, 4) find nearest . . . , 5) add/edit friends, 6) edit profile, and 7) help. The Main Menu provides the starting place, and initial branching, for options and functions provided to the user. Each of these options will be described in detail below.

As explained below, the system 100 permits users and friends to modify privileges and profiles whenever desired. Thus, users or friends may turn off the ability to have the system locate them (to "go invisible"). Likewise, users can modify their friends lists to permanently or temporarily remove friends from the list. Users and friends may create, edit and view public profiles that provide information regarding such users/friends. Further description of the ability for users to modify privileges in real time is described herein.

Figure 18:
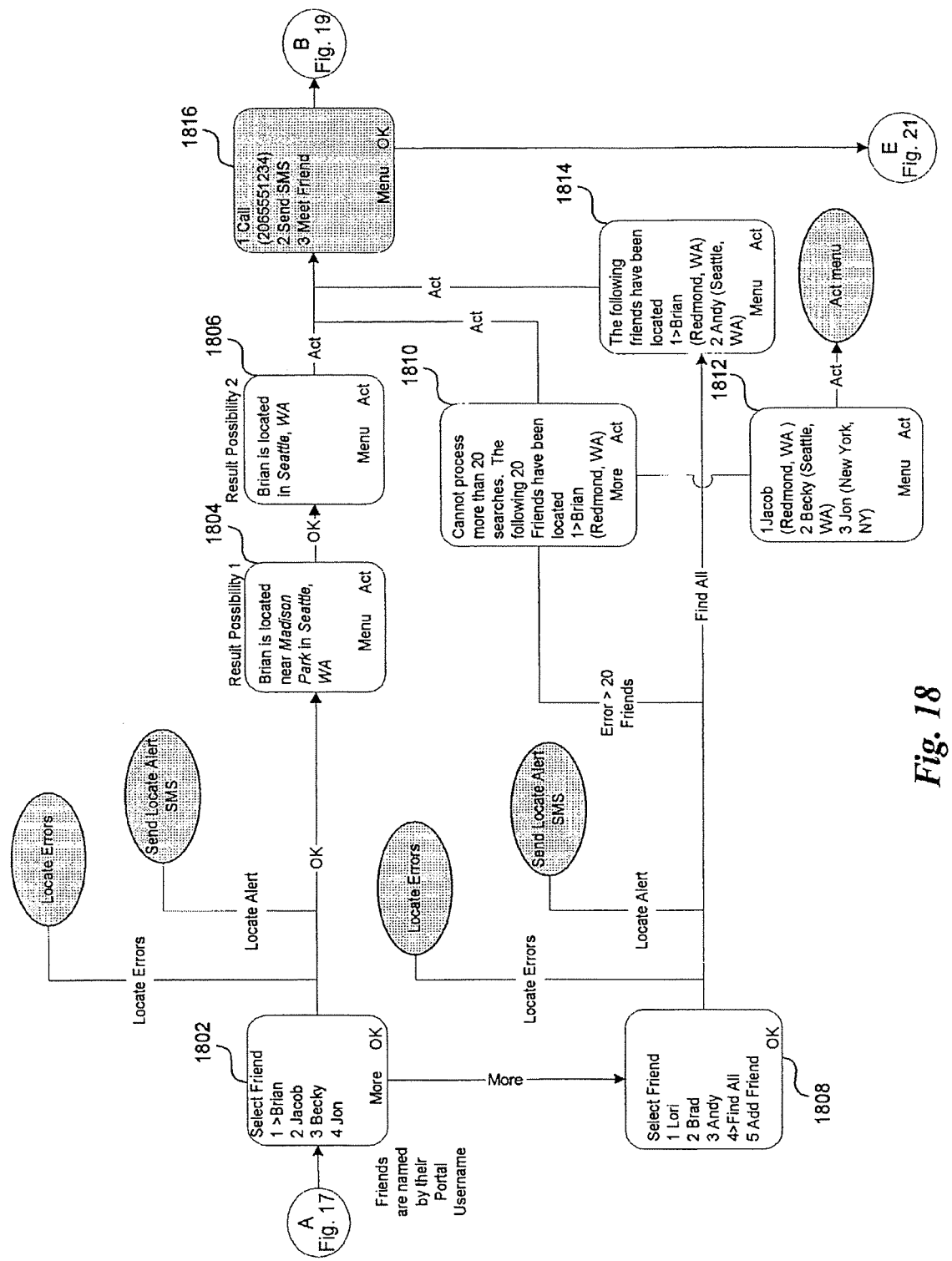

Referring to FIG. 18, if the user selects "locate friends" (such as by depressing the "1" button on a mobile phone), the portal 108 provides a list of friends to the user in block 1802. If the user selects a friend, the system 100 attempts to locate the friend, and if the friend cannot be found, provides a locate error message, and may send a locate alert SMS message to the user, as described herein. If the friend is found, then one of two results are provided to the user depending upon, e.g., how accurately the system 100 can locate the friend, as shown in blocks 1804 and 1806.

If the user wishes to view more friends than those shown in the initial friends list under block 1802, the user may ask the portal 108 to display more friends, as shown in block 1808. Under block 1808, additional friends are displayed to the user, together with the options to add a friend (as described below), or the ability to find all friends. In this example, the user has selected the option "find all" friends, and if the user has more than 20 friends, the system 100 provides under block 1810 an error message indicating that the system 100 cannot locate more than 20 friends at a time. The user can then request additional friends, or a subset of these 20 friends, under block 1810. If the user elects to act on the 20 friends, or a subset thereof, both blocks 1810 and 1812 branch to an option menu 1816 that permits the user to call one or more friends, send an SMS message to one or more friends, or meet one or more friends. Likewise, after selecting the friend in block 1804 or 1806, or finding all friends under block 1814, the routine branches to the option menu 1816.

Many display screens shown in the FIGS. 17 through 34 include options "OK" and "Menu". Selecting the "OK" option selects a given choice or command displayed on the screen. The selecting the "Menu" option returns the user to the Main Menu. Additionally, many display screens shown in the FIGS. 17-34, and other functionality described herein, provide specific, suitable values for certain parameters. Those skilled in the relevant art will readily recognize that system may employ other values. For example, while the system 100 is indicated above as not being able to locate more than 20 friends at a time, an alternative system may locate only 10 friends at a time, or may be capable of locating 30 or more friends simultaneously. Thus, such specific numbers or values provided herein are only examples, and many other values may be employed.

Figure 19:
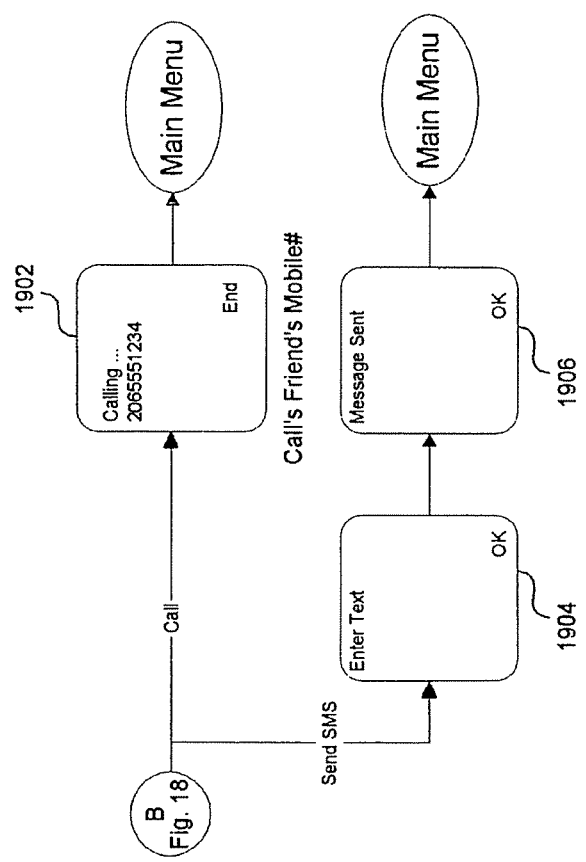

Referring FIG. 19, if the user elects to call a selected friend under block 1816, then in block in 1902, the system 100 calls that friend, and the display shown in block 1902 is provided to the user. Alternatively, if the user elects to send an SMS message, then the user is shown an input screen (block 1904) in which to enter text, and after clicking "OK", is shown a display (block 1906) indicating that the message has been sent. (The option for meeting a friend is described below.) Following blocks 1902 or 1906, the routine branches back to displaying the Main Menu.

Figure 20:
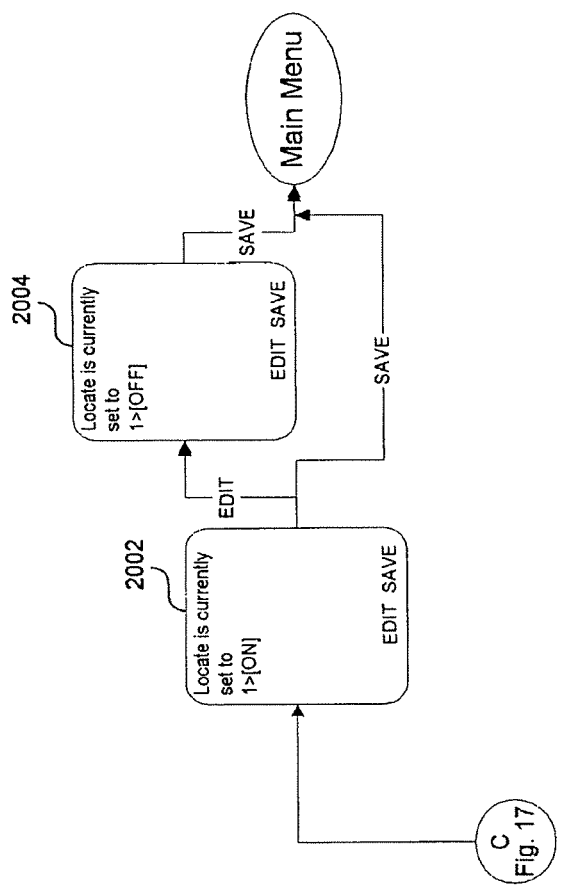

Referring to FIG. 20, if the user wishes to turn his or her location on or off with respect to the system 100, (also referred to as "going invisible/visible"), the portal 108 displays under block 2002 a screen indicating a current location status for the user. The user then may edit this state under a screen 2004. Thus, the invisibility functions are provided as a top level menu item to permit the user to readily turn off the ability to locate the user with only a minimum number of keystrokes. Invisibility may be based on time, group, etc., such as "after 10 P.M. I don't want to be visible" or "only let my family find me." The portal 108 saves the results, and the routine branches back to the Main Menu. Alternatively, some embodiments of the invention would maintain a list of friends to whom the user can never be invisible and from whom location permission cannot be withdrawn. Such a list would be useful for parents who wish to be able to locate their children, employers who wish to locate their deliverymen, or other persons who might sponsor a user's account.

Figure 21:
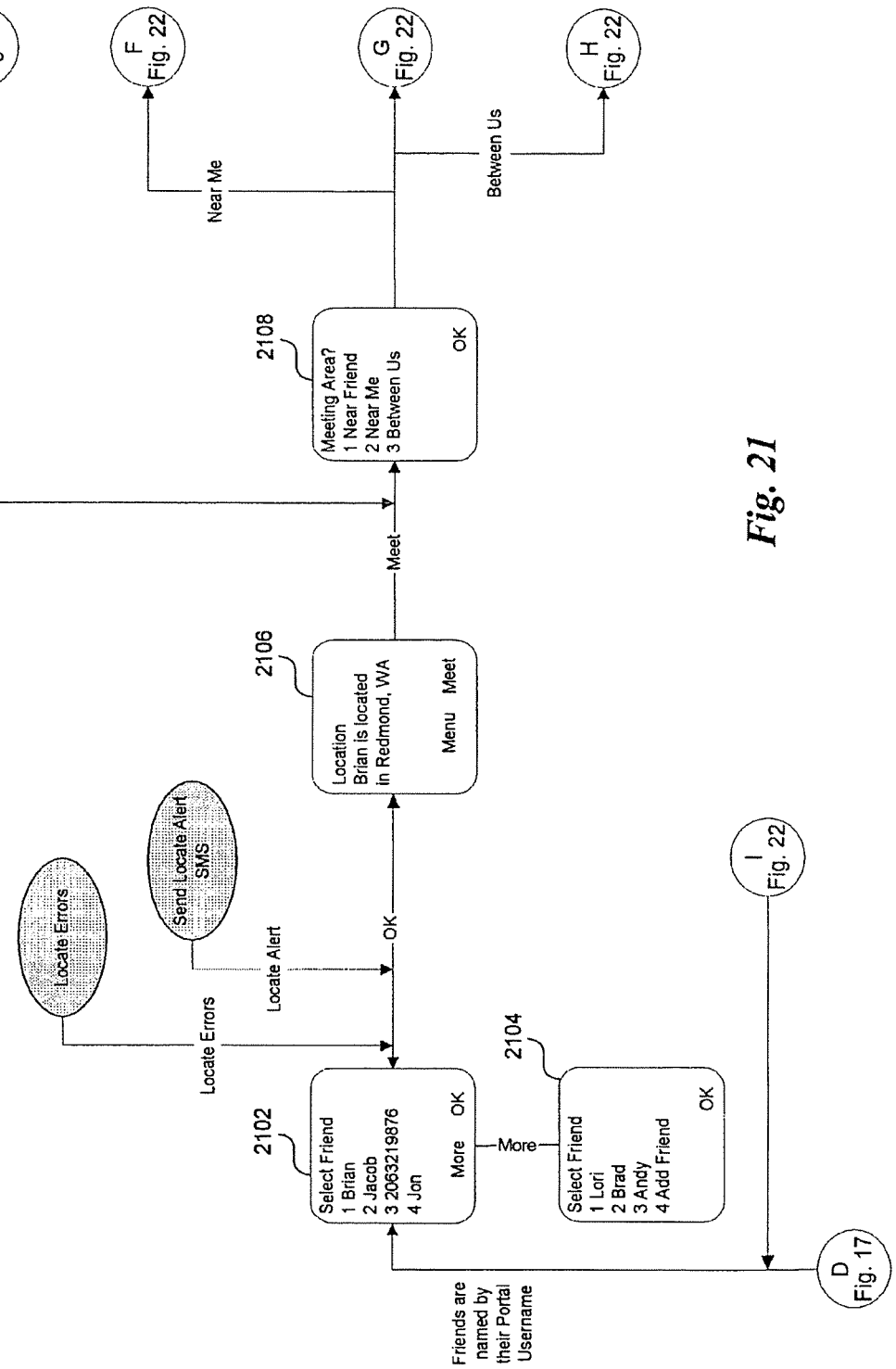

Referring to FIG. 21, if the user selects from the Main Menu to meet a friend, then under blocks 2102 or 2104, the user may select a friend, and view a location of the friend in block 2106. In block 2108, the user receives a meeting area display page which provides the options: 1) meet near the friend, 2) meet near the user, or 3) meet between the user and the friend.

Figure 22:
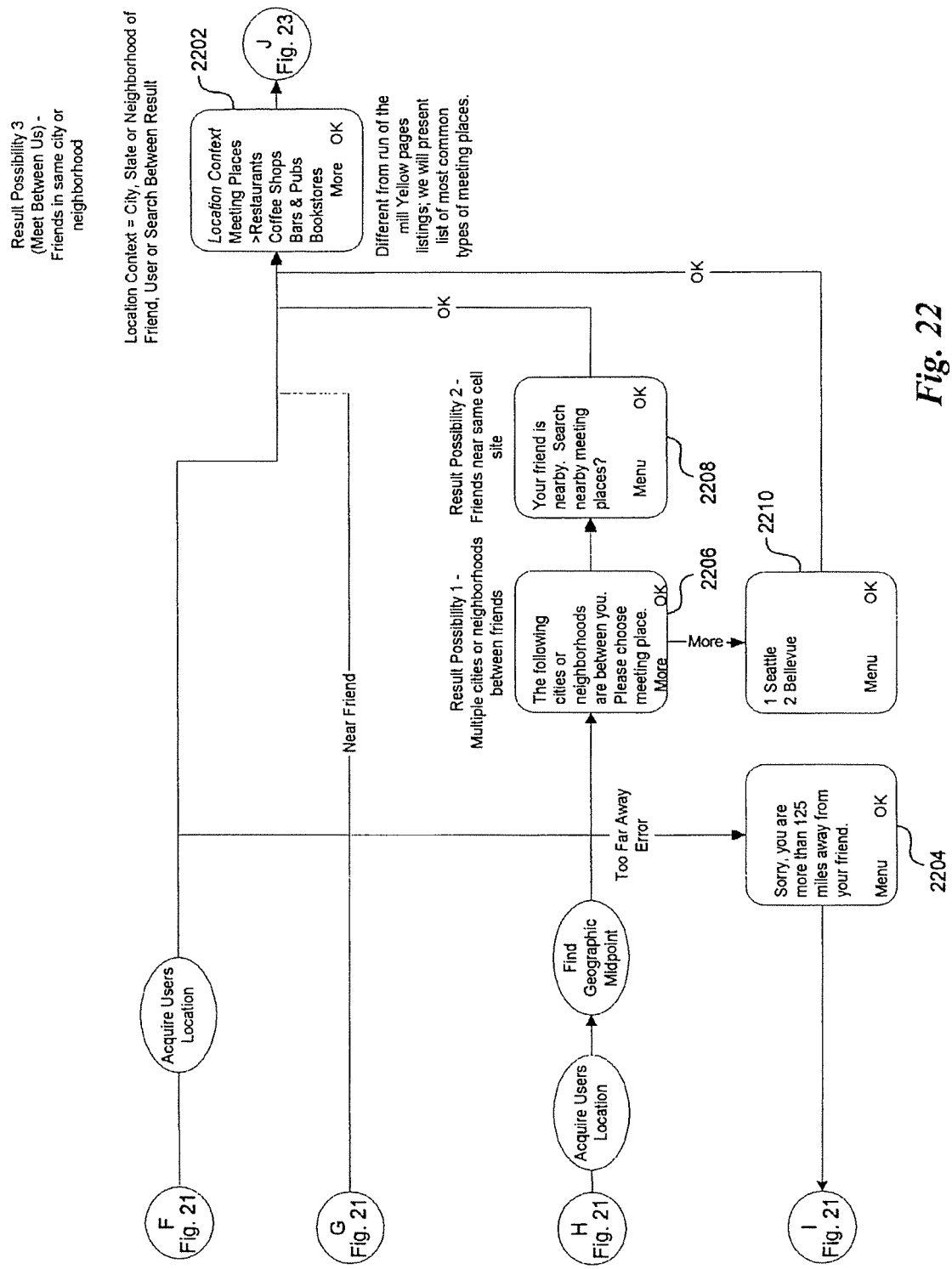

Referring to FIG. 22, if the user selects to meet near him or herself, or near the user's friend, the system acquires the user's location. After selecting to meet near the user or the friend, the user receives a meeting place or POI category list under block 2202. As shown, the list may include options such as restaurants, coffee shops, bars/pubs, bookstores, etc. Other examples of points of interest include pharmacies, hospitals, fire/police department locations, and other emergency-type locations. (In general, a point of interest may be any physical or geographic location.) The system provides a list of most common types of meeting places, as described herein. The meeting places are associated with a location or location context. The location context need not be an exact street location, but a general area, such as city, state, neighborhood, site (e.g., cell site). The portal database 124, location engine 128, or both, store such information regarding these points of interest.

If the user is too far away from his or her friend, then the user receives a too far display under block 2204. If the user wishes to meet at a geographic midpoint, then the user receives one of three possible displays: multiple cities or neighborhoods are located at the midpoint (block 2206), the friend is in the same cell site or is otherwise nearby the user (block 2208), or the friend is in the same city or neighborhood as the user. If more than one city/neighborhood are available, then the user receives a city/neighborhood select screen, as shown in block 2210.

Figure 23:
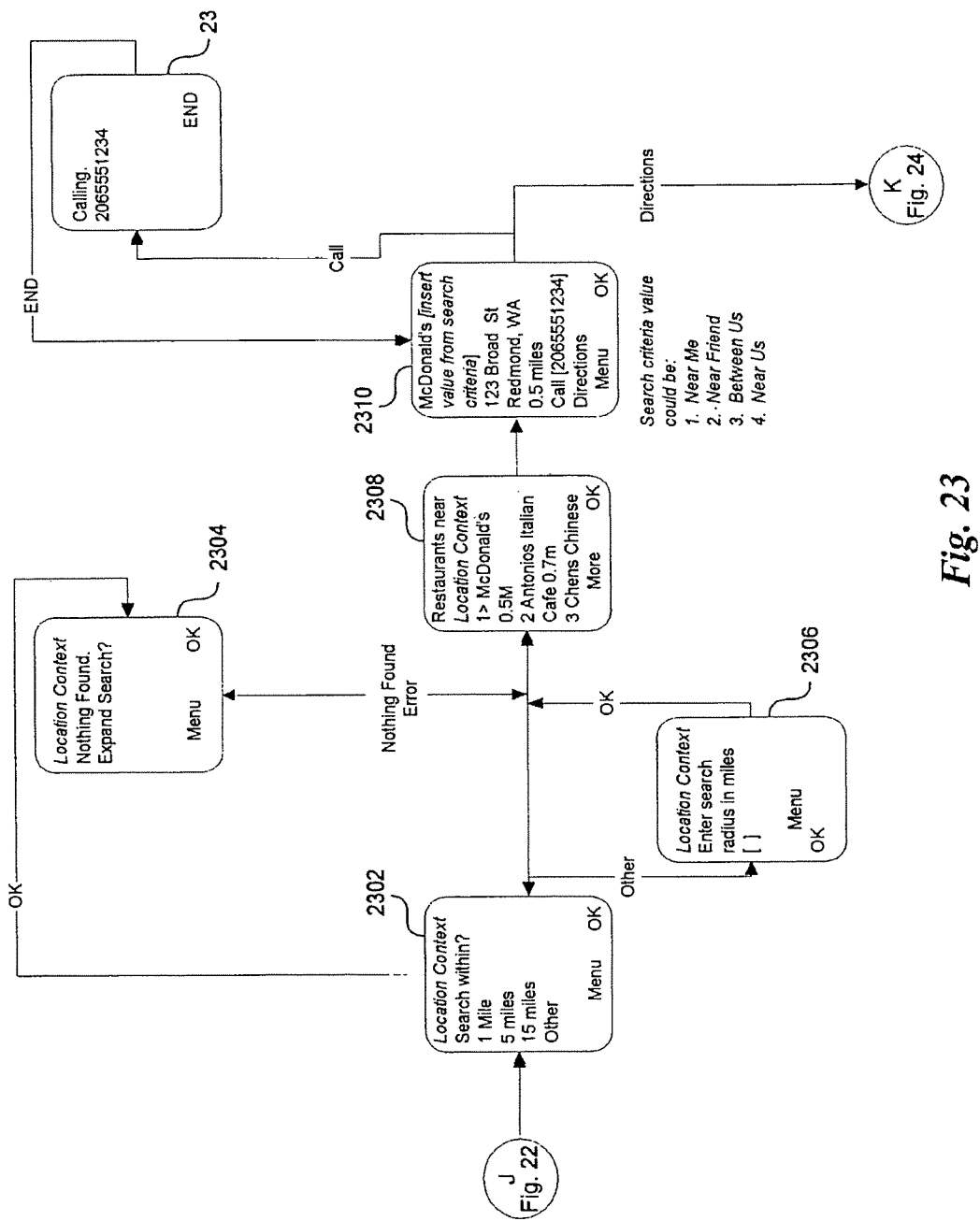

Referring to FIG. 23, after the user has selected a category of meeting places under block 2202, the user receives a search radius screen under block 2302 to select a 1, 5, 15 or other mile radius. If the user selects a radius and no POI is found within that radius, the user receives an expand search screen 2304, whereby the user may expand the radius (and is then returned to block 2302). If the user selects to enter a desired radius, the user may enter the desired radius in a radius input screen (blocks 2306). Under block 2308, the user receives a list of POIs associated with the chosen meeting place category (in this example, restaurants). After selecting a restaurant, the user receives in block 2310 details on the selected restaurant, such as its address, a distance from the user, telephone number, and options to call the restaurant or receive directions to the restaurant. If the user selects to call the restaurant, the user receives a calling display (block 2312).

Figure 24:
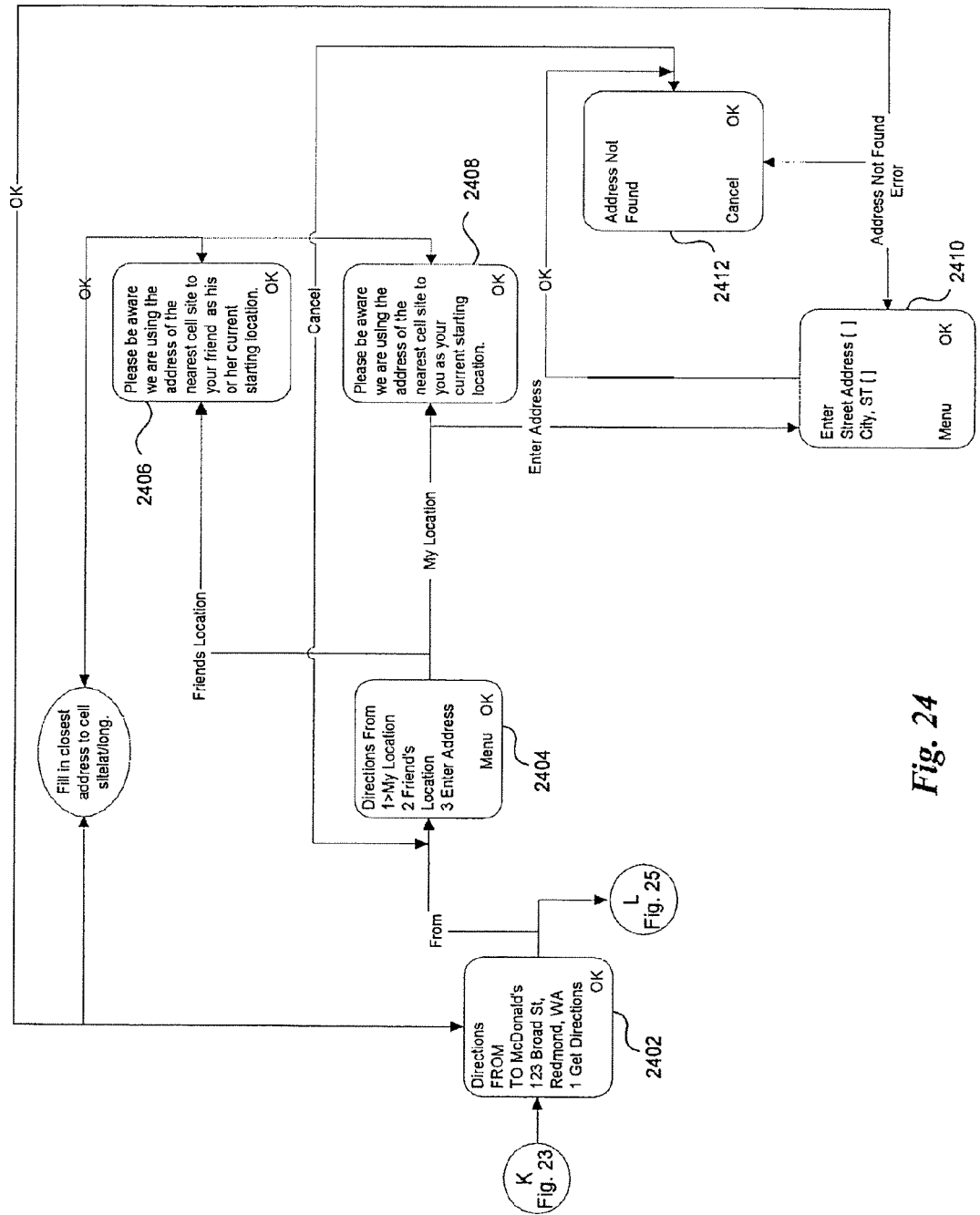

Referring to FIG. 24, if the user requests directions to the restaurant, the user receives a get directions screen, where the user must input a starting or "from" location (the "to" location, i.e., the restaurant, is already provided). To get directions, the user must input the "from" location, and thus receives a from location screen (block 2404), from which the user may select a from location: the user's location, the friend's location, or another address. If the user selects either his or her location, or the friend's location, and the system 100 is only capable of approximately locating a user, then the system 100 may provide a suitable warning screen (blocks 2406 and 2408) indicating that the system provides the nearest cell site as the current starting location, and provides that back for display in the directions screen of block 2402. If the user wishes to enter an address (e.g., to provide greater geographic specificity), then the user receives an enter address screen (block 2410). If the address is not found, the user receives an address not found screen (block 2412), and then again receives the enter address screen of block 2410. The portal 108 may automatically populate city, state and other fields when the user enters an address. For example, as the user begins to type in a city, the portal begins to automatically fill in the entire name of a first city within an appropriate radius of the user having, for example, the first two letters input by the user: The location engine may provide such a list of cities.

Figure 25:
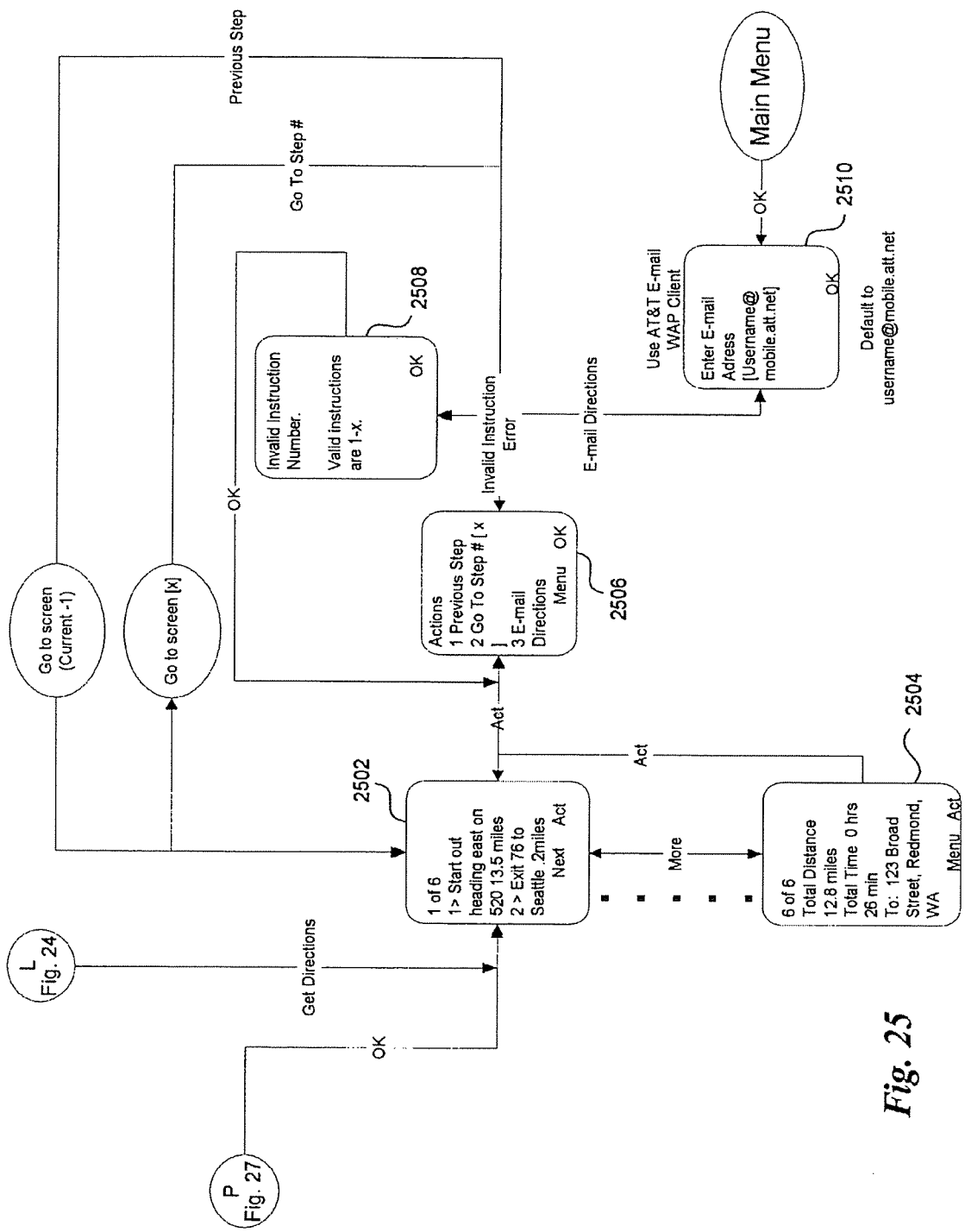

Referring to FIG. 25, after receiving the from directions, the user receives screens 2502 through 2504 that provide several screens of directions to the user. Under block 2506, the user may perform three options with respect to the directions: return to the previous screen of, or step in, the directions; jump to a desired screen of, or step in, the directions; or email the directions. The portal 108 may provide a small map with each step in the driving directions, where the map may include the current street location of the user (or friend), and any other nearby or important streets. While not shown in all Figures, if the user inputs an invalid instruction number, or otherwise selects an invalid entry, the user receives an error screen, such as that shown in block 2508. If the user wishes to email the directions, the user receives an email entry display to enter an email address (block 2510). Alternatively, the portal 108 could automatically supply an email address by reference to information in the database 124 such as the user public profile 3500 or friend data record 3900 described below or other suitable records. Thereafter, the routine returns to the Main Menu.

Referring back to FIG. 17, if the user chooses to find the nearest friend or place from the Main Menu, the user receives a find nearby places screen at block 1704. Thereafter, the routine lists categories of meeting places or lists of friends in blocks 1706 and 1708, in a manner substantially similar to that described above. The system may of course find any type of location to satisfy user needs, such as automotive services (e.g., gas stations, tow services, automotive repair locations, auto dealerships, etc.), financial institutions (e.g., banks, automatic teller machines [ATMs], check cashing locations, etc.), governmental locations (e.g., libraries, post offices, vehicle/license registration locations, police stations, fire departments, etc.), travel services (e.g., taxi services, hotels/motels, train stations, etc.), and general consumer services (e.g., laundromats, dry cleaners, grocery stores, convenience stores, newsstands, health clubs, shopping malls, copy/print stores, etc.).

Figure 26:
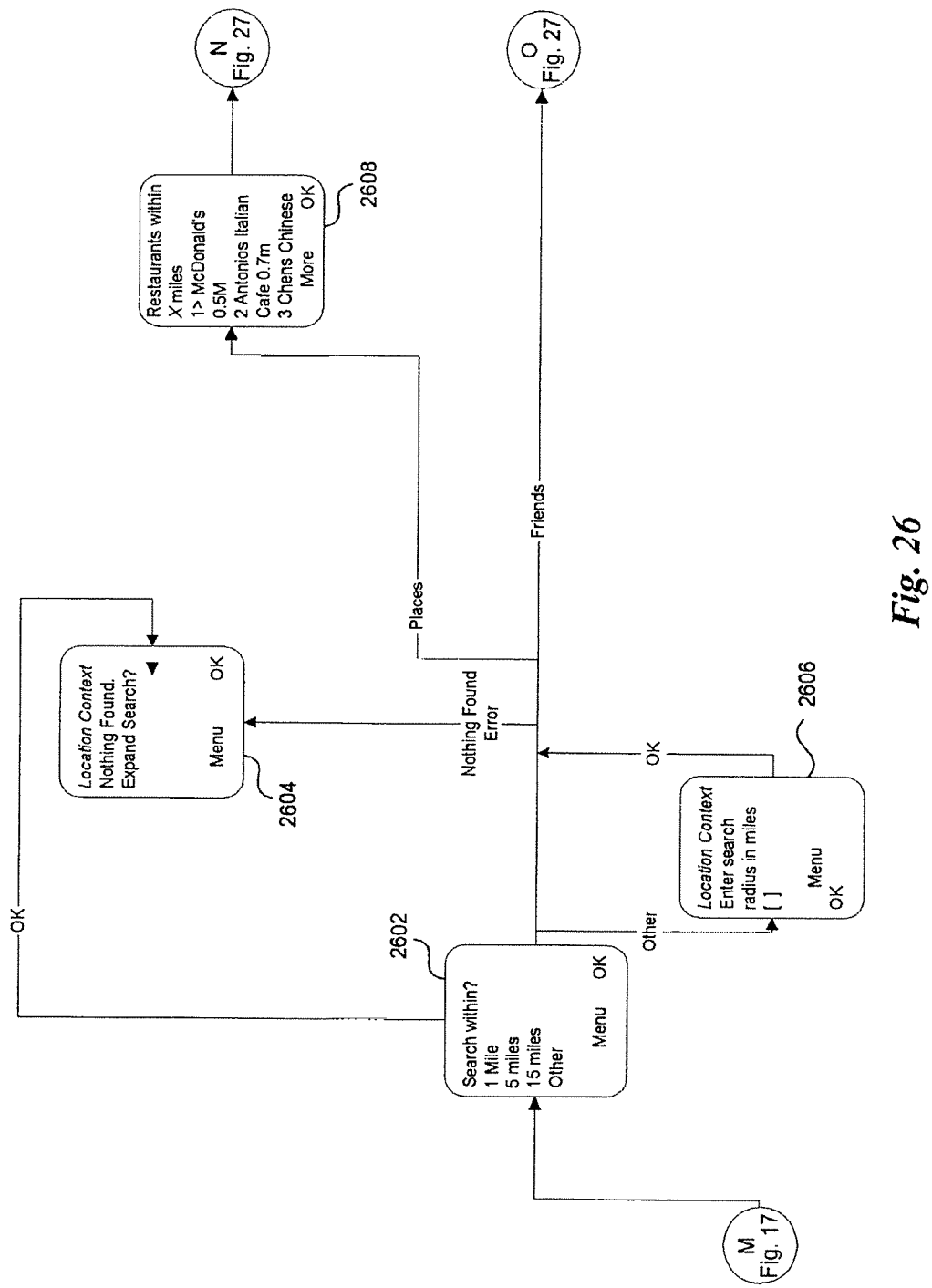
Figure 27:
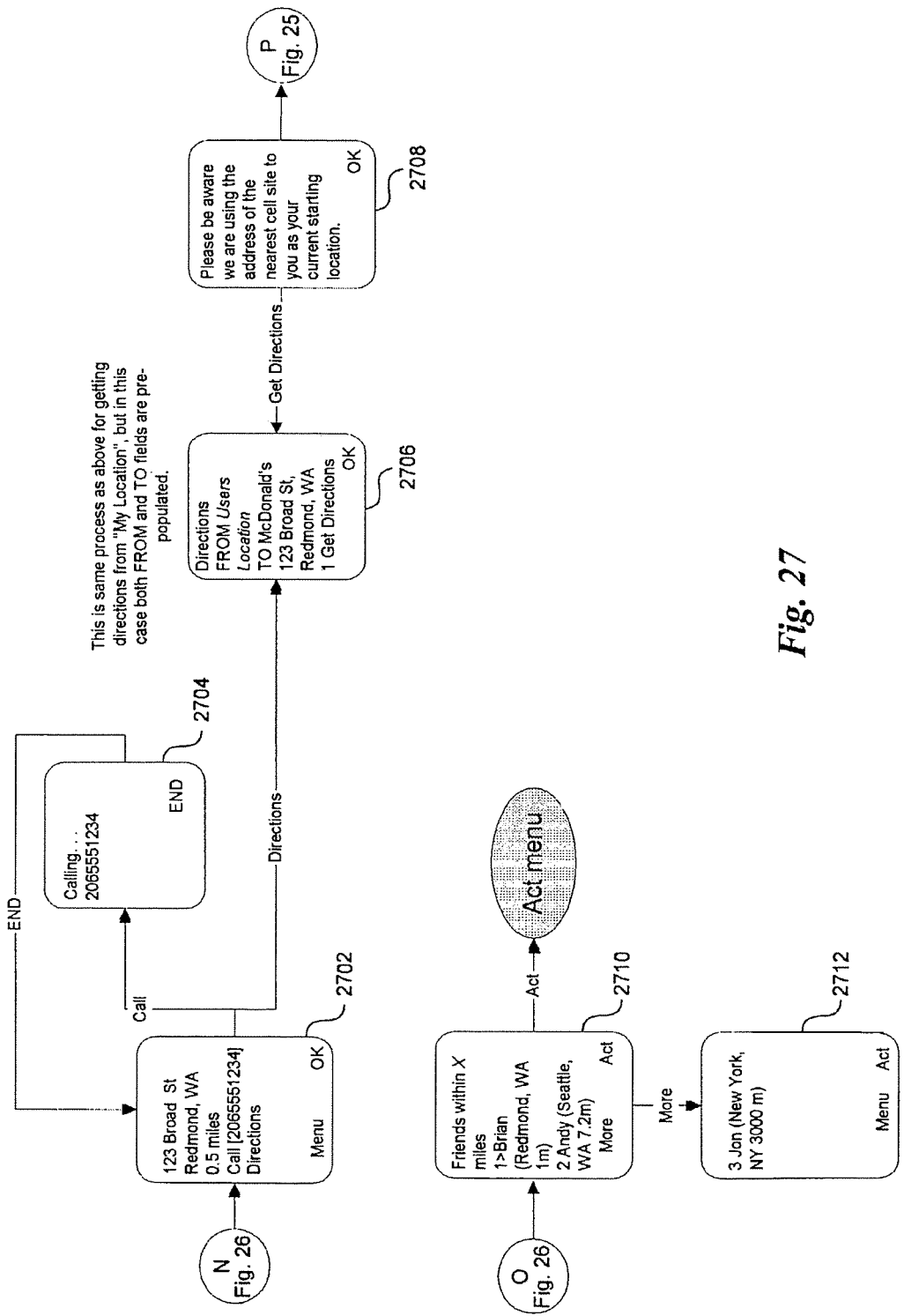

Referring to FIGS. 26 and 27, after electing to locate a place, the user receives screens for entering a search radius, list of POIs, location specifics, options and directions under screens 2602, 2604, 2606, 2608, 2702, 2704, 2706 and 2708, in a manner similar to that described above for meeting friends. If the user elects to locate a friend, the user receives the search radius screens of FIG. 26. Thereafter, in FIG. 27, the user receives a list of friends in the selected search radius under block 2710. If the user wishes to view more friends than those shown in the initial list, one or more additional friends screens are displayed under block 2712. Thereafter, the system allows the user to perform several functions, such as place a call to the friend, schedule a meeting with a friend, send an SMS message to the friend, or any other functions described herein. Additionally, the user may search for POIs in a radius around the user, the friend, a midpoint between the user and the friend, or around another POI (for example, the user may search for restaurants within one mile of a particular intersection).

Figure 28:
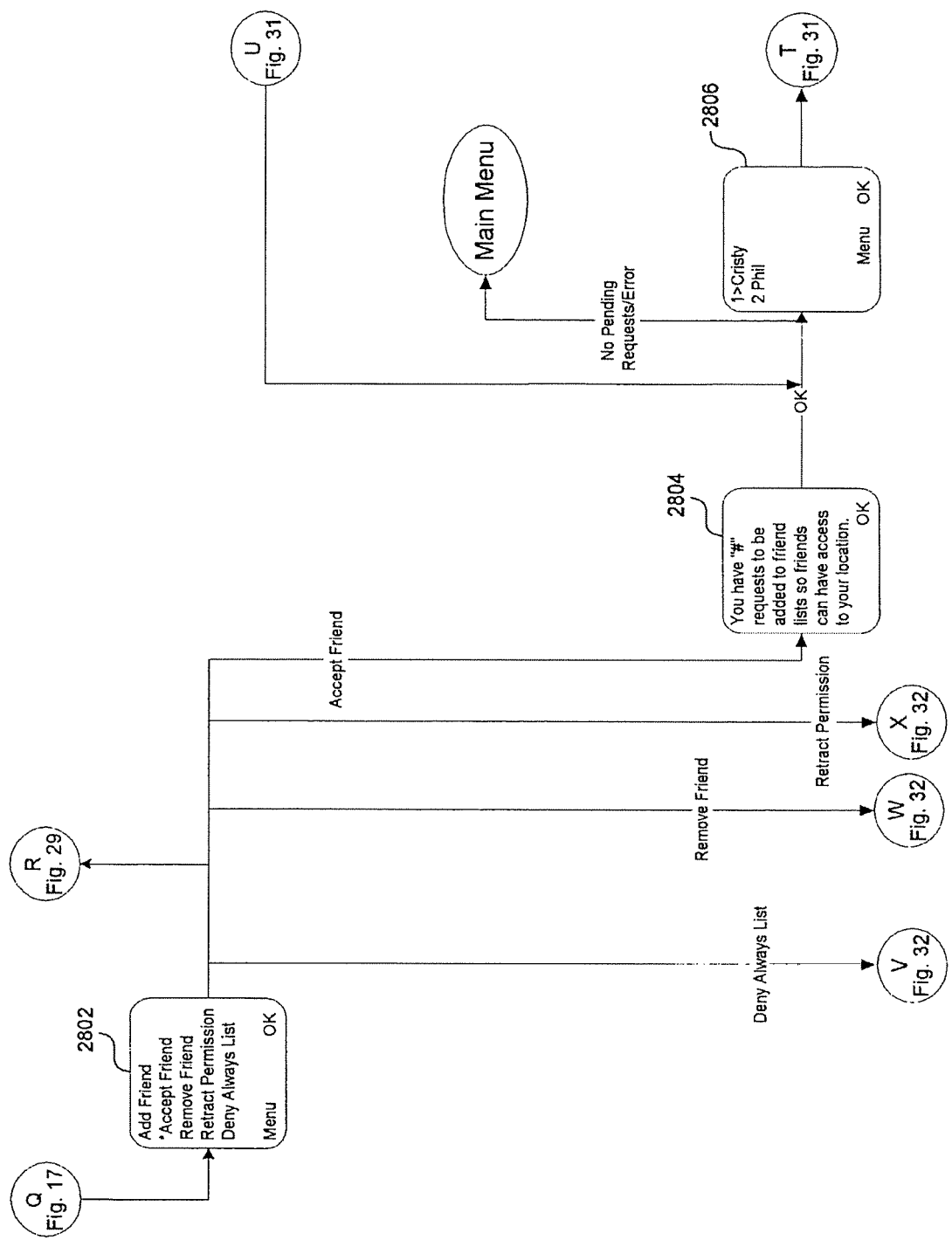
Figure 29:
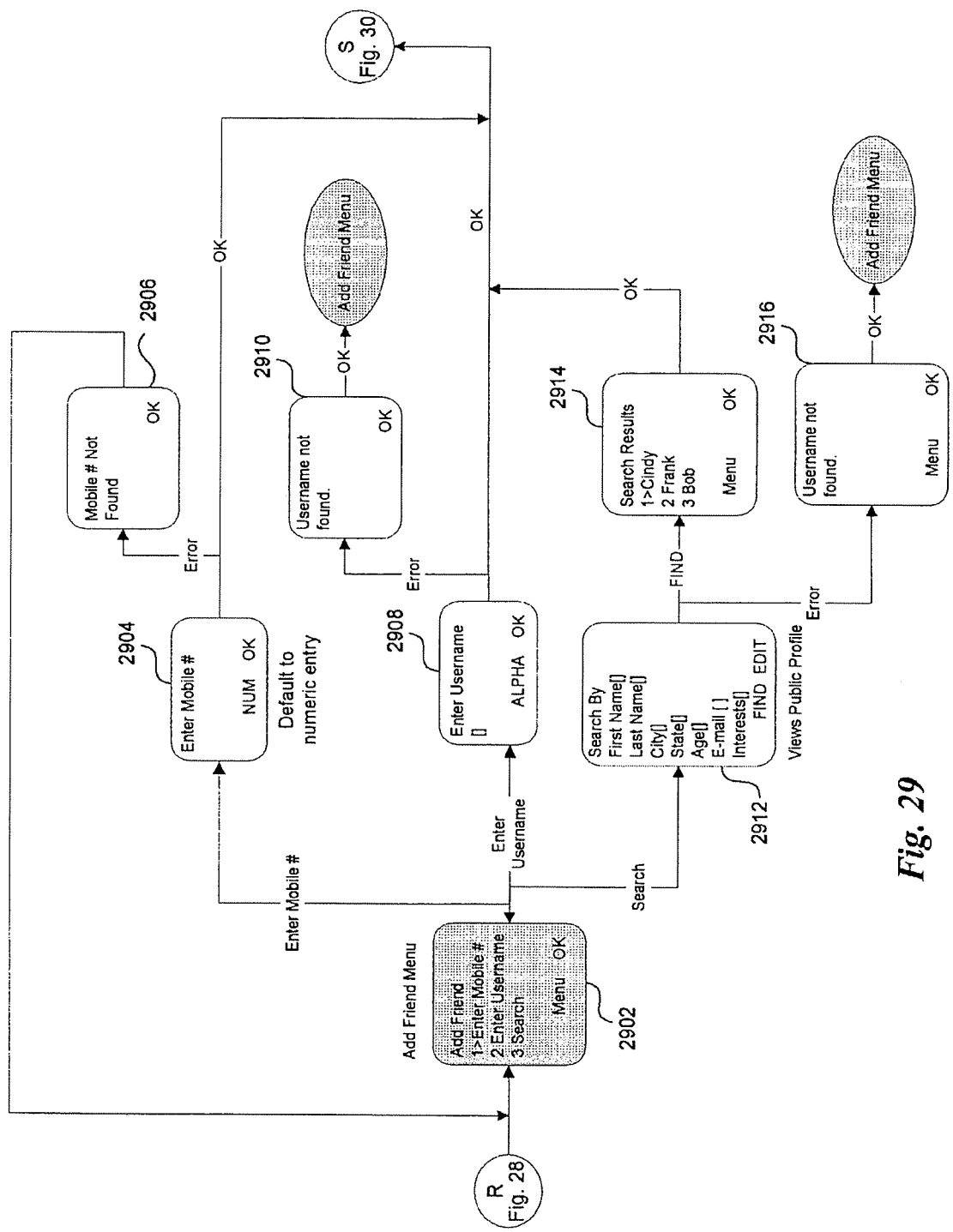

Referring to FIG. 28, if the user selects under the Main Menu to add or edit friends, the user receives an add friends option display under block 2802. As shown, the user may accept friends, remove friends, retract permissions, or edit a deny always list. If the user wishes to add a friend, then referring to FIG. 29, the user receives an add friend menu under block 2902. As shown, the add friend menu allows the user to enter the mobile number of a friend, enter the username of a friend, or search a database of public profile records for friends based on specified search criteria. Although the friends list, pending friend request list and deny always list are discussed primarily in the context of storage in the network, in some embodiments of the invention these and other lists could be stored in, and modified with, the mobile device 102. For example, the mobile device 102 may locally store the lists or records described herein within on-board memory, or in a Subscriber Identity Module (SIM) card, smart card or other removable memory.

If the user elects to enter a friend's mobile number, then the user receives an enter mobile number screen (block 2904), and if the mobile number is not found, the user receives a not found screen (block 2906). If the user wishes to enter the username, then the user receives an enter username screen (block 2908), and a username not found error screen if the username is not found (block 2910). If the user wishes to search for a friend, then the user receives a search criteria screen under block 2912. As shown, the search criteria screen allows the user to search various fields in public profile records, such as first name, last name, city, state, age, email address, interests, or any combination of these search criteria or fields. After entering search criteria, the user receives either a search results screen (block 2914), or an error screen (block 2916).

Of course, these above fields are only examples, and other fields or search criteria may be provided to the user. When users initially subscribe to the system 100, they may be required to complete a form (such as a Web page form or other electronic document) that includes not only personal information, but public profile information that the users will permit others to see or search. Of course, users may provide access privileges to some or all of the users' fields in this form, and users may edit such profile or modify such access privileges at any time.

Jumping to FIG. 35, an example of a user's public profile is shown as a record 3500. The user's public profile record includes first and last name fields 3502 and 3504, together with city, state, email address and zip code fields 3506, 3508, 3510 and 3512, respectively. The user's public profile may also include an image file 3514, or a link to an image file, that allows friends to view an image of the user. The image may be any digital image, such as a digital photograph, cartoon, animation, etc. The record may include an age field 3516, as well as one or more interest or hobby fields 3518 through 3522. Of course, many other fields may be provided. Other fields may include an instant messaging (IM) handle or username, or other user communication IDs described herein. As noted above, the user may retrieve or download a web page for electronically inputting data for these fields and create such a record that is then provided back to the portal application server 108.

Figure 30:
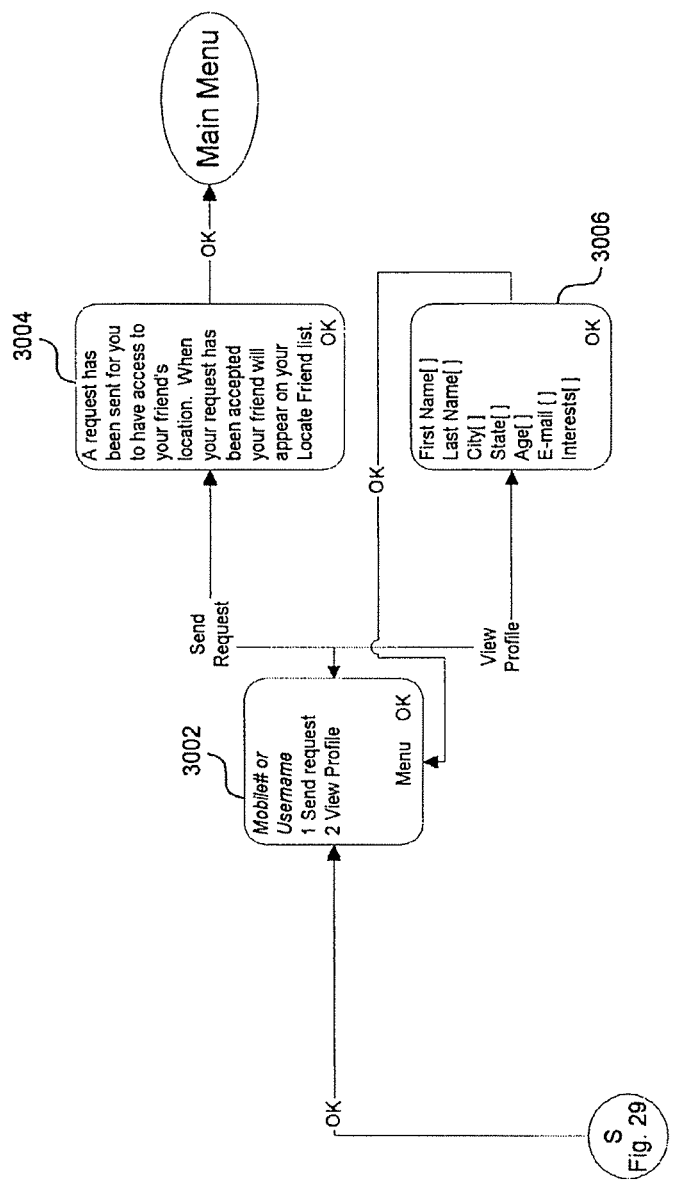

Referring to FIG. 30, after identifying a friend to add, the user receives a screen that lists the friend's mobile number or username (block 3002), and provides two options: send requests to the friend to ask whether he or she wishes to be added to the user's friends list, or view a public profile of the friend beforehand. If user wishes to simply add the friend, then the user receives an informational message under block 3004 that indicates that an SMS message (or other message) has been sent to the friend requesting that the user have access to the friend's location.

Alternatively, or additionally, the system provides some indication to the user with respect to screens displayed on the friend's mobile device. For example, the next time the friend accesses the location-based services described herein, he or she will see an asterisk next to the "add/edit friends" option in the main menu. Such a visual indication tells the user that a pending request for access exists. (If the friend denies access, the user receives a denial message.)

Once the friend accepts the request, the friend is added to the user's friends list and the user may thereafter locate the friend (unless the friend has "gone invisible" or denied the user access to this friend's location). If user wishes to first view the friend's profile, then the user receives a public profile screen (block 3006) that includes the fields listed above (e.g., first name, last name, city, state, age, etc.).

Referring back to FIG. 28, if the user wishes to accept a friend who has requested the user be added to that friend's list of friends, then in block 2804, the user receives a status screen indicating a number of pending requests the user has to be added to friends' lists so that these friends may have access to the user's location. In block 2806, the user receives a list of friends with pending requests from which the user may select a friend (and associated request).

Figure 31:
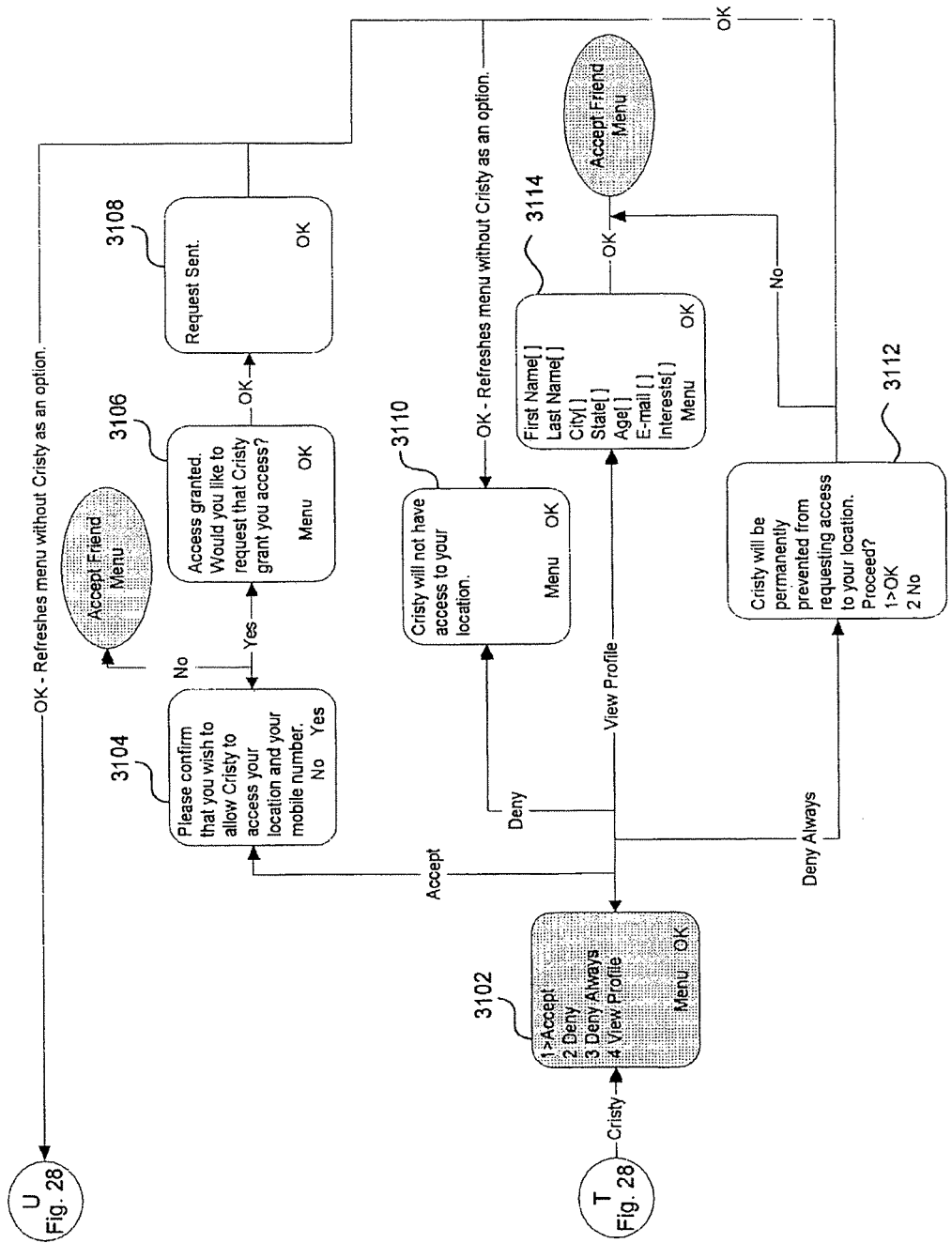

Referring to FIG. 31, after selecting a friend from the list of pending requests, the user receives an option menu in block 3102, where the user may accept the request, deny the request, always deny requests from this friend, or view a profile with respect to the requesting friend. If the user wishes to accept the request, then the user receives a confirmation screen (block 3104) that requires the user to confirm that the user wishes to permit the friend to access the user's location and mobile number. If not, then the user receives the option menu (block 3102), but if so, the user receives an access granted screen (block 3106) that also asks the user whether the user would like the system 100 to request that the friend grant the user access to the friend's location. In other words, the system does not automatically provide location reciprocally between a user and a friend, but instead first requests permission from one, and then requests permission from the other. If so, then the system sends an appropriate SMS message, and a request sent confirmation screen is provided to the user under block 3108.

If the user wishes to deny location information to the requesting friend, then the user receives a deny confirmation screen (block 3110) that indicates that the selected friend will not have access to the user's location. If the user wishes to always deny that the selected friend will have access to the user's location, or the user wishes to view the friend's public profile, then the user receives screens shown with respect to blocks 3112 and 3114, respectively. After always denying the friend, the user again receives the list of pending requests screen (block 2806), but without the selected friend listed. After viewing the selected friends profile, or not agreeing to always deny the selected friend, the routine loops back and the user again receives the screen in block 3102.

Figure 32:
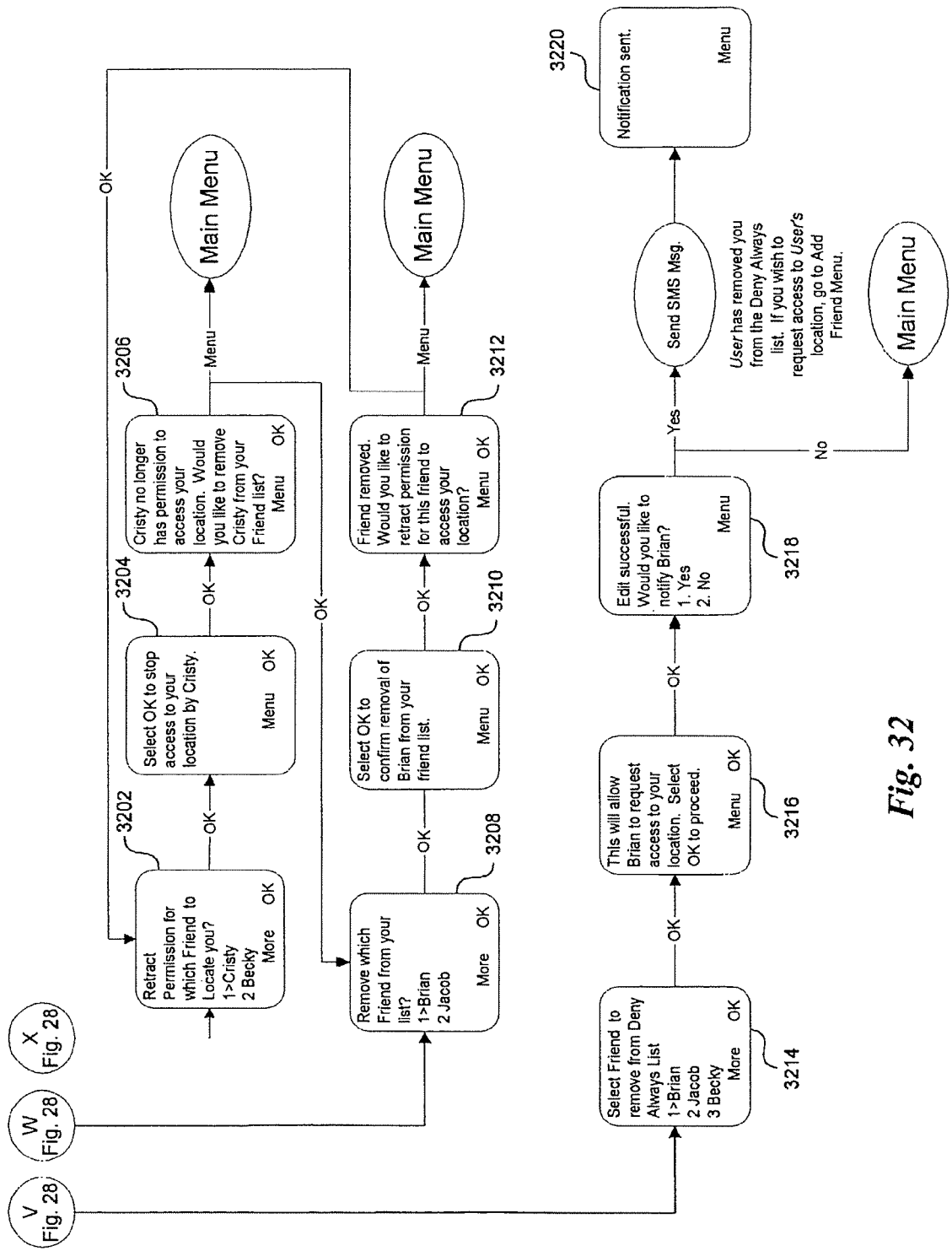

Referring to FIG. 32, if the user chooses to remove a friend under block 2802, then in block 3202, the user receives a retract permission screen that lists friends for which the user can retract permission to locate the user. Under block 3204, the user receives a confirmation screen requesting the user to confirm that the selected friend is to not to be given access to the user's location. If the user agrees, then in block 3206, the user receives a screen confirming that the selected friend can no longer have access to the user's location, and asking whether the user wishes to have the friend removed from the user's friends list.

If the user wishes to remove a friend from the user's friends list (following blocks 2802 or 3206), then the user receives a list of friends that may be removed under block 3208. Under block 3210, the user receives a confirmation screen requesting the user to confirm removal of the selected friend from the user's friends list. If the user agrees, then in block 3212 the user receives a screen confirming that the selected friend has been removed from the user's friends list, and asking whether the user wishes to retract permission for this friend to access the user's location. If so, the routine loops back to display the options under block 3202 through 3206; otherwise, the routine loops back to the Main Menu.

If the user wishes to edit his or her deny always list, then the user receives under block 3214 a list of friends on the deny always list. Under block 3216, the user receives a confirmation screen requiring the user to confirm that a selected friend on the deny always list is now to be given access to the user's location. Under block 3218, the user receives a screen indicating that the user's deny always list was successfully edited, and requesting whether the user would like the selected friend to be given notification that he or she may now have access to the user's location. If so, then the system 100 sends an SMS message to the selected friend, and the user receives a notification sent confirmation screen under block 3220. An example of such an SMS message may state "[user] has removed you from the Deny Always list. If you wish to request access to [user's] location, go to Add Friend Menu."

If a friend no longer grants access or location information to the user, that friend's user name will disappear from the user's friend list. The friend may or may not choose to send a message notifying the user of such a change. To reacquire access, the user will need to perform the add/edit friends functions described above to make another request to the friend.

Figure 33:
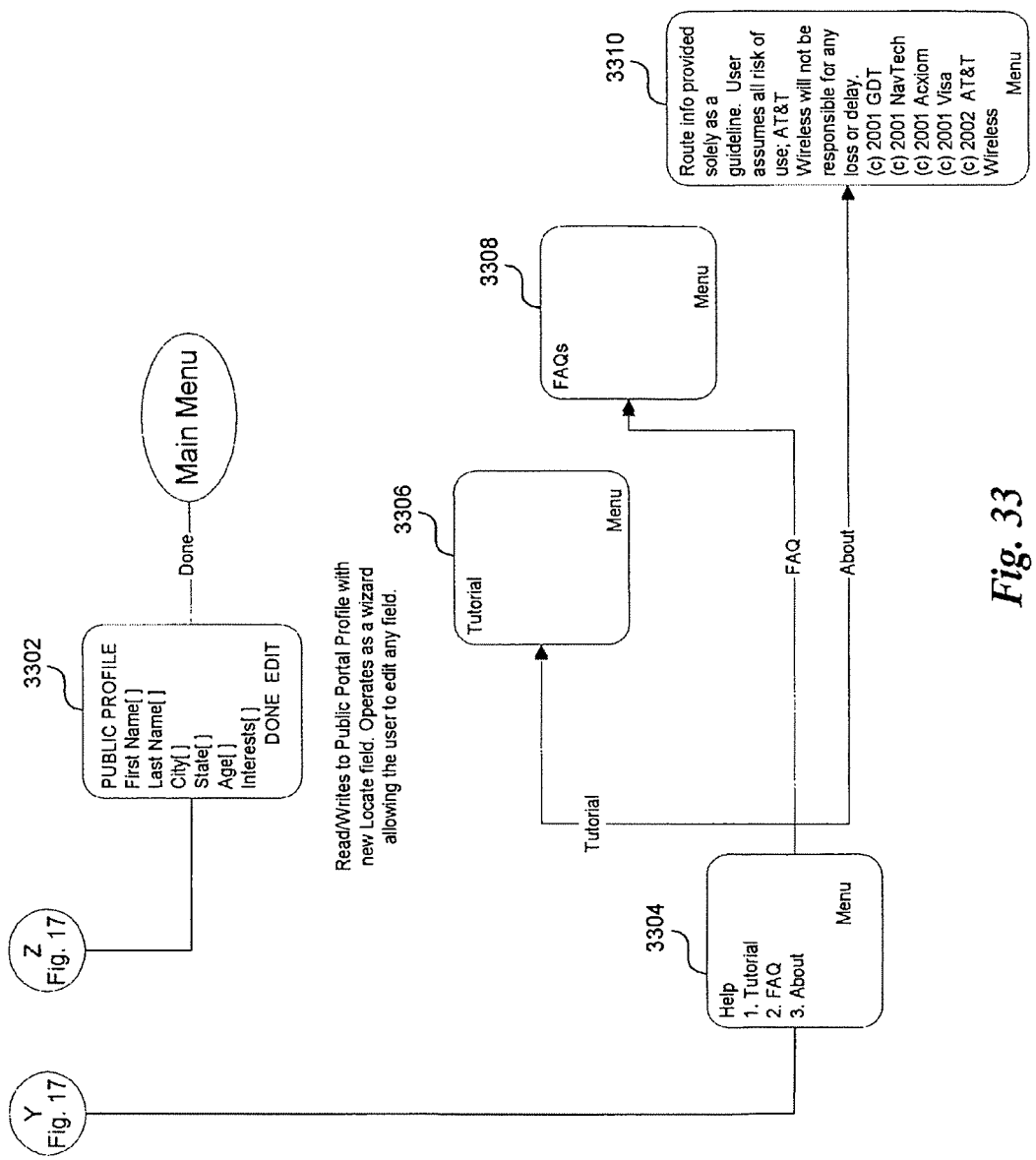

Referring to FIG. 33, if the user selects from the Main Menu to edit the user's public profile, then the user receives a public profile screen 3302 that lists the user's public profile fields, any of which the user to edit. The user's public profile is described above. The user may set flags indicating which of the fields are to be made publicly available, and may specify in which locations, or which location applications, these fields are to be provided. For example, certain location functions may display some public profile fields, which the user has specified as being made available for that application. If the user selects from the Main Menu to view help functions, then in block 3304, the user receives three options: to view tutorials, to view frequently asked questions (FAQ), and to view "about" information. In response to these three options, the user receives one or more tutorial screens (block 3306), FAQs screens (block 3308) or about screens (block 3310).

Figure 34:
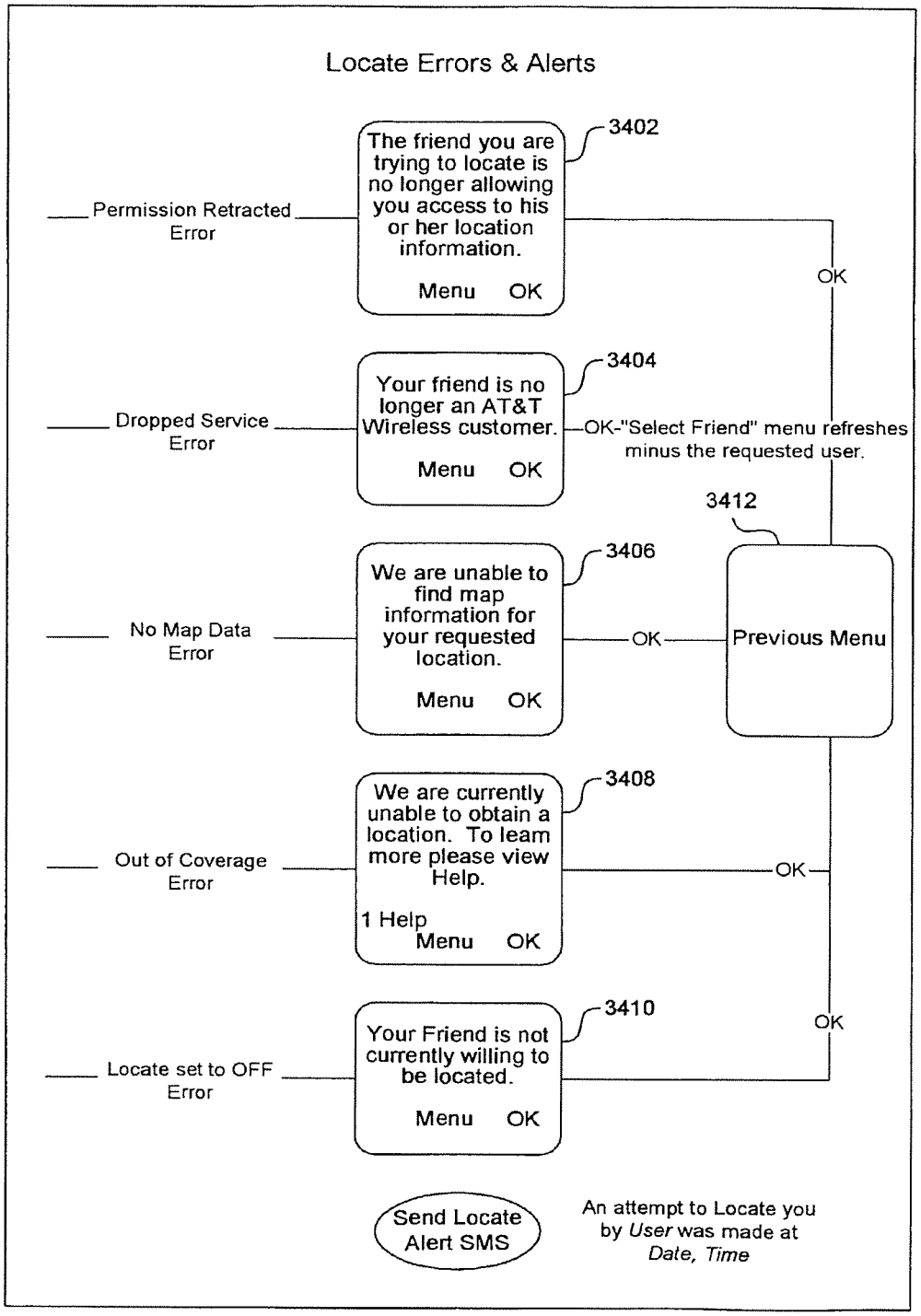

Referring to FIG. 34, examples of some errors and other alerts are shown, in addition to the error messages and alerts described above. In general, while not shown in each of the FIGS. 17 through 34, the user may receive one or more error screens in response to certain user input or system responses. For example, if the user is trying to locate a friend who is no longer permitting the user to access to the friend's location, then the user receives a permission retracted error message (block 3402). If the friend is no longer a subscriber under the system 100, then the user receives a dropped service error message (block 3404).

Following blocks 3402, 3404, or other error messages, the user may be presented with one or more options. For example, if the user attempted to locate a friend under block 1802 (or group of friends under block 1808), and receives an error message (e.g. the friend cannot be currently be found), the user may be presented with options to communicate with one or more of the friends. In the case of an individual friend that the user has attempted to locate, the system may allow the user to call or send an SMS message to that friend. Alternatively, in the case of multiple friends, the user may choose an individual friend to call, or send an SMS message to all friends. The user may have the same options to communicate with a friend had a successful location occurred.

If the user is attempting to obtain map information for a given. location, but such information is unavailable, the user receives a no map data error message (block 3406). If the system is unable to obtain location information, then the user receives an out of coverage error message (block 3408). If a friend is currently unwilling to be located (has "gone invisible"), then the user receives a locate set to off error message (block 3410). Following blocks 3402 through 3410, the routine loops back to display a previous menu of options to the user under block 3412.

Representative Data Structures

Referring to FIGS. 36-40, examples of tables, records or other data structures stored in the portal database 124 to assist in providing the above functionality will now be described. (The public profile of FIG. 35, described above, is also stored in the portal database 124.) Referring to FIG. 36, a table 3600 shows a list of friends who have granted the user permission to receive their location (the "friends list"). As shown, this friends list includes five friend fields 3602 through 3610, having usernames associated with Friends 1 through 5, respectively. As shown, a locate flag is associated with only Friends 1 and 3, which indicates that the user may only receive location information with respect to these two friends. The other friends have not yet granted the user permission to receive their location information.

While each friend is identified in the record based on the friend's username, each friend may be associated with another data element. Alternative data elements or identifiers include the friend's: mobile number, email address, instant messaging handle, username alias, or any other type of user communication ID that identifies the user, or computing or telecommunications equipment associated with the user. In other words, while the record 3600 (and other records) is keyed to the friend's username, other data may be employed, such as the friend's mobile number, email address, alias, or other information provided in a friend data record (described below).

Referring to FIG. 37, a record 3700 is shown as a table of friends to whom the user has granted permission to receive his or her location (sometimes referred to above as a friend's list of friends). Again, five friend fields 3702 through 3710 are provided for five friends Friend 1 through Friend 5 and their associated usernames. As shown, a locate flag is associated with Friend 2 and Friend 4. Thus, Friends 2 and 4 may receive information from the system regarding the location of the user.

Referring to FIG. 38, a record 3800 is shown as a table of friends who the user wishes to always deny his or her location (often referred to above as a "deny always" list). Again, Friends 1 through 5 are shown associated with their usernames in fields 3802 through 3810, respectively. As shown, a locate flag is associated with Friend 5, indicating that the user wishes to always prohibit Friend 5 from locating the user.

As noted above, the user may send messages via the system to friends to ask that these friends provide their location data to the user, and thereby allow the user to add friends to the record 3600. If a friend accepts, then the system adds an appropriate locate flag (possibly with an appropriate username) to the record 3600. Similarly, the user may readily modify the records 3700 and 3800 to change locate flags and grant permission to friends to receive the user's location, or always deny the user's location under these records, respectively. Thus, the portal database 124 maintains these records above to ensure current permissions or privileges are provided.

While three records are shown and described, the system may instead employ a single record, or other data structure configurations to track this information. Likewise, for each friend listed under records 3600 through 3800, additional information may be provided regarding each friend, such as the friend's mobile number, email address, instant messaging handle, etc. Alternatively, referring to FIG. 39, a record 3900 is shown for friend data associated with one of the user's friends. Each of the records 3600 through 3800 may be linked or keyed to a particular friend data record 3900 to provide the user with access to additional information regarding each friend. Alternatively, such additional information may be provided by the friend's public profile (FIG. 35).

As shown in FIG. 39, the friend data record 3900 includes a username field 3902 that includes the user's alphanumeric username. A mobile number field 3904 includes a numeric value of the friend's mobile telephone number, or other related number. While the mobile number is used here as a key to identifying friends or the user, various other numeric identifiers may be employed, such as a Mobile Identification Number (MIN), Temporary Mobile Subscriber Identifier (TMSI), International Mobile Equipment Identifier (IMEI), International Mobile Station Identifier (IMSI), and others. Thus, one or more of these values may also be included in the friend data record 3900, and other relevant records described herein.

An email address field 3906 includes the friend's email address, while an instant messaging handle field 3908 includes an IM username for the friend. A username alias field 3910 may be an alphanumeric name that the friend has provided as a more complete description or identifier from the user, beyond the other fields provided here. The friend data record 3900 may include other fields, such as a user image field or file 3912. Other user communication identifiers may be provided, such as facsimile numbers associated with the friend, pager numbers, URLs, network addresses for equipment associated with the friend, and the like.

Referring to FIG. 40, a record 4000 is shown as a table of options for affecting user location data ("invisibility list"). As noted above, a user may not only prohibit the system from providing location data with respect to the user, but may also provide more customized invisibility options. For example, the user may establish invisibility options with respect to certain individuals. As shown in FIG. 40, a user in this example has previously established and identified three friends under fields 4002-4006, to which he or she wishes to provide customized invisibility options. A locate flag associated with Friend 1 is set to always be on so that Friend 1 may always locate the user, even if the user turns the locate feature off ("goes invisible"). For example, Friend 1 may be the user's spouse, and the user always wishes his or her spouse to locate him or her. In this example, a "Set On" flag may not be easily modified by the user.

As explained above, the user may become "invisible," so that the system does not provide the user's location data to any friend. Alternatively or additionally, the user may selectively become visible or invisible to certain friends. For example, the user has set an "On" flag with respect to Friend 2, so that when the user goes invisible, Friend 2 will still be able to find the user. The "On" flag may be readily turned off or removed at the user's discretion. Conversely, the user may set a "Off" flag with respect to a friend so that that friend may not locate the user until the user has removed the "Off" flag.

Likewise, the user may establish invisibility options with respect to certain schedules. As shown, the user has identified three schedules (fields 4008-4012). Schedule 1 has a flag "Set Off" associated with a schedule indicating to the system not to provide the user's location to anyone before 6 AM and after 10 PM. In other words, the user automatically goes invisible between 10 PM and 6 AM. Again, the user may not readily modify the "Set Off" flag. To avoid conflicts with other rules or flags, the user (or the system) may establish that, e.g., friend options take precedence over schedule options. Thus, the system may always provide location information to Friend 1, even if before 6 AM and after 10 PM.

In this example, the user has established two additional schedules: Schedule 2 (for a lunchtime schedule of 12 PM to 1 PM), and Schedule 3 (every Friday), the latter of which has a flag "Off". Thus, the user has indicated to the system that the user is to be automatically invisible every Friday.

The user may establish invisibility options with respect to geographical criteria. As shown, the user has identified three location criteria (fields 4014 through 4018). Location 1 has a flag "Set off" associated with a radius of more than 50 miles, which may represent that whenever the user leaves the user's predetermined metropolitan area, the user is to automatically go invisible. Location 2 is associated with a 30 mile radius surrounding ZIP code 70047, while Location 3 is associated with a particular city ("Tacoma"). As shown, the user has set a "Off" flag associated with Location 3, and thus whenever the system detects that the user's mobile device is in the Tacoma area, the user is to go invisible.

Various other alternatives are possible. For example, the user may establish custom rules for going invisible. As shown, a Custom 1 field 4020 indicates that the system may provide the user's location to Friend 3 during lunchtime, even if the user has gone invisible. Those skilled in the relevant art will recognize that various other options or rules for affecting user location data may be established. For example, the user may establish a rule whereby the system automatically provides the user's location to a friend (such as via an appropriate SMS message) when the user is within or reaches a particular location. Alternatively, or additionally, the portal 108 may notify the user when friends who have previously accepted the user's meeting request are arriving at the meeting location. Such an option may be desirable for careers or common carriers to indicate to a central dispatcher or location that a courier has arrived at a desired destination. In addition to permitting the user to modify such options on the user's mobile device 102, the system may provide a Web front end so that users may access the portal 108 and modify these and other options and menus via the Internet using a computer.

While the terms "field" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

Figure 41:
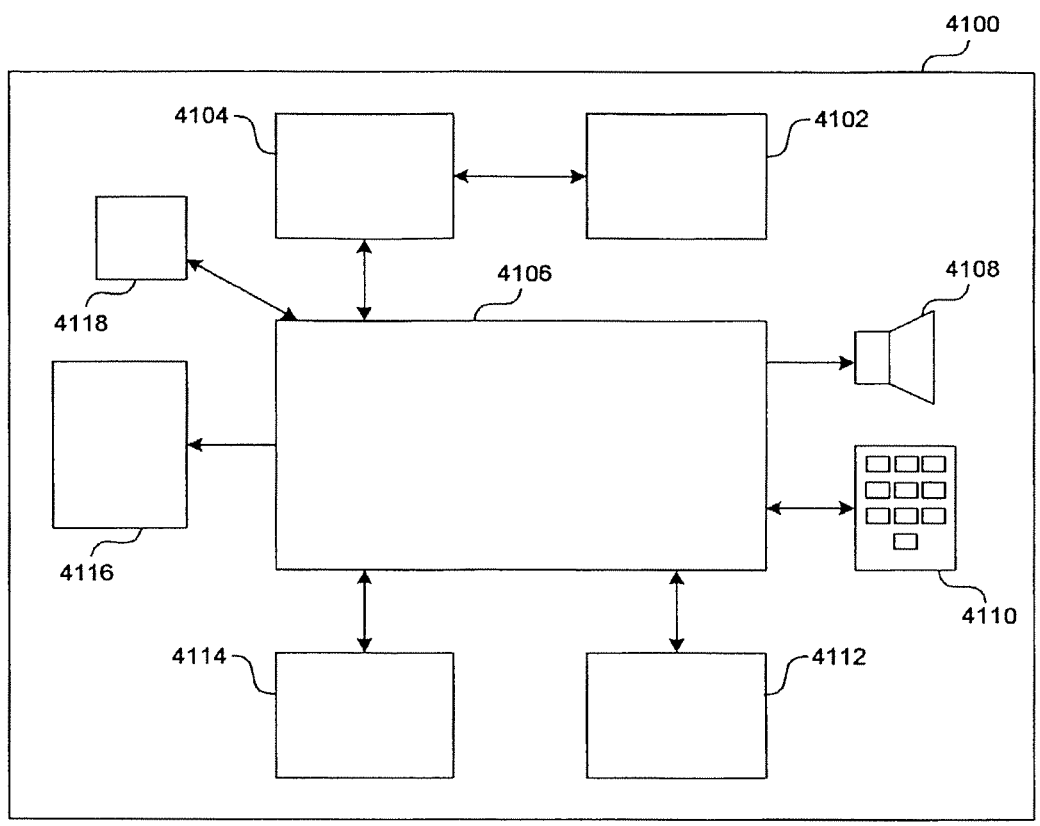
FIG. 41 is a block diagram of a suitable mobile device.

FIG. 41 shows a block diagram of a typical mobile communication device 4100 such as a mobile station or the wireless device 102. The mobile device 4100 has one or more internal or external antennas 4102 for receiving and transmitting electromagnetic signals such as radio frequency signals. A transceiver 4104 is connected to antenna 4102 and typically provides modulation and demodulation of the transmitted and received signals, respectively. A processor unit 4106 connected to the transceiver 4104 may comprise a signal processor, microprocessor, ASIC, or other control and processing logic circuitry. A processor unit 4106 may perform signal coding, data processing, input/output processing, power control, and other functions necessary for implementing a mobile communication device. A user might provide input to the processor unit 4106 via a keypad 4110, speaker/microphone 4108, or display/touchpad 4116. In turn, the processor 4106 might provide information to the user via the display/touchpad 4116 or speaker/microphone 4108. Additionally, the processor 4106 may access information from, and store information in, a non-removable memory 4112 or a removable memory 4114. Non-removable memory 4112 may consist of RAM, ROM, a hard disk, or other well-known memory storage technologies. Removable memory 4114 may consist of Subscriber Identity Module (SIM) cards that are well known in GSM communication systems or other well-known memory storage technologies. The mobile communication device 4100 may also include an optional GPS or other locational chipset or receiver 4118 that provides latitude and longitude information about the mobile device's 4100 current location.

In some embodiments of the invention, the mobile device 4100 could store friend list information in the removable memory 4114 or non-removable memory 4112. Such friend list information could include, for example, the list of which friends the user has granted permission to locate the user, the list of friends that have granted the user permission to locate them, the list of pending requests for location permission, the list of meeting RSVPs, or the list of other subscribers who will always be denied permission to locate the user. Indeed, any of the data structures or records described above may be stored in the removable memory 4114. Upon receiving a command from an input device, such as a keystroke on the keypad 4110, the processor unit 4106 would retrieve or store friend list information from/to the removable memory 4114 or non-removable memory 4112.

In some embodiments of the invention, a software flag could be implemented in the removable memory 4114 or non-removable memory 4112 to indicate the "be invisible" status of the mobile device 4100. When the system 100 attempts to locate the mobile device 4100, it may perhaps interrogate the mobile device 4100 for the status of the "be invisible" flag. If the flag is set to "be invisible" then the system 100 would report back to the application that requested the location of mobile device 4100 that mobile device cannot be located at this time. Having the "be invisible" flag in the mobile device 4100 rather than the portal would require extra signaling in the network (from the portal 108 to the mobile device 4100) to discover the invisibility status of the mobile device 4100 after a request for its location has been made.

If the mobile device 4100 is equipped with a GPS receiver 4118 that provides latitude and longitude information about the mobile device's current location, then portal 108 may skip the requests to GMLC 126 for geo-coding and proceed directly to the requests for reverse geo-coding from location engine 128. Thus, an on-board GPS receiver 4118 would affect signal flows by eliminating the need for some latitude/longitude requests to the GMLC 126 discussed above.

Many alternatives are possible. For example, a dedicated button or switch may be provided on the mobile device 4100 to permit the user to readily turn invisibility on and off. Alternatively, or additionally, much of the functionality described as being implemented by the portal server 108 may be performed by the mobile device 4100, such as tracking pending requests/RSVPs, formulating finding requests or queries for location-based services, etc.

CONCLUSION

A service provider providing the functionality described above may derive revenue based on kilobyte traffic or usage. For example, each message sent, or corresponding reply, may generate revenue based on system usage. Alternatively, or additionally, the service provider may provide such functionality on a subscription basis. The service provider may provide premium content or features to users at rates higher than simple subscription fees for a data plan. For example, a user may coordinate to meet a friend at a movie theater, concert, play, etc. With premium services, the user may then have access to ticket purchasing services, such as those provided over the Internet, to purchase tickets (e.g., www.fandango.com or www.ticketmaster.com). Likewise, if the user wishes to identify a restaurant at which to meet a friend, the user may access a restaurant ratings service, such as www.zagat.com.

Alternatively, or additionally, a service provider providing the functionality described above may derive revenue by billing content providers for responding to certain user location requests. For example, if a user requests the system to identify the closest Starbucks™ or other name brand retailer, the system may then bill the corresponding retailer for providing such information to the user. Likewise, the user may request the location of the nearest retailer offering a particular deal (e.g., a sale on a particular vehicle), and the service provider then receive a fee from the merchant for providing the information, or even a fraction of any sale consummated with the user.

The service provider may also obtain revenue on a per use basis. For example, each time the user performs a proximity search (e.g., to find the nearest name brand fast food restaurant), the user may be charged a flat fee. Other fee generating examples may include the user requesting a graphical map of locations or directions, results of a traffic query, etc.

Those skilled in the relevant art will recognize that the location-based functionality and systems described above have many potential applications. For example, young adults may employ such functionality and systems to find friends and arrange a meeting at a local mall. College friends may locate one another nearby for a "pick-up" game of basketball. A business person may locate a nearest technician to arrange for her to service the user's computer. One family member can determine whether another family member is near a grocery store to pick up groceries on the way home from work. Content developers can use the location technology to develop advanced applications like "treasure hunt" games, orienteering events, sophisticated fleet tracking systems, etc.

In at least one embodiment described above, the system provides options to protect user's privacy. For example, users can quickly and easily turn on/off the location feature ("go invisible") at any time. Users must grant permission before a friend can add them to the list of friends he or she can locate. Once granted, users can revoke permission at any time, halting access by any or all individuals to their location information. Once a user gives a friend permission to locate his or her phone, that friend can do so any time the phone is on unless the user turns off the locating ability to make the phone go "invisible" or revokes access for that person. To prevent unwanted requests, users can permanently block a person from re-requesting access to their location (deny always). Further, the system may share a user's location only with parties a user has expressly authorized to receive the user's location.

Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to." Words using the singular or plural number also include the plural or singular number, respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or functions are presented in a given order, alternative embodiments may perform routines having steps or functions in a different order. The teachings of the invention provided herein can be applied to other systems, not necessarily the wireless telephone system described in detail herein. These and other changes can be made to the invention in light of the detailed description.

The elements and acts of the various embodiments described above can be combined to provide further embodiments. All of the above U.S. patents and applications and other references are incorporated herein by reference. Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Although the invention has primarily been described in the context of acquiring latitude and longitude from a GMLC, a GPS or similar receiver in the mobile device could furnish latitude and longitude information. For mobile devices so equipped, latitude and longitude could be obtained by a query from the portal to the mobile device or even passed from the mobile to the portal without use of a query. For instance, a request from the mobile to locate nearby restaurants could include the user's current location as a data field in the request, thus eliminating the network signaling to the GMLC and resulting in a quicker response from the system. Moreover, any location determining system may be employed with the functionality described above.

Although the invention has been primarily described in the context of delivering messages and notifications with SMS, many equivalent technologies could be used instead, such as e-mail or multi-media messages that may include pictures, icons, animation or sounds.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A communications device comprising:
    a processor; and
    memory coupled to the processor, the memory comprising executable instructions that when executed by the processor cause the processor to effectuate operations comprising:
        receiving a request to add a friend to a friends list on the communications device; and
        responsive to receiving the request, when a privacy setting comprises a first setting, receiving:
            an indication of a location of a device associated with the friend; and
            an image, obtained from a public profile, of the friend.

2. The communications device of claim 1, the operations further comprising:
    rendering, on the communications device, an indication of the image.

3. The communications device of claim 1, the operations further comprising:
    rendering, on the communications device, the indication of the location.

4. The communications device of claim 1, wherein:
    the location comprises a geographical location.

5. The communications device of claim 1, wherein:
    the location is indicated on a map.

6. The communications device of claim 1, wherein:
    the indication of the location further comprises a message.

7. The communications device of claim 1, the operations further comprising:
    rendering, on the communications device, directions to the location.

8. The communications device of claim 1, the operations further comprising:
    providing, via the communications device, communications with the friend.

9. The communications device of claim 1, wherein:
    the communications device comprises a wireless communications device.

10. The communications device of claim 1, the operations further comprising:
    receiving a second request to add a second friend to the friends list on the communications device; and responsive to receiving the second request, when a privacy setting of the second friend is the first setting, receiving an indication of a location of a second device associated with the second friend.

11. The communications device of claim 1, the operations further comprising:
searching, via the communications device, for a second location proximate the location.

12. The communications device of claim 1, the operations further comprising:
rendering, via the communications device, directions to a second location proximate the location.

13. The communications device of claim 1, wherein:
the location is determined in accordance with at least one of:
geo-coding;
reverse geo-coding;
proximity searching;
routing;
map generation;
a latitude and longitude associated with a cell site in which the friend is located;
or
GPS.

14. The communications device of claim 1, the operations further comprising:
removing the friend from the friends list on the communications device responsive to the receiving, by the communications device, an indication that the friend removed permission to be on the friends list.

15. An apparatus comprising:
a processor; and
memory coupled to the processor, the memory comprising executable instructions that when executed by the processor cause the processor to effectuate operations comprising:
receiving an indication that a friend is being added to a friends list;
responsive to receiving the indication, determining a privacy setting;
when the privacy setting comprises a first setting:
determining a location of the friend; and
obtaining, from a public profile, an image of the friend; and
providing:
an indication of the location of a device associated with the friend; and
an indication of the image.

16. The apparatus of claim 15, wherein:
the location comprises a geographical location.

17. The apparatus of claim 15, wherein:
the indication of the location comprises the location indicated on a map.

18. The apparatus of claim 15, wherein:
the indication of the location further comprises a message.

19. The apparatus of claim 15, the operations further comprising:
providing directions to the location.

20. The apparatus of claim 15, the operations further comprising:
determining a second location proximate to the location.

* * * * *